US011678141B2

(12) United States Patent
Daoura et al.

(10) Patent No.: US 11,678,141 B2
(45) Date of Patent: Jun. 13, 2023

(54) HYBRID CELLULAR BLUETOOTH TRACKING DEVICES, METHODS AND SYSTEMS

(71) Applicant: PB Inc., Issaquah, WA (US)

(72) Inventors: Daniel J. Daoura, Renton, WA (US); Robert Aldridge, Renton, WA (US); Johnathan Charles Miller, Renton, WA (US); Nicholas R. Pearson-Franks, Sammanish, WA (US)

(*) Notice: Subject to any disclaimer, the term of this patent is extended or adjusted under 35 U.S.C. 154(b) by 185 days.

(21) Appl. No.: 16/950,666

(22) Filed: Nov. 17, 2020

(65) Prior Publication Data

US 2021/0152976 A1 May 20, 2021

Related U.S. Application Data

(63) Continuation-in-part of application No. 16/575,315, filed on Sep. 18, 2019, now Pat. No. 11,184,858.
(Continued)

(51) Int. Cl.
*H04W 4/80* (2018.01)
*H04W 4/029* (2018.01)
(Continued)

(52) U.S. Cl.
CPC ............ *H04W 4/029* (2018.02); *H04W 4/80* (2018.02); *H04W 24/08* (2013.01); *H04W 52/0235* (2013.01); *H04W 88/16* (2013.01)

(58) Field of Classification Search
CPC ... H04W 84/045; H04W 88/06; H04W 36/14; H04W 92/02; H04W 80/00; H04W 48/18;
(Continued)

(56) References Cited

U.S. PATENT DOCUMENTS 4,500,051 A 2/1985 Cottle, Jr. et al.
5,528,460 A 6/1996 Byrd
(Continued)

FOREIGN PATENT DOCUMENTS

GB 2389216 A 12/2003
WO 2011057287 A1 5/2011
(Continued)

OTHER PUBLICATIONS

US 9,144,735 B2, 09/2015, Nasiri et al. (withdrawn)
(Continued)

*Primary Examiner* — Joseph Arevalo
(74) *Attorney, Agent, or Firm* — K Karel Lambert; Bryan Santarelli; Fogg & Powers, LLC

(57) ABSTRACT

XCB dual-radio devices as finders, locators, scanners, sensors, and radio topology reporters for pet location management services. Finding, tracking, scanning, locating and proximity monitoring are provided as complementary services supplemented by a Bluetooth Proximity Locator Services Toolkit and a Cellular Remote Locator Services Toolkit. The radiotag devices may also include a user interface with exterior "homing" switch accessible to a user. The switch may activate an "on demand" location fix and communication package useful in pet location services and recovery. For example, smart systems enable alerts, messaging, maps and mixed media support as community services for pet location and tracking.

20 Claims, 21 Drawing Sheets

Related U.S. Application Data

(60) Provisional application No. 63/114,464, filed on Nov. 16, 2020, provisional application No. 62/936,588, filed on Nov. 17, 2019, provisional application No. 62/732,945, filed on Sep. 18, 2018.

(51) Int. Cl.
  *H04W 24/08* (2009.01)
  *H04W 52/02* (2009.01)
  *H04W 88/16* (2009.01)

(58) Field of Classification Search
  CPC ..... H04W 74/00; H04W 76/11; H04W 76/27; H04W 84/04; H04W 16/16; H04W 28/18; H04W 36/00; H04W 84/00; H04W 88/08; H04W 92/14; H04W 60/00; H04W 12/068; H04W 36/0005; H04W 36/03; H04W 36/18; H04W 4/21; H04W 4/80; H04W 52/0245; H04W 60/04; H04W 68/00; H04W 76/10; H04W 76/14; H04W 76/32; H04W 8/005; H04W 88/04; H04W 88/10
  USPC ....... 370/318, 331, 328, 329, 341, 338, 392, 370/254, 248, 332, 312, 252
  See application file for complete search history.

(56) References Cited

U.S. PATENT DOCUMENTS

| | | | |
|---|---|---|---|
| 5,587,955 A | 12/1996 | Lee et al. | |
| 5,610,596 A | 3/1997 | Petitclerc | |
| 5,731,757 A | 3/1998 | Layson, Jr. | |
| 5,963,130 A | 10/1999 | Schlager et al. | |
| 5,973,599 A | 10/1999 | Nicholson et al. | |
| 6,058,309 A | 5/2000 | Huang et al. | |
| 6,297,737 B1 | 10/2001 | Irvin | |
| 6,756,901 B2 | 6/2004 | Campman | |
| 6,774,811 B2 | 8/2004 | Kaufman et al. | |
| 6,847,892 B2 | 1/2005 | Zhou et al. | |
| 7,034,684 B2 | 4/2006 | Boman et al. | |
| 7,091,851 B2 | 8/2006 | Mason et al. | |
| 7,114,175 B2 | 9/2006 | Lähteenmaäki | |
| 7,142,982 B2 | 11/2006 | Hickenlooper et al. | |
| 7,180,500 B2 | 2/2007 | Marvit et al. | |
| 7,218,944 B2 | 5/2007 | Cromer et al. | |
| 7,274,295 B2 | 9/2007 | Koch et al. | |
| 7,321,774 B1 | 1/2008 | Lau et al. | |
| 7,418,257 B2 | 8/2008 | Kim | |
| 7,420,465 B2 | 9/2008 | Ritter | |
| 7,479,871 B2 | 1/2009 | Holowick | |
| 7,502,619 B1 | 3/2009 | Katz | |
| 7,551,930 B2 | 6/2009 | Lempiö et al. | |
| 7,639,138 B2 | 12/2009 | Chang | |
| 7,705,728 B2 | 4/2010 | Mock et al. | |
| 7,768,393 B2 | 8/2010 | Nigam | |
| 7,805,382 B2 | 9/2010 | Rosen et al. | |
| 7,880,613 B1 | 2/2011 | Maeng | |
| 7,924,141 B2 | 4/2011 | Tuttle | |
| 7,929,951 B2 | 4/2011 | Stevens | |
| 8,058,988 B1 | 11/2011 | Medina, III et al. | |
| 8,063,789 B2 | 11/2011 | Kaufmann | |
| 8,081,072 B2 | 12/2011 | Scalisi et al. | |
| 8,094,011 B2 | 1/2012 | Faris et al. | |
| 8,130,096 B2 | 3/2012 | Monte et al. | |
| 8,144,015 B2 | 3/2012 | Burket et al. | |
| 8,195,203 B1 | 6/2012 | Tseng | |
| 8,280,351 B1 | 10/2012 | Ahmed et al. | |
| 8,295,483 B2 | 10/2012 | Kageyama | |
| 8,299,920 B2 | 10/2012 | Hamm et al. | |
| 8,310,379 B2 | 11/2012 | Johnson | |
| 8,328,092 B1 | 12/2012 | Robinson et al. | |
| 8,385,883 B2 | 2/2013 | Rajan et al. | |
| 8,395,968 B2 | 3/2013 | Vartanian et al. | |
| 8,421,619 B2 | 4/2013 | Scalisi et al. | |
| 8,427,969 B1 | 4/2013 | Juillard | |
| 8,456,329 B1 | 6/2013 | Tran et al. | |
| 8,502,900 B2 | 8/2013 | Fujino et al. | |
| 8,506,524 B2 | 8/2013 | Graskov et al. | |
| 8,570,373 B2 | 10/2013 | Variyath et al. | |
| 8,577,392 B1 | 11/2013 | Pai et al. | |
| 8,604,925 B2 | 12/2013 | Monte et al. | |
| 8,611,321 B2 | 12/2013 | Herrala et al. | |
| 8,620,343 B1 | 12/2013 | Lau et al. | |
| 8,620,841 B1 | 12/2013 | Filson et al. | |
| 8,630,699 B2 | 1/2014 | Baker et al. | |
| 8,633,817 B2 | 1/2014 | Khorashadi et al. | |
| 8,665,784 B2 | 3/2014 | Kang et al. | |
| 8,676,182 B2 | 3/2014 | Bell et al. | |
| 8,761,804 B2 | 6/2014 | Johnson | |
| 8,803,659 B2 | 8/2014 | Hill | |
| 8,810,392 B1 | 8/2014 | Teller et al. | |
| 8,812,028 B2 | 8/2014 | Yariv et al. | |
| 8,839,386 B2 | 9/2014 | Gilboy | |
| 8,862,378 B2 | 10/2014 | Curatolo et al. | |
| 8,869,248 B2 | 10/2014 | Moosavi et al. | |
| 8,989,096 B2 | 3/2015 | Chhabra et al. | |
| 9,007,264 B2 | 4/2015 | Riley et al. | |
| 9,024,749 B2 | 5/2015 | Ratajczyk | |
| 9,043,433 B2 | 5/2015 | Backholm et al. | |
| 9,113,300 B2 | 8/2015 | Marti et al. | |
| 9,174,123 B2 | 11/2015 | Nasiri et al. | |
| 9,195,866 B1 | 11/2015 | Mehranfar et al. | |
| 9,196,139 B2 | 11/2015 | Gutierrez et al. | |
| 9,253,752 B2 | 2/2016 | Lee et al. | |
| 9,277,386 B1 | 3/2016 | Masiero et al. | |
| 9,283,847 B2 | 3/2016 | Riley, Sr. et al. | |
| 9,297,882 B1 | 3/2016 | Bhatia | |
| 9,357,348 B2 | 5/2016 | Evans et al. | |
| 9,392,404 B2 | 7/2016 | Daoura et al. | |
| 9,392,405 B1 | 7/2016 | Auvenshine et al. | |
| 9,407,624 B1 | 8/2016 | Myers et al. | |
| 9,525,969 B2 | 12/2016 | Evans et al. | |
| 9,525,970 B2 | 12/2016 | Farley et al. | |
| 9,654,916 B2 | 5/2017 | de la Broise | |
| 9,665,913 B2 | 5/2017 | Loutit | |
| 9,685,066 B2 | 6/2017 | Vega et al. | |
| 9,699,612 B2 | 7/2017 | Evans et al. | |
| 9,710,821 B2 | 7/2017 | Heath | |
| 9,794,898 B1 | 10/2017 | Chapiewski | |
| 9,813,992 B2 | 11/2017 | Peinhardt et al. | |
| 9,820,106 B2 | 11/2017 | Farley et al. | |
| 9,889,305 B1 | 2/2018 | Hellman et al. | |
| 9,955,305 B2 | 4/2018 | de Barros Chapiewski et al. | |
| 9,961,498 B2 | 5/2018 | Evans et al. | |
| 9,965,941 B2 | 5/2018 | de Barros Chapiewski et al. | |
| 9,989,626 B2 | 6/2018 | Sumiyoshi et al. | |
| 10,008,097 B1 | 6/2018 | Kumar et al. | |
| 10,021,516 B2 | 7/2018 | Zarley et al. | |
| 10,102,734 B2 | 10/2018 | Kumar et al. | |
| 10,111,032 B2 | 10/2018 | Vega et al. | |
| 2002/0070861 A1 | 6/2002 | Teller | |
| 2002/0190861 A1 | 12/2002 | Wentworth | |
| 2003/0047530 A1 | 3/2003 | Durbin | |
| 2003/0095032 A1 | 5/2003 | Hoshino et al. | |
| 2003/0104848 A1* | 6/2003 | Bridgelall | G06K 7/0008 455/574 |
| 2003/0210143 A1 | 11/2003 | Haddad | |
| 2003/0235172 A1 | 12/2003 | Wood | |
| 2004/0021569 A1 | 2/2004 | Lepkofker et al. | |
| 2004/0174264 A1 | 9/2004 | Reisman et al. | |
| 2004/0192352 A1 | 9/2004 | Vallstrom et al. | |
| 2004/0198389 A1 | 10/2004 | Alcock et al. | |
| 2005/0068172 A1 | 3/2005 | King | |
| 2005/0134459 A1* | 6/2005 | Glick | G08B 25/009 340/572.1 |
| 2005/0139686 A1 | 6/2005 | Helmer et al. | |
| 2005/0200478 A1 | 9/2005 | Koch et al. | |
| 2006/0046709 A1 | 3/2006 | Krumm et al. | |
| 2006/0158310 A1 | 7/2006 | Klatsmanyi et al. | |
| 2006/0214855 A1 | 9/2006 | Harada et al. | |
| 2006/0250255 A1 | 11/2006 | Flanagan | |
| 2007/0070818 A1 | 3/2007 | Inomata et al. | |

(56) References Cited

U.S. PATENT DOCUMENTS

| | | |
|---|---|---|
| 2007/0106775 A1 | 5/2007 | Wong |
| 2007/0167175 A1 | 7/2007 | Wong et al. |
| 2007/0194913 A1 | 8/2007 | Yokoshima et al. |
| 2007/0229350 A1 | 10/2007 | Scalisi et al. |
| 2007/0247307 A1 | 10/2007 | Riep |
| 2008/0001734 A1 | 1/2008 | Stilp et al. |
| 2008/0062120 A1 | 3/2008 | Wheeler et al. |
| 2008/0079581 A1 | 4/2008 | Price |
| 2008/0104649 A1 | 5/2008 | Naaman et al. |
| 2008/0143516 A1 | 6/2008 | Mock et al. |
| 2008/0172173 A1 | 7/2008 | Chang et al. |
| 2008/0174425 A1 | 7/2008 | Torning |
| 2008/0287143 A1 | 11/2008 | Banks et al. |
| 2009/0002188 A1 | 1/2009 | Greenberg |
| 2009/0058663 A1 | 3/2009 | Joshi et al. |
| 2009/0121930 A1 | 5/2009 | Bennett et al. |
| 2009/0143078 A1 | 6/2009 | Tu et al. |
| 2010/0080175 A1 | 4/2010 | Kang et al. |
| 2010/0130167 A1 | 5/2010 | Bennett et al. |
| 2010/0164715 A1 | 7/2010 | Buller et al. |
| 2010/0178913 A1 | 7/2010 | Herbert et al. |
| 2010/0273452 A1 | 10/2010 | Rajann et al. |
| 2010/0283600 A1 | 11/2010 | Herbert et al. |
| 2011/0074587 A1 | 3/2011 | Hamm et al. |
| 2011/0140884 A1 | 6/2011 | Santiago et al. |
| 2011/0177790 A1 | 7/2011 | Monte et al. |
| 2011/0254760 A1 | 10/2011 | Lloyd et al. |
| 2011/0263331 A1 | 10/2011 | Koski et al. |
| 2012/0007713 A1 | 1/2012 | Nasir et al. |
| 2012/0052870 A1 | 3/2012 | Habicher |
| 2012/0086574 A1 | 4/2012 | Blumel et al. |
| 2012/0122480 A1 | 5/2012 | Scalisi et al. |
| 2012/0154115 A1 | 6/2012 | Herrala |
| 2012/0186312 A1 | 7/2012 | Lowder et al. |
| 2012/0309408 A1 | 12/2012 | Marti et al. |
| 2012/0309422 A1 | 12/2012 | Lewis-Evans et al. |
| 2012/0322380 A1 | 12/2012 | Nannarone et al. |
| 2013/0002481 A1 | 1/2013 | Solomon |
| 2013/0069782 A1 | 3/2013 | Duggal et al. |
| 2013/0072223 A1 | 3/2013 | Berenberg et al. |
| 2013/0103606 A1 | 4/2013 | Holliday |
| 2013/0109427 A1 | 5/2013 | Matus |
| 2013/0150028 A1 | 6/2013 | Akins et al. |
| 2013/0159350 A1 | 6/2013 | Sankar et al. |
| 2013/0159825 A1 | 6/2013 | Nishio et al. |
| 2013/0166198 A1 | 6/2013 | Funk et al. |
| 2013/0179110 A1 | 7/2013 | Lee |
| 2013/0210360 A1 | 8/2013 | Ljung et al. |
| 2013/0214926 A1 | 8/2013 | Huang |
| 2013/0274587 A1 | 10/2013 | Coza et al. |
| 2013/0274954 A1 | 10/2013 | Jordan, Jr. et al. |
| 2014/0031895 A1 | 1/2014 | Rahimi et al. |
| 2014/0049376 A1 | 2/2014 | Ng |
| 2014/0062695 A1 | 3/2014 | Rosen et al. |
| 2014/0073262 A1 | 3/2014 | Gutierrez et al. |
| 2014/0085089 A1 | 3/2014 | Rasband et al. |
| 2014/0099921 A1 | 4/2014 | Weiss |
| 2014/0135042 A1* | 5/2014 | Buchheim ............... G01S 1/725 455/566 |
| 2014/0139454 A1* | 5/2014 | Mistry .................... G06F 3/017 345/173 |
| 2014/0139637 A1* | 5/2014 | Mistry .................... G06F 1/163 348/46 |
| 2014/0143737 A1* | 5/2014 | Mistry ................... G06F 3/0362 715/854 |
| 2014/0143785 A1* | 5/2014 | Mistry ................... G06F 9/5044 718/104 |
| 2014/0162693 A1 | 6/2014 | Wachter et al. |
| 2014/0213301 A1 | 7/2014 | Evans et al. |
| 2014/0228783 A1 | 8/2014 | Kraft |
| 2014/0274135 A1 | 9/2014 | Edge et al. |
| 2014/0274136 A1 | 9/2014 | Edge et al. |
| 2014/0279435 A1 | 9/2014 | Holman et al. |
| 2014/0297900 A1 | 10/2014 | Herbert et al. |
| 2014/0324585 A1 | 10/2014 | Mederos |
| 2014/0329460 A1 | 11/2014 | Loutit |
| 2014/0369695 A1 | 12/2014 | D'Andrade et al. |
| 2014/0378066 A1 | 12/2014 | Liu et al. |
| 2015/0005011 A1 | 1/2015 | Nehrenz et al. |
| 2015/0057518 A1 | 2/2015 | Lebel et al. |
| 2015/0099472 A1 | 4/2015 | Ickovic |
| 2015/0112264 A1 | 4/2015 | Kamen et al. |
| 2015/0156567 A1* | 6/2015 | Oliver ................ G08B 21/0227 340/870.07 |
| 2015/0168173 A1 | 6/2015 | Lewis-Evans et al. |
| 2015/0235120 A1 | 8/2015 | Warren |
| 2015/0296477 A1 | 10/2015 | Pan et al. |
| 2015/0332031 A1* | 11/2015 | Mistry .................. H04W 12/06 726/19 |
| 2015/0356848 A1 | 12/2015 | Hatch |
| 2015/0371215 A1 | 12/2015 | Zhou et al. |
| 2015/0371511 A1 | 12/2015 | Miller et al. |
| 2016/0054083 A1 | 2/2016 | Kiyani et al. |
| 2016/0100368 A1 | 4/2016 | Sharma et al. |
| 2016/0171486 A1 | 6/2016 | Wagner et al. |
| 2016/0189450 A1 | 6/2016 | Anderson et al. |
| 2016/0262082 A1 | 9/2016 | Flynn et al. |
| 2016/0335878 A1 | 11/2016 | Steven |
| 2016/0343032 A1 | 11/2016 | DeWitt et al. |
| 2017/0019755 A1 | 1/2017 | Thacher et al. |
| 2017/0019853 A1 | 1/2017 | Ghosh et al. |
| 2017/0180062 A1 | 6/2017 | Johansen |
| 2018/0260822 A1 | 9/2018 | Wells |
| 2018/0324562 A1 | 11/2018 | Park et al. |
| 2019/0137947 A1 | 5/2019 | Yaghmour |
| 2019/0182873 A1 | 6/2019 | Wass et al. |
| 2019/0192053 A1 | 6/2019 | Saigh |
| 2019/0220715 A1 | 7/2019 | Park et al. |
| 2019/0296969 A1 | 9/2019 | Zimny et al. |
| 2019/0342833 A1 | 11/2019 | Åström et al. |
| 2019/0394720 A1 | 12/2019 | McCoy et al. |
| 2020/0027096 A1 | 1/2020 | Cooner |
| 2020/0128212 A1 | 4/2020 | Sannala |
| 2020/0314752 A1 | 10/2020 | Haque et al. |
| 2020/0337162 A1 | 10/2020 | Perkins et al. |
| 2020/0367147 A1 | 11/2020 | Hoglund et al. |
| 2020/0367471 A1 | 11/2020 | Deliou |
| 2021/0027309 A1 | 1/2021 | Wells |
| 2021/0035429 A1 | 2/2021 | Daoura et al. |
| 2021/0256833 A1 | 8/2021 | Daoura et al. |
| 2022/0093241 A1* | 3/2022 | Scanlin ................. G16H 50/80 |

FOREIGN PATENT DOCUMENTS

| | | |
|---|---|---|
| WO | 2013188374 A2 | 12/2013 |
| WO | 2014042507 A1 | 3/2014 |

OTHER PUBLICATIONS

U.S. Patent and Trademark Office, "Notice of Allowance", U.S. Appl. No. 16/575,315, filed Aug. 30, 2021, pp. 1 through 11, Published: US.

U.S. Patent and Trademark Office, "Office Action", U.S. Appl. No. 17/163,403, filed Jul. 9, 2021, pp. 1 through 24, Published: US.

Boehret, "TrackR vs. Tile: The Lost-and-Found Face-Off", Recode, Apr. 1, 2018, pp. 1 through 4, www.vox.com/2015/4/1/11560992/trackr-vs-tile-the-lost-and-found-face-off.

Frank, et al., "The Sensor Internet at Work: Locating Everyday Items Using Mobile Phones,", 2007, 26 pages.

Google, "Assisted GPS", at least as early as Dec. 1, 2020, pp. 1 through 2, Google Search.

Google, "Universally unique identifier", at least as early as Nov. 30, 2020, pp. 1 through 2, Google Search.

Haartsen, "Bluetooth—The universal radio interface for ad hoc, wireless connectivity", from No. 3, 1998 edition of Ericsson Review journal (8 pages).

Ip.com, "Create Number List", InnovationQ Plus, at least as early as Dec. 1, 2020, pp. 1, https://ip.ip.com/discover.

(56) References Cited

OTHER PUBLICATIONS

The Tile App—Item Finder for Anything, Photo, Facebook, Aug. 8, 2013.

Trackr, "Find lost keys, wallets, phones and more with TrackR pixel", at least as early as Nov. 4, 2018, pp. 1 through 9, TrackR, http://www.thetrackr.com/>.

U.S. Patent and Trademark Office, "Final Office Action", U.S. Appl. No. 14/301,236, dated Mar. 14, 2018, pp. 1 through 25, Published: US.

U.S. Patent and Trademark Office, "Final Office Action", U.S. Appl. No. 14/301,236, dated Oct. 21, 2016, pp. 1 through 23, Published: US.

U.S. Patent and Trademark Office, "Notice of Allowance", U.S. Appl. No. 14/301,236, dated Nov. 1, 2019, pp. 1 through 24, Published: US.

U.S. Patent and Trademark Office, "Notice of Allowance", U.S. Appl. No. 16/575,315, daed May 7, 2021, pp. 1 through 34, Published: US.

U.S. Patent and Trademark Office, "Notice of Allowance", U.S. Appl. No. 16/747,458, dated Dec. 28, 2020, pp. 1 through 30, Published: US.

U.S. Patent and Trademark Office, "Office Action", U.S. Appl. No. 14/301,236, dated Feb. 12, 2016, pp. 1 through 21, Published: US.

U.S. Patent and Trademark Office, "Office Action", U.S. Appl. No. 14/301,236, dated Mar. 8, 2019, pp. 1 through 46, Published: US.

U.S. Patent and Trademark Office, "Office Action", U.S. Appl. No. 14/301,236, dated Jul. 14, 2017, pp. 1 through 19, Published: US.

U.S. Patent and Trademark Office, "Office Action", U.S. Appl. No. 16/575,315, dated Dec. 4, 2020, pp. 1 through 10, Published: US.

U.S. Patent and Trademark Office, "Office Action", U.S. Appl. No. 16/747,458, dated Apr. 17, 2020, pp. 1 through 13, Published: US.

Vos, "What is eDRX (Extended Discontinuous Reception)?", IoT Blog, Sierra Wireless, Jun. 4, 2020, pp. 1 through 7, https://www.sierrawireless.com/iot-blog/edrx-lpwa/.

WIPO, "edrx and bluetooth", Search International an National Patent Collections, at least as early as Dec. 1, 2020, pp. 1 through 2, https://patentscope.wipo.int/search/en/result.jsf?_vid=P12-KI655E-11650.

\* cited by examiner

CELLULAR REMOTE LOCATOR TOOLKIT

BLUETOOTH
PROXIMITY
LOCATOR
TOOLKIT

FIG. 11

FOR ANY RADIOTAG:SMARTPHONE PAIR

LOCATION KNOWN? — 1101

TIME 0 | YES or NO?

IF LOCATION KNOWN "YES", THEN IN "SAFE ZONE"? — 1102

IN SAFE ZONE?

TIME 0 | YES    NO    IF YES, THEN SLEEP

IF NOT IN SAFE ZONE OR NO LOCATION, THEN CK MOTION. COMPARE MOTION OF RADIOTAG VERSUS SMARTPHONE:

MOTION (Truth Table)

| TAG | PHONE |        |
|-----|-------|--------|
| F   | F     | GO TO 1 |
| F   | T     | GO TO 2 |
| T   | T     | GO TO 3 |
| T   | F     | GO TO 3 |

— 1103

1. ENTER OR CONTINUE IN SLEEP MODE ← 1104

2. GENERATE "LEFT BEHIND" ALERT AND "CALL HOME" — 1105
IF RADIO TETHER IS BROKEN

3. CHECK PROXIMITY CHANGE (dRSSI/dT) ← 1106

PROXIMITY CHANGE (dRSSI/dT)*

TIME (dT) | ~    >    <

* ~: Unchanged; > Strengthening; < Fading

IF UNCHANGED, THEN SLEEP. ← 1107

IF FADING OR LOST RSSI, THEN GENERATE "LOST" ALERT AND "CALL HOME". — 1108

IF STRENGTHENING RSSI, LOOP T=T+t AND ReCK MOTION — 1109

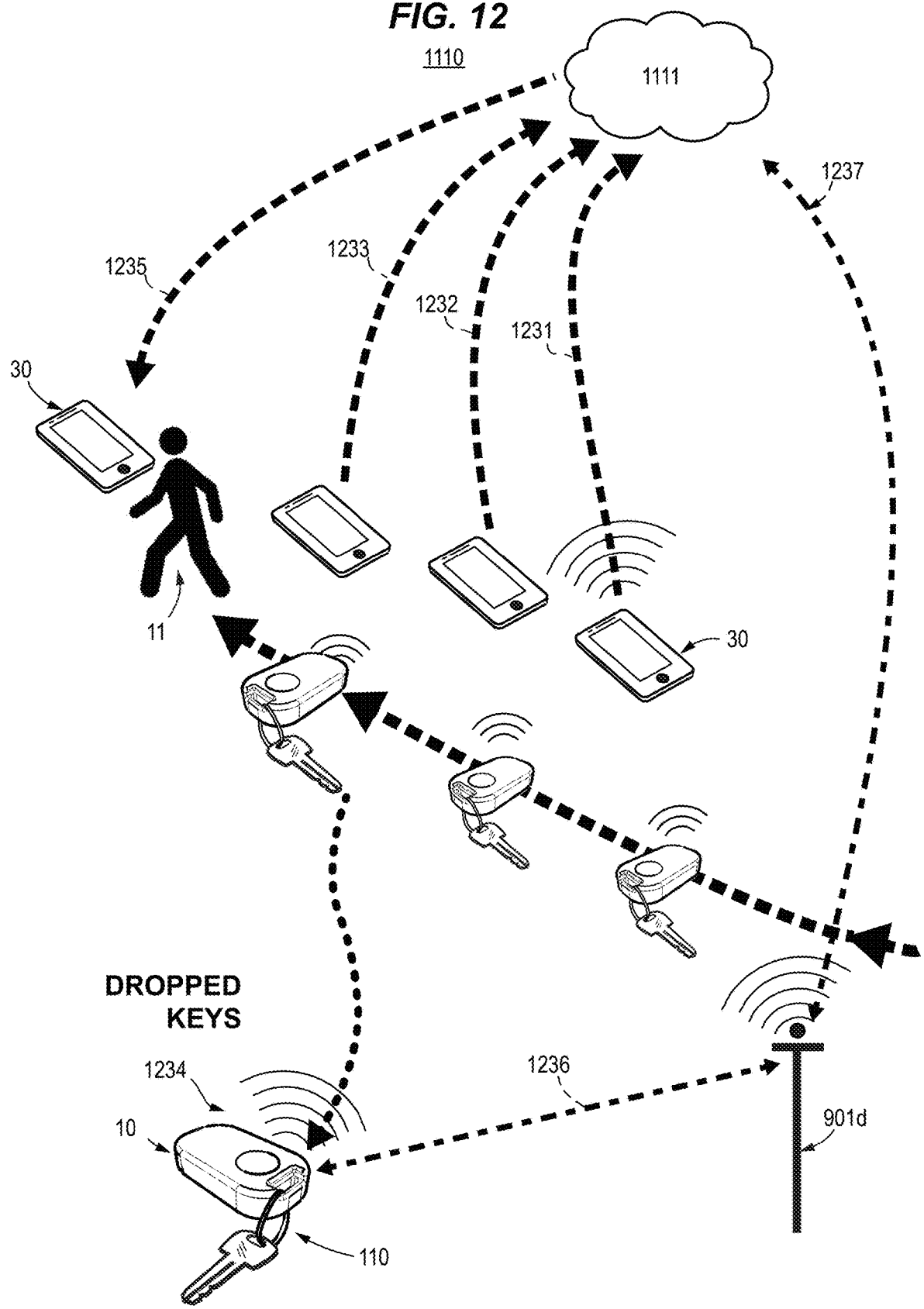

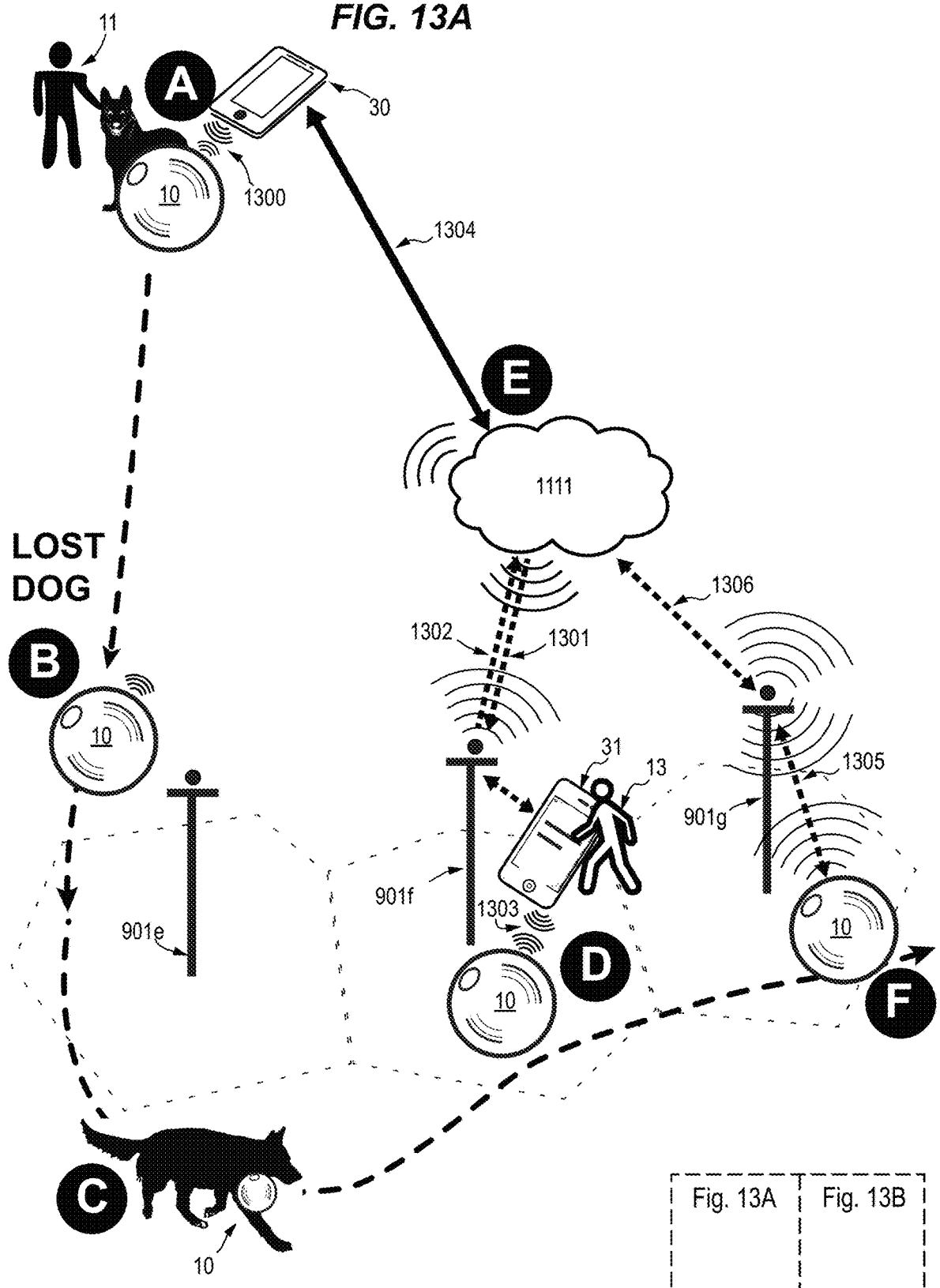

HYBRID CELLULAR BLUETOOTH TRACKING DEVICES, METHODS AND SYSTEMS

CROSS REFERENCE TO RELATED APPLICATIONS

This application is a Continuation-in-Part of U.S. patent application Ser. No. 16/575,315 filed 18 Sep. 2019. This application claims the benefit of priority under 35 U.S.C. § 119(e) from U.S. Provisional Patent Appl. No. 62/936,588 titled "Finder Devices and Systems with Notifier Control Interface", filed 17 Nov. 2019, and from U.S. Prov. Pat. Appl. No. 63/108,843 titled "Hybrid Cellular Bluetooth Tracking Devices, Methods and Systems", filed 2 Nov. 2020, and from U.S. Prov. Pat. Appl. No. 63/114,464, titled "Hybrid Cellular Bluetooth Tracking Devices, Methods and Systems", filed 16 Nov. 2020.

This application is further related to U.S. patent application Ser. No. 14/301,236 filed 10 Jun. 2014 titled "Tracking Device System", now U.S. Pat. No. 10,580,281, U.S. Prov. Pat. Appl. Ser. No. 62/968,105 filed 30 Jan. 2020, titled "Private Wireless Network Communications Systems, Methods and Devices".

TECHNICAL FIELD

Radio finder devices and systems for pet location and tracking management.

BACKGROUND

Pets can be tagged to aid in their locating and tracking. Implantable microchips have long been used to aid in reuniting pets and owners. A passive RFID tag is implanted under the skin and the tag must be scanned with a special reader and then a directory accessed to determine contact information of the owner, followed by a call or notification to the owner. Passive tags do not require a battery, but their use is limited because they cannot be read unless in immediate contact with or proximity to a tag reader.

There is a need for a radio tracking system that operates at greater distances for finding lost pets. Bluetooth radiosets are also limited in range, and transmit and receive typically over no more than a distance of about 100 meters at 0 dBm. This intimacy is helpful in informing proximity-driven applications but is a critical limitation when location services must be provided over greater distances.

The deployment of 5G radio networks is bringing increased complexity and variety to radiotag use. The backbone of 5G systems for most users is the cellular broadband network that supports voice and mixed media communications as well as data. Access to this system is tightly controlled by authenticating of users based on an IMSI encoded in the subscription identifier module in every cellular device. But the need for security comes at the cost of energy consumption, which limits the field life of detached cellular radio devices. Thus, both BT and cellular radio equipment have limitations for use in radio tracking systems.

An improved system would enable owners to expect and to realize an extraordinary level of power management sophistication while enabling both long distance and short range finding and tracking. Power management must be so stringent, for example, that an owner can attach a radio device to a pet or other valuable, and be able to track the signal if the asset goes missing weeks or months later— while having adequate broadcast range and no unacceptable latency or dead time. A solution to this complex problem has not been achieved with conventional radiotag finders.

SUMMARY

An unmet need exists for a hybrid BT-cellular radio device and platform that has the intimacy and ubiquity of a BT piconet or mesh network, but also the power to connect globally with the packet data environment of LTE-Cat M and emerging 5G cellular networks as the backbone. As disclosed here, these new radio devices are termed "crossover cellular bluetooth" radios (XCB). XCB devices include a Bluetooth (BT) radio with antenna, a cellular radio with antenna, and a processor with supporting circuitry and power management features that default to a "sleep" mode. Synergically, by engineering the BT radio as part of the device controller and attaching a cellular modem to the controller, the BT radio can be used as a "wake up receiver" for activating the cellular modem.

When activated, the cellular modem can make a new cellular network connection or reestablish a network connection in a process termed here a "CALL HOME". The call home is a status update and offers an opportunity to share a location fix with the network or to receive network assistance in establishing a location fix. Location data is the key to many community services.

XCB devices function in locating, tracking and monitoring lost or wayward pets. In use, a radiotag is attached to a pet by an owner of the object, and can wirelessly report the pet's location from around the world or can make itself found by emitting an audible alarm when misplaced out of sight. Because XCB radiotags can self-initiate a call to an owner of a radiotagged asset, the owner is not strictly dependent on the goodness of strangers to recover what is lost. Advantageously, the current location can be displayed on the owner's smartphone and updated locations can be displayed as a series of waypoints that track the location of the lost pet until safely recovered.

Output from onboard sensors such as motion, electronic heading, photocell or body temperature sensors, or a combination of radio traffic sensor data and motion sensor data, for example, can result in a CALL HOME. In another embodiment, the BT radio functions as a sensor that reports on the surrounding radio topology. Sensor data may be shared in an uplink with the network.

Location is readily determined by AGPS or other network-assisted location service, and the location is readily transmitted to a system administrative host. Similarly, the owner/subscriber can request a location fix from the system host. If the XCB device is not awake and in a cellular paging window, the device can be contacted via its "always listening" BT radio with minimal latency. If the radiotag is outside BT range, a proxy smartphone or hub, operated by an anonymous user of a community of users, in response to a BT advertising signal from the lost radiotag, will alert the system administrative host that the radiotag has been detected, and the system will acquire a location and notify the owner. During radio contacts, the system host may also send new instructions to the cellular modem that will modify its cellular wake cycling for more frequent location updates.

Advantageously, according to one embodiment, when someone finds a pet with an attached XCB radiotag, that person presses a "homing" button on the radiotag and the location is broadcast as a cloud-directed service to the owner/subscriber of the lost asset over a cellular radio connection. Because the radiotags include an LTE-M cellular radio, location is readily determined by AGPS or other network-assisted location service, and the location is readily transmitted to a system administrative host, and the system can generate a notification to the owner/subscriber, for example.

Similarly, the owner/subscriber can request a location fix. If the device is not awake and in a cellular paging window, the device can be contacted via its "always listening" BT radioset with minimal latency. If the radiotag is outside BT range, a proxy smartphone or hub, operated by an anonymous user of a community of users, in response to a BT advertising signal from the device, will alert the system administrative host that the radiotag has been detected, and the system will acquire a location and notify the owner. During radio contacts mediated by the system, the system may also send new instructions to the cellular radioset that will modify its cellular wake cycling so that it can be tracked with frequent cellular updates.

Importantly, battery power is not wasted on useless cellular radio activity before a relevant event occurs. In one embodiment, the lost radiotag may be activated by someone who comes across the lost pet and presses a button or other activation switch on the radiotag. At that point, the radiotag begins a location determination and a cellular broadcast. The system will react promptly so that the radiotag can be reprogrammed to broadcast in an "active-tracking mode" for a period of several weeks, or even a month or more, using cellular eDRX power savings mode with frequent wake up for paging opportunities and location update, so as to ensure that the owner is able to recover the pet.

In the final step of recovering a lost item, Each radiotag or device can include a speaker or LED that can be activated remotely, for example a beeper that emits an audible tone, to aid in locating it when misplaced. The proximity locator toolbox is active to 100 meters or more. When used with dual-radio radiotags, the software combines the global cellular and BT network into a highly granular wide area network for finding lost pets with meter resolution on a minimal energy budget.

BT radios may be configured to operate in one or more low power BT-radio states, and include an "always listening" mode where active transmissions are suspended. BT devices will transition from standby to an active BT-radio awake mode in response to a qualified BT radio signal or traffic pattern, for example, or as programmed for scanning and responding to scan requests and connection requests. When the BT radio is in "always listening" mode, or when the BT radio is scanning for inquiries or pages, incoming radio traffic associated with specific access codes and identifiers may elicit generation of a wake command. BT radios may also enter a very low power sleep mode. By adjustments to the duty cycle, XCB devices spend a significant amount of time in sleep mode but in practical use are "always listening radios" (ALR). A qualified radio signal addressed to the BT radio will wake the BT processing circuitry and can wake the cellular radio if needed.

The cellular radio transceiver is configured to cycle between at least one cellular-radio sleep mode and a cellular-radio awake mode. The radio will transition from the cellular-radio sleep mode to a cellular-radio awake mode in a paging window, or when an internal connection request is generated. A qualified radio signal addressed to the cellular modem includes a cellular radio unit identifier and is transmitted in a paging window for which a cellular network for which authentication has been made and access has been granted.

But once awakened, either radio will receive and convey radio commands to the processing circuit(s), commands that are executed while the device is in the processing-circuit awake mode before reverting to its default sleep mode. The processing circuit is enabled to cycle between a processing-circuit sleep mode and a processing-circuit awake mode in response to activity from the BT radio, the cellular radio, from an onboard sensor, or according to machine intelligence.

Lightweight XCB devices are rapidly achieving success as wearables and as radiotags for attachment to pets and even children. By tapping into the power of BT and cellular networks to do positioning and proximity mapping, the tracking and finding of radiotagged objects becomes simple and doable from anywhere. The systems enable tracking and monitoring pets or children and can include messaging services, for example, even voice. Voice functions bring an intimacy to 5G networks that permeates the IoT and a universal user interface is achieved with a microphone and speaker as part of any XCB radio device.

Simple control functions are readily established. User/subscribers interacting with cloud hosts via XCB devices can manage or entirely automate many remote machine tasks ranging from turning on a coffee pot, opening doors and windows on a sunny day, turning out the lights at night, starting a video on a nearby screen, taking a user to a website, finding parking, initiating a purchase, tracking a lost pet, and so forth.

In other instances, BT devices and hubs define "safe zones" and are used for safeguarding and managing assets including pets, for example. Radiotags associated with each pet are radio tethered to the safe zone. In some embodiments, reference hub devices that are not smartphones may also include software or firmware and may include a user interface in the form of one or more buttons or other control surfaces for operating a safe zone. Conditional logic rules are established by a user/subscriber for controlling transit of smart objects out of or into a safe zone.

It is to be expressly understood, however, that the drawings and examples are for illustration and description only and are not intended as a definition of the limits of the inventions. The various elements, features, steps, and combinations thereof that characterize aspects of the inventions are pointed out with particularity in the claims annexed to and forming part of this disclosure. The invention(s) do not necessarily reside in any one of these aspects taken alone, but rather in the invention(s) taken as a whole.

BRIEF DESCRIPTION OF THE FIGURES

The teachings of the present invention(s) are more readily understood by considering the drawings, in which:

FIG. 11 is a flow chart for driving location management logic and power consumption using motion sensor data from a radiotag and a smartphone.

FIG. 12 illustrates a common problem encountered in tracking lost assets, here a "dropped keys" scenario.

FIGS. 13A and 13B illustrate an analysis with systems approach to a "lost dog" scenario.

GLOSSARY

Figure 1:
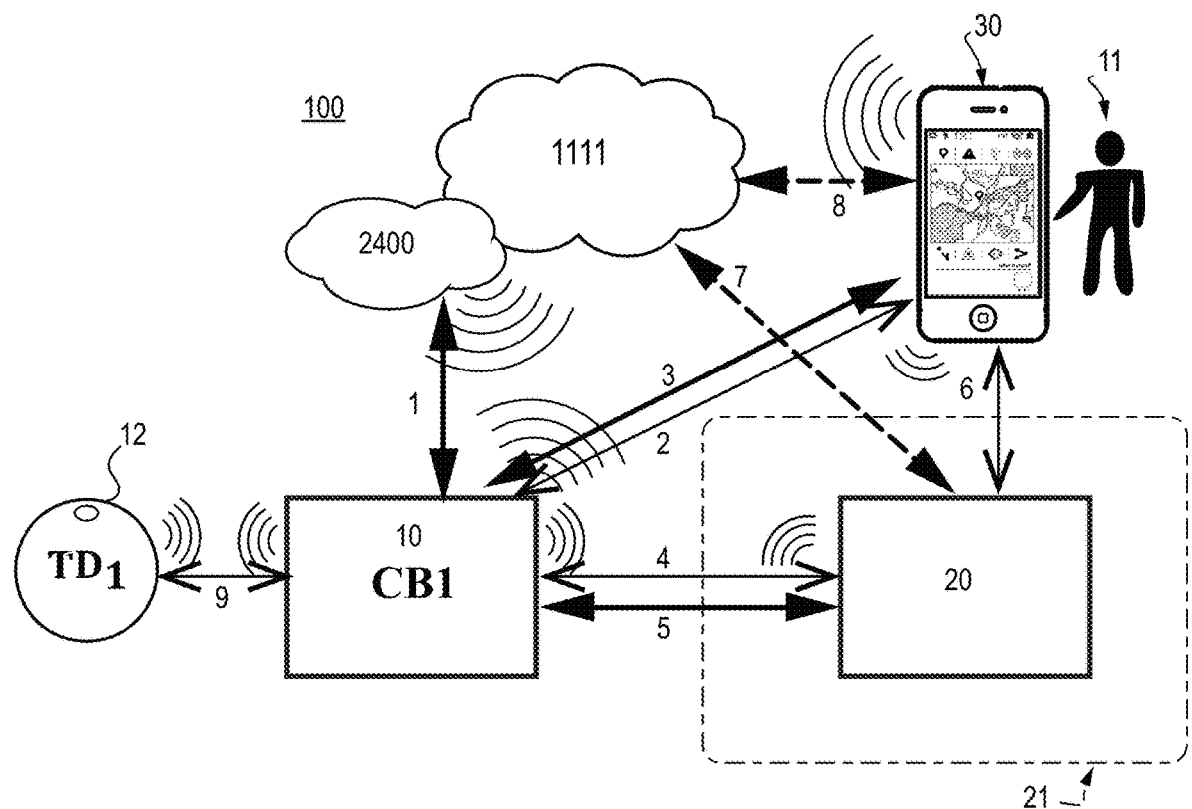
FIG. 1 depicts a networked system 100 with dual-radio radiotag 10, reference hub 20, user equipment 30, and cloud host(s) 1111,2400.

The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted in the concepts disclosed herein without departure from the inventive content.

"Bluetooth Radio" or "BT radio"—includes "Bluetooth Low Energy" (BTLE), "Bluetooth Classic", and "Bluetooth Dual Mode" (BTDM) radio. BT radios share signals with other BT radios in an open, shared ISM band between 2.400 and 2.483 GHz. A spread spectrum with frequency hopping may be used to reduce interference. The operational frequency band is split into channels spaced by increments of 1 MHz or 2 MHz. Digital data is transmitted by GFSK (Gaussian Frequency Shift Keying) in which a binary "one" is modulated as an increased frequency, and a binary "zero" as a decreased frequency, or by DPSK (Differential Phase Shift Keying) as known in the art. Frequency modulation ensures a constant amplitude envelope around the signal that allows higher RF amplification, and achieves a satisfactory bit error rate and tolerance to interference while at low power. Robust repeat and error correction including CRC, ARQ, or other checksum support functions is combined with whitening techniques known to improve fidelity at low power.

In short, BT is designed for short range, robust, low power transmission and reception—with a built in promiscuity that enables easy interactions between newly discovered devices with minimal setup and requiring essential no dedicated connections. The magic of BT piconets is in a system of access codes that are part of the packet/header structure. Details are described in the Bluetooth Core Specification, originally published in 1999, with periodic updates.

However, the BT standard also allows for BT radios to "belong" to certain small networks, termed "piconets", and for members of those network units recognize each other and quickly recover a state of more intimate CONNECTED data exchange termed "pairing"—while not losing the capacity to listen for other radio traffic and to respond selectively or nonselectively when addressed nonspecifically or specifically.

The original BT Specification also allows for BT devices to communicate in "scatternets" formed as loose and transient associations between devices operating in different piconets. Piconets may even share BT devices in different scatternets. This capacity was limited in BTLE to conserve energy, but the capacity remains in the core specification and is included here in some embodiments. While less mainstream, research has also been conducted into mesh networks by which data moves from scatternet to scatternet through internodal devices as relays. The capacity to modify the BT Specification to permit this, while preserving backwards compatibility, is anticipated here, and the use of XCB devices of this disclosure as internodes between piconets, scatternets and as members of mesh networks is, by intent, not precluded in future applications.

BT radio signals are formatted as packets. BT devices include packet composers and decomposers. BT radios also include correlators with registers for sorting and identifying received signals based on access code or service, for example as described in US Pat. Publ. Nos. 2002/048330 and 2009/0086711, which are incorporated herein for all they teach and reference.

"Access codes" are part of a header that addresses BT radio traffic. For example, a general inquiry access code (GIAC) identifies traffic broadcast to any listening device, and indicates a discoverable device. Other inquiry access codes may be directed to individual devices, such as particular members of a piconet. The access code may be derived from, but is not the radio unit identifier of the transmitting device or the intended receiving device.

BT unique radio identifiers (RUI) or "radio signatures", as used here, may be a MAC address of a BT radio device or may be a universal unique identifier (UUID) or a part of a UUID, and may include a serial identifier assigned by the Bluetooth Special Interest Group (Bluetooth SIG) as administered through the IEEE Standardization group (accessible via a WHOIS-style lookup). The RUI may also include a part number given by the manufacturer. The SIG standard also permits developers to encode a "group identifier" or "community identifier" inside an extended unique identifier (EUID) issued by the manufacturer, inside the BD_ADDR, or inside a Service UUID. Proxy identifiers such as service UUIDs link to services associated with a discovered BT device. Identifiers may include payload URLs and payload unique identifiers (UIDs) that identify proprietary services.

The payload may include frames or "values" containing more information. Payload information may include subtype or location, advertising data, sensor output in digital form, and records of Bluetooth radio contacts, for example.

Service identifiers inform the radio of protocols to be followed in sending or receiving data, and allow developers to create tools that incorporate elements of the payload as "deep intent" triggers for software applications. Advertising messages may include one or more identifiers and service UUIDs, for example. Other messages may not provide sufficient information to identify all services associated with a device, but a qualified BT receiver can respond to obtain more information without actually connecting.

For example, identifiers in a message actuate protocols in receiving BT radios that can wake smart devices, direct a smart device to a URL, push a notification to a remote device, or pull attachments from cloud library resources, for example. A smart device can receive Bluetooth radio traffic from any Bluetooth device in radio proximity, and forward that traffic to an IP address associated with a Bluetooth group or community, after adding a timestamp or a location stamp. By doing so, the smart device serves as a "hub" to transfer Bluetooth traffic radio contact records to the broader cellular network (or vice versa), enabling a host of location-driven services that can be modified according to sensor data.

Many devices broadcast their RUI or MAC address in the open, or in response to a SCAN REQUEST. A class of "BT Sniffers" may detect these addresses and compile stacks of addresses and device names as BT traffic metrics. Devices may also be recognized by the services they advertise. For dedicated peripheral devices, a client application can scan for devices offering services or features associated with a UUID that specifies the GATT services the BT device supports, and in full CONNECTION, data specific to a service or feature can be transmitted across the connection.

The RUI address can be an advertising address, a device address, a dedicated address of a piconet device, a virtual address, or a subscriber address, as is useful in mesh networks and for creating whitelists. Some address standards are open, others are proprietary or are obfuscated to prevent BT snooping.

In recent trends, BT signal payloads may include URLs that link the device to the physical web. Alternatively a community identifier is transmitted in a message as part of a header, routing address, or payload that when recognized by packet decomposer in a receiving device, causes the message to be forwarded to an IP Address and associated cloud host. This approach has enabled community lost-and-found services such as described in US Pat. Appl. Publ. No. 2016/0294493) which is incorporated in full by reference.

The radio header and payload may also include resource identifiers that direct communications protocols in the link layer and activate software applications keyed to the resource identifiers. This approach is seen frequently with smartphones—installed Apps react in real time to BT transmissions. For example, a received BT transmission can wake up a sleeping device (US Pat. Appl. Publ. No. 2020/0242549), which is incorporated here by reference. More recently, data supplied in the fields or payload of a BT transmission can cause an App to be installed, or if the App is installed and the appropriate permissions are in place, the App can be run at a particular instance in the program as most relevant to contextual clues in the received BT signal. This is termed "deep intent" to indicate that the App anticipates the user's thought process and causes the client smartphone to display the most relevant materials from a resource or takes an appropriate action in anticipation of the need. More recently the process has been extended to wall screens, so that "walk up" computing is increasingly automated by invisible BT radio transmissions that identify the user and guess the user's intent from radio proximity or accelerometry data. For example, if a user picks up a shoe in a shoestore, a BT radiotag attached to the shoe will send a sensor output and a wall monitor will display more information about the shoe, or push that information onto the user's smartphone.

In connected links, BT signals transmit data. Newer BT 5.0, 5.1 and 5.2 standards permit multi-slot messages for sharing larger amounts of information, even encoding of speech. Connectionless data sharing is also supported in the newer protocols.

"Smart device" is defined by example. The most commonly recognized smart device is the ubiquitous cellphone or "smartphone" (also termed here a "handset"), having a user/subscriber interface, a powerful battery, a cellular radio, highly advanced computational capacity, an operating system, capacious memory for programs and "apps", capacitive touch screens, typically a BT radio, and commonly tens of sensors, all in a pocket-sized device. However, laptops, PDAs, Google glasses, smart wrist watches, and any generally portable device with Internet connectivity and onboard processing power is commonly understood to be a "smart device" sensu lato. Smart devices are typically provided with a SIM card when used in cellular telephonic radio communications and each such device is given an IMSI identification number that points to one particular unique device and more generally is referred to as the cellular "radio unit identifier". The XCB devices disclosed here may also have a BT manufacture's EUID, or a derivative thereof, possibly one or more UUIDs in volatile or non-volatile memory, and a cellular IMSI and IMEI, in addition to any serial or lot number given by the manufacturer. The XCB radiotags may qualify as a "smart device" sensu lato when operated as a platform with memory and computational power.

IMSI is an "international mobile subscriber identifier."
IMEI is an "international mobile equipment identifier."
eDRX abbreviates "extended discontinuous reception."
PSM abbreviates "power savings mode."
VPG is a Virtual Private Gateway.
RSSI abbreviates "received signal strength indicator", which is an indication of incoming signal strength power or power present in an incoming radio signal and is commonly specified as an up to 8-bit unitless integer. RCPI is an improved version of RSSI, and stands for "received channel power indicator" and is logarithmic in dB, measuring total power received in a defined channel bandwidth at the antenna connector. A more general characteristic is "path loss" which relates to radiation power (dBm) minus RSSI (dBm). Transmission power is specified in some beacon signals, which allows a well-defined estimation of range by use of a path loss calculation. Other variants of RSSI exist, and the definition given here is intended to broadly encompass all such indicators of received signal strength regardless of the details of the indicium. A method provided in U.S. Pat. No. 8,879,993 provides for bidirectional exchange of signal strength to better establish proximity. The BT chip includes DC compensation that is active during receiving of the preamble (first 8 bits) of a BT message, and that function outputs the RSSI.

"Timestamp" is a temporal tag given to a data record. Timestamping is an automated function performed as a background service in most smart devices. Timestamps should be standardized as per ISO 8601 using YEAR, MONTH (MM), DAY (DD), followed by HHMMSS.SSS to specify milliseconds, and optionally as Zulu time (or with a specified offset for local timezone or daylight savings) for best practice.

The capacity of a device to timestamp data is dependent on its clock function and memory organization. Conventional Bluetooth radio tags do not provide their own timestamping (instead data is time-tagged by a companion smart device or by a network host when data was received). But the XCB radiotags of the invention may actively timestamp data for storage in local memory or prior to uploading the data. Timestamping may be an integral process with geostamping.

"Geostamp" is a map tag given to a data record that generally indicates the location of a receiver of a transmission, but in some instances, the location may be a transmitter, as from a lighthouse radiobeacon. In other instances the location of the receiver or the location of the transmitter may be stored in a radio contact record. Each radio contact detected is assigned to a record having a timestamp and geostamp in which the geostamp can be the host device location or the source device location, for example. Related services are "location history" services offered as part of the Android platform. Location is generally stored in coordinates given as latitude and longitude.

Geostamping can be an onboard function, much as a camera associates an image in memory with a location (determined by accessing GPS signals and by making a calculation of latitude and longitude; generally on a dedicated chip included in the device for that purpose). Satellite location systems include GPS, BeiDou, the Indian Nav Satellite System (NAVIC), GLONASS, Galileo, QZSS, DORIS, transmitting in L5 and S bands (1.1, 1.5, 1.6 and 2.4 GHz) for position, navigation and timing, for example. Iridium and Starlink may degrade the quality of Satnav signals in the L1 bands. Cellular network-assisted location services include AGPS and PoLTE. Cloud host servers may further refine location accuracy using aggregated data or by correlating PoLTE and GPS positioning, for example. Bluetooth radiobeacons having known fixed locations can also be used to refine location, particularly in indoor environments, much as a lighthouse marks a landmark place. Google supplies Eddystone and a Proximity Beacon REST API that allows users to register a beacon with location (Lat/Long) and indoor floor level, for example, which is wiredly used to geotag commercial establishments and places of interest on the Google cloud.

A geostamp or "geotag" associated with a radio contact or sensor data record can be given by a XCB device if the device is provided with satnav capability or with a processor enabled to receive and store location fixes from a network. The functions of geostamping and timestamping can be coordinated, and can be synchronous or performed separately, either or a single XCB device or at different network levels during network signal processing. Because discoverable BT devices reveal information about the user's proximate location, an explicit permission is often required in the device discovery process. But for some platforms such as Android 8.0 (API level 26) or higher, the Companion Device Manager API gives a generic permission for registered applications to perform device discovery with location information disclosures.

"Sensor"—includes any device having a measurement function, either qualitative or quantitative, parametric or non-parametric. Sensors may measure physical properties such as temperature or motion. Sensors output a digital signal to the processor indicative of the parameters of the physical properties. The XCB and BT devices of the system may function as sensor tags that monitor and report local conditions to a higher level network. Once uploaded, aggregated sensor data may be used in generating a composite map of the local environment as has found application in "crowdsourced functions" such as weather mapping, traffic mapping, and hazard anticipation. Other sensors measure and report background noise level, particular sound patterns, radio traffic level, particular radio signals such as from Bluetooth beacons, and so forth. Sensors include photocells, radiation sensors, motion sensors, velocity sensors, accelerometers, jolt sensors, gyroscopic sensors, gesture sensors, gravitational sensors, heading sensors, magnetic sensors, compass sensors, clock sensors, switch open/closed sensors, vibration sensors, audio-pattern-detection sensors, vehicle-performance sensors, biological-agent sensors, biochemical-agent sensors, pollution sensors, chemical-agent sensors, temperature sensors, humidity sensors, windspeed sensors, pressure sensors, location sensors, proximity sensors, altitude sensors, smoke sensors, oxygen sensors, carbon-monoxide sensors, global-positioning-satellite sensors, relative-radio-signal-strength sensors, and radio-traffic sensors, for example. Sensors may be provided as packages having multiple sensors or individually. Sensors packages having audio sensors, such as a microphone or diaphragm, may include some level of acoustic-pattern-matching capability embedded in the sensor package. In some embodiments, a sensor is a combined 9-axis motion sensor and temperature sensor. In one preferred device, a sensor is an integrated package having an accelerometer, gyroscope, and magnetometer for each axis. In some instances, the sensor package is incorporated into a processor or an integrated circuit. Also contemplated are sensors for gases such as methane, CO, $CO_2$, NOX, CBD vehicle performance indicia, QR sensors, aerosol particulate levels, history of sub-zero temperature, history of product over-temperature, analytes such as chemical or biological substances, and the like. More generally some sensors can detect biological agents, biochemical agents, and/or chemical agents for example.

"Electronic heading sensors" are solid state devices that combine a 3-axis magnetometer with a 3-axis accelerometer and rate gyroscope that are integrated with a processor for establishing magnetic heading even when the magnetometer is not level with the horizon. The heading sensors may also report turns and tilts.

Sensors also include radio devices designed to detect radio traffic, such as a "ping" from a proximate radio device. Such sensors may detect received radio signal strength. Other sensors may be GPS sensors having a function of fixing a location in present time, and may by combined with other data such as by registering a radio contact, a sensor datum with a time stamp and a geostamp. Sensor or location data may be sent in real time without timestamp by the transmitting device, or may be recorded in a memory with a timestamp for later transmission. Sensor data may be stored in a rolling sensor data log.

Sensors may function as triggers when linked to an enabled machine having instructions for receiving and acting on a sensor output value, where the remote machine is linked to the sensor through a network having at least one node and at least one cloud host server, and where a conditional rule has been set up so that sensor data value(s) or trends may be logically evaluated, for example as greater or less than a threshold value defined by a rule and associated with a conditional executable function. Self-reporting of machine state, such as reporting a low battery level, is also included in the scope of contextual awareness supported by sensor data sensu lato. Preferred sensors are miniaturized so that they may be co-housed with the radio controller and encoder module and sensor activity is controlled to reduce power draw.

"Media" as used to store or transport information generally includes any media that can be accessed by a computing device. "Computer-readable media" may include computer storage media, wired and wireless communication media, or any combination thereof. Additionally, computer-readable media typically embodies computer-readable instructions, data structures, program modules, or other memory containing data. Data also may be stored or transmitted in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wireless media such as acoustic, radio frequency, infrared, and other wireless media, and wired media such as twisted pair, coaxial cable, fiber optics, wave guides, and other wired media.

"Remote machine"—may be what is termed here an "effector machine", indicating that the machine executes a physical transformation, such as a garage door opener, or what is termed here an "actuation device" more generally, indicating that the device may be a display for displaying content to a user/subscriber, or may be enabled to transmit or broadcast to other machines and to recruit other machines and devices to actuate performance of designated functions.

A "server" refers to a software engine or a computing machine on which that software engine runs, and provides a service or services to a client software program running on the same computer or on other computers distributed over a network. A client software program typically provides a user/subscriber interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud.

By installing what are called "applications" on a smart device, a developer can add functionality, and for example can supply an interactive display or graphical user interface (GUI) that permits the user/subscriber to navigate through and customize programmable features of a Bluetooth or XCB device that has been paired to a smart device, for example. In practice, an installable application can support a dashboard for easy access to all the XCB and BT radiotag devices operated by a user/subscriber, for quick adjustments to setup, and for viewing maps or plots of sensor data with trendlines and threshold monitoring that will result in automated actions taken by the system according to logic rules programmed by the user. The GUI typically may also provide any needed programming tools and support for creating conditional rules, geofence definitions, and other user customizations. The user interface may access a "user profile" stored locally or in a cloud host; the user profile may include user identifiers, radio unit identifiers, conditional rules programmed by a user, geofence definitions, and logs of sensor data uplinked from a radiotag.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example. The term "processor" includes, sensu lato microcontrollers (MCU), microprocessors and controllers, without limitation, as known to those skilled in the art.

General connection terms including, but not limited to "connected", "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation.

Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the embodiments may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure, referencing Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to" or "capable of".

"Conventional" refers to a term or method designating that which is known and commonly understood in the technology to which this invention relates.

It should be noted that the terms "may," "can," and "might" are used to indicate alternatives and optional features and only should be construed as a limitation if specifically included in the claims. The various components, features, steps, or embodiments thereof are all "preferred" whether or not specifically so indicated. Claims not including a specific limitation should not be construed to include that limitation. For example, the term "a" or "an" as used in the claims does not exclude a plurality.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

Dual-radio XCB devices function as portable radiotags, hubs, and sensors, and radio contact reporters with power management synergy. In a first embodiment, the devices include a cellular modem with cellular radio antenna and radio unit identifier (the cellular modem having a wake mode and at least one power-savings mode), a Bluetooth (BT) radio transceiver with antenna and radio unit identifier (the BT radio transceiver having a wake mode, at least one sleep mode, and an "always listening" standby mode); a processor and processor support circuitry. The processor support circuitry may include an alarm apparatus under control of the processor. The processor also has at least one wake mode and at least one sleep mode. Also included is a power supply with portable source of DC current. The device is further characterized in that following initialization, the cellular modem, the BT radio transceiver, and the processor are operably linked to the support circuitry and power supply, and are all configured to cycle to a sleep mode or standby mode as a low-power default condition. Generally, the processor is configured to cycle to a wake mode when one of (a) the cellular radio or (b) the BT radio detects a radio signal that carries one or more symbols or frames that satisfy the characteristics of a "qualified wake signal". A digital correlator may be use to match the pattern of the incoming digital radio signal to a repertoire of qualified wake signals.

FIG. 1 depicts a system 100 with XCB radiotag 10, cloud host(s) 1111,2400, reference hub 20, and smart device 30. Also shown is a BT radiotag 12. Device 10, illustrated here schematically, may be part of system 100 for tracking lost items, for collecting sensor data from a network of radiotags 10,12 and for enforcing safe zones independently or in conjunction with reference hub 20, for example.

Radiotag 10 and smart device 30 both have a BT radio and a cellular modem. Radiotag 12 and hub 20 have a BT radio. Reference hub 20 differs from radiotag 12, however, in that the BT radio of the hub is not power constrained and may transmit and receive at +4 dBm or higher, whereas radiotag 12 is frequently limited to +0 or −4 dBm maximum power to conserve battery, for example. In addition to BT radio, smart device 30 and reference hub 20 may have a WiFi connection or serial USB connection.

BT radiotag 12 transmits BT radio signals that may be received by any of the devices 10, 20, and 30. Device 12 may join a piconet with those BT devices 10, 20, 30 or with other BT devices, but is not able to form a radio link directly to a cloud server 1111 or cloud portal 2400. Data exchanges with the cloud may be transmitted from device 10 over a cellular connection 1. In other instances, data received from a BT piconet or other IoT sensor web may be collected over BT radio links 2, 4, 9 and then uplinked to cloud host 1111 via a wired connection 7 from hub 20 or via a BT connection 6 to a smart device 30, for example.

Device 10 differs from device 12 in several respects. Device 10 includes both cellular and BT radios; device 12 has only a BT radio. Both devices include microcontrollers or processors, but because device 10 has a cellular modem, it can connect directly via cellular radio to a cloud host 1111, shown here with a virtual private gateway 2400. This is defined as a CALL HOME 1, but in the interests of saving power, the cellular modem is used sparingly in tracking, locating, and uplinking data.

A CALL HOME need not be a voice call, the call may serve to get a location fix from the network, or update the system with current location and status of the device. And to, if needed, generate a notification to a user/subscriber 11 in which the notification is conditional on some aspect of the current status or location of device 10, as will be described below. Thus FIG. 1 provides a general overview of the emergent properties of hybrid networks combining BT and cellular devices in a 5G or LTE packeted network environment. A challenge for these devices is to define the logic controls that limit when the cellular modem is used and how the cellular power savings states eDRX, DRX and PSM are deployed. Advantageously, whereas BT connectivity is hit or miss in many areas, cellular connectivity is much more reliable and structured over large areas of the planet, a key consideration in designing a lost-and-found system 100.

Links 2, 4, 6, and 9 are enabled for BT signals (connected or extended advertising mode); links 1, 3, 5 are enabled for cellular connections. Link 7 is a link between reference hub 20 through a packet data network to cloud host 1111, as may be wired, wireless or a combination of both. Cloud links 1, 7, 8 are routed through the data packet environment of a 5G or LTE cellular network, through Ethernet connections, through WiFi, or other wireless or digital networks. Link 8 is a link between smartphone 30 through a packet data network to cloud host 1111, as may be wired, wireless or a combination of both. Device 10 may connect 3 via a cellular link to smart device 30 in one embodiment. Cellular links generally involve one or more cellular towers, base stations and other elements of a cellular telephonic network (not shown).

BT links to device 10 may be optimized using dynamic gain. In making a response to a qualified incoming BT signal, device 10 will assess the RSSI, (or other index of apparent "path loss" such as RCPI) of the incoming BT signal and can boost its transmit power (broadcast power) if the incoming signal is weak or intermittent. Conversely, device 10 can reduce its transmit power to save battery if the incoming BT signal from a linked transmitter is strong. A BT transducer operating in dynamic mode at a nominal 0 dBm can increase its transmit power to +4 dBm or +8 dBm if a received signal from a linked transmitter is weak, for example, and can decrease its transmit power to −4 dBm, or even −12 dBm if a received signal is strong, for example. In field use, a BT receiver may experience intermittent signal loss as the RSSI drops to a threshold of about −100 dBm or lower, for example. In order to restore a BT link or overcome edge effects, the BT transceiver can increase its transmit power temporarily, and send a message that includes TX POWER as a field in the payload packet. The receiving device can calculate path loss from the transmit power minus the received signal power, and can increase its transmission power to compensate. The Apple iBeacon, Eddystone, and other beacon formats include a native field with 8 bits for sending TX POWER, where TX POWER is defined as the nominal received power at 0 meters, in dBm, and the value ranges from −100 dBm to +20 dBm at a resolution of 1 dBm. The value is a signed 8-bit integer as specified by TX POWER LEVEL characteristic in the BT SEC Specifications. As a rule of thumb, the experimentally determined output as measured at 1-meter distance corresponds to the transmitted power minus 41 dBm. A software development kit (SDK) can be used to implement dynamic gain in BT beacons so as to reduce energy consumption, for example. The kit may include a library of path loss-versus-distance calculations based on known factors such as type of phone and environment (such as indoor versus outdoor) by which dynamic assignment of gain can be implemented.

Cloud services are provided by cloud host 1111, optionally in cooperation with virtual private gateway 2400. Cloud services can be accessed via cellular radio from device 10 or via smart device 30, represented here as a smartphone. The cloud host may serve as a repository for sensor data and user profiles, for example, and may have much greater resources for analytics than the portable devices.

Reference hub 20 may be in cloud communication via WiFi for example, and smart device 30 (here represented as a smartphone) has conventional connectivity by cellular and WiFi to the packet data environment of the World Wide Web, termed here a global area network (GAN). Smartphone connectivity through LTE-M and 5G networks is ubiquitous and of interest here is the capacity to form internodes 10 having both cellular and BT network links.

Signals received on the BT radio may cause the cellular modem to be activated when context dictates the need for a CALL HOME 1 to establish a location fix and to communicate status to a cloud host 1111,2400 or user equipment 30. In other instances, an eDRX cycle at 2.5 min intervals or a PSM cycle at 10 min intervals may be feasible within the energy budget of the XCB device' battery, but in most instances, further limits are needed to achieve a useful field life as defined by a battery size and discharge.

The cellular radio is packaged as a modem that stores the cellular network connectivity and synchronization data including IMEI and ISMI data. By combining the two radios in one device, the main disadvantage of cellular power saving mode (that the radio is unresponsive in sleep mode) is overcome because BT radios have a "flickering" standby mode that is "always listening" (FIG. 8A) for other radio contacts at low power even when the rest of the device 10 is in deep sleep.

The hybrid radio networks enabled by use of devices 10 and 20 result in other emergent properties of system 100. For example, the virtual geofence 21 (dashed box) formed around reference hub 20 may be stationary and may be a radio tether: a repeating broadcast that defines a stationary radio geofence.

As a basic tracking system 100 for finding lost objects and radiotagged items, aspects of the system that are relevant include: (a) BT radio proximity sensing functions and BT proximity locator services toolkit; (b) radio contact data collection, data entry and mapping functions, (c) network servers with relational database functions and some level of machine intelligence, (d) open access to global IP packet data networks, and (e) a cellular remote locator services toolkit. The systems may also include one or more private IP networks for providing virtual private gateway (VPN) functions. Synergy is manifested in a very particulate local network of BT radios capable of ad hoc piconets, micronets and local nets combined with the cellular networks that can span 2 miles or 20000 miles over transoceanic cables and satellite network links, for example.

In another embodiment the geofence may be mobile, and may define a mobile geofence or mobile "reference hub" that travels with owner/subscriber 11. In a mobile embodiment, device 10 may define a radio safe zone 21 that is a subdomain of the BT radio envelope of its BT transmitter, but the enforcement of the geofence is further enhanced by the added cellular connectivity when device 10 is functioning as a radiotag, such as for a pet collar, asset tag or embedded device. Mobile device 10, functioning as a radiotag, may be operated in cooperation with the cloud server 1111 or with smart device 30 to enforce a safe zone. A key capacity is the ability to turn on the cellular modem when the XCB device 10 is lost. The goal of any logic is to minimize any power loss by unnecessary cellular radio traffic, but to acquire or reactivate a cellular link if the radiotag is lost. In an ideal situation, the radiotag will know that it is lost before the owner does.

For example, when BT signals from reference hub 20 are used to define a radio safe zone 21, the loss or decay of the BT radio envelope (such as measured by RSSI) around a transmitter is an indication of increasing distance, and if the BT radio signal is lost, the device 10 may be configured to initiate a CALL HOME 1. Data reported to the cloud 1111 or to a virtual private gateway 2400 is used to assess the location of radiotag 10 and to issue notifications to an owner 11 of the tagged asset or to make other interventions if the location relative to the geofence is not in compliance with a rule programmed by the owner/subscriber. BT radio alone is not sufficient for establishing a location fix where local area BT radio traffic is absent.

As illustrated here, reference hub 20 may function as a mobile or stationary radio geofence. The hub 20 may include means for monitoring radio signals from radiotag 10, or vice versa, and may also monitor signals from radiotag 12 and from smartphone 30, for example. Hub 20, radiotag 10, and smartphone 30 may convey notifications, commands and data to and from compatible radio devices 10, 12, 20 and 30. In embodiments, the system 100 is configured so that any detection of a signal from any of radiotag devices 10,12 outside a designated "geofenced" area 21 will result in an alarm or a notification to a responsible party 11. If device 10 loses the signal from reference hub 20, it may be triggered to CALL HOME and to obtain its location independently using its cellular radio. BT radiotag 12, on the other hand, is dependent on system 100 to track its location. The relative proximity of device 10 and 12 can be estimated from the strength of the BT radio signals between the devices, and a rough position can be refined by triangulating BT signals between smartphone 30, the hub 20 and device 10, for example. Yet surprisingly, BT device 21 plays an important role in networks of this kind because its spread spectrum signal and those of other BT devices define a BT radio topology or envelope that enables power management of the cellular radio in device 10.

In other embodiments, reference hub 20 may be a conversational hub, such as the smart home hubs sold as Google Assistant, Echo Plus, Bixby, Siri or Alexa. The computing resources of the cloud have been interfaced with a speaker and microphone to create a voice interface for asking simple questions. These plug-in devices may have BT radios and in some instances can detect and even interface with radiotags 10, 12.

Radiotags 10 may be used in conjunction with BT radiotags 12 to keep track of things. Of themselves, autonomous ad hoc BT networks are unique for several reasons, a) because BT devices are small and are readily embedded in wearables, in things, or even organisms, b) because they are digital radios capable of energy-efficient radio communication at 0 dBm or less, and c) because the radio devices in the network are true peer-to-peer (P2P) networking tools in which one device can act as master in one or more networks while simultaneously acting as slave in multiple other networks. While initially developed for pairing accessories to cellphones (Ericsson Mobile, Stockholm), BT pico- and micronets have been discovered to have surprisingly useful emergent properties because they dispense with base stations and access points and spontaneously form autonomous FH-CDMA peer-to-peer (P2P) mesh networks. There is no single point at which transmission in a network can be disrupted. By hybridizing tracking devices with a combination of BT and cellular radios, yet another level of emergent properties is achieved.

The BT radios are entirely self-sufficient digital radios and can pick up BTLE transmissions from up to 1500 ft away. The cellular radios are native to cellular networks, and can quickly be located anywhere around the globe. Having both together provides a dramatic increase in search granularity, the cellular radio providing a general location and the BT radio permitting the owner of a lost article to activate a Bluetooth Proximity Locator Services Toolkit so as to locate the lost article by sight, sound, or feel, as will be described below.

To enable user programmability, the system 100 may include an application installable on smartphone 30. Lost-and-found services are achieved with one or more of radio devices 10, 12, 20 when used in combination with software installed by user 11 on a smart device 30 by user 11, for example. Related tracking functions are enhanced by the participation of a cloud host 1111 but in many cases, only radiotag 10 and an active hub 20 are needed to monitor asset location within a radio perimeter. In some instances, smartphone 30 can act as a hub. The software supplied to user 11, when installed on smartphone 30, functions to relay sensor data and radio contact reports to the cloud host, for example, and may also function to receive notifications sent to user equipment 30 and provide a user interface.

Also accessible using a smart device 30 are web pages that may include administrative tools for navigating through, managing, and customizing programmable features of a Bluetooth or dual radio device 10,12, and for selecting preferences, entering user information, updating or upgrading subscriptions to cloud services, and so forth. The smartphone need not be in a user's possession to be accessible by radio and many functions of a smartphone can be accessed while the device remains in the user's pocket.

The application generally supports a graphical user interface (GUI) configured to monitor, track or help locate one or more radiotagged assets such as keys, TV remotes, briefcases, wallets and other valuables. Devices 10 may also function independently to keep track of children and pets, and one can be placed in a car so that the car can be found if the user 11 is having a "senior moment" or is simply unsettled after a long day and doesn't remember where the car is parked. Device 10 may also establish a mobile safe zone when placed in a vehicle where access to WiFi is not available.

The cloud is capable, with permission, of controlling radiotags 10,12, for example by causing one to go into an alarm state as a convenience in locating a missing asset. But the opposite is also true, the radiotags can control functions of the smart devices 30. Functions such as taking a picture, responding to an email, sending a hug to a loved one, and indirect or direct control of remote machines, such as opening a garage door on the way home, starting the coffee pot from bed, turning off the alarm clock without getting up, and checking that all the doors in the house are closed and locked can be programmed into the system 100 with the radiotag(s) 10 as both a sensor and an actuator. In some instances the XCB radiotag will be embedded in the effector or remote machine.

Figure 2A:
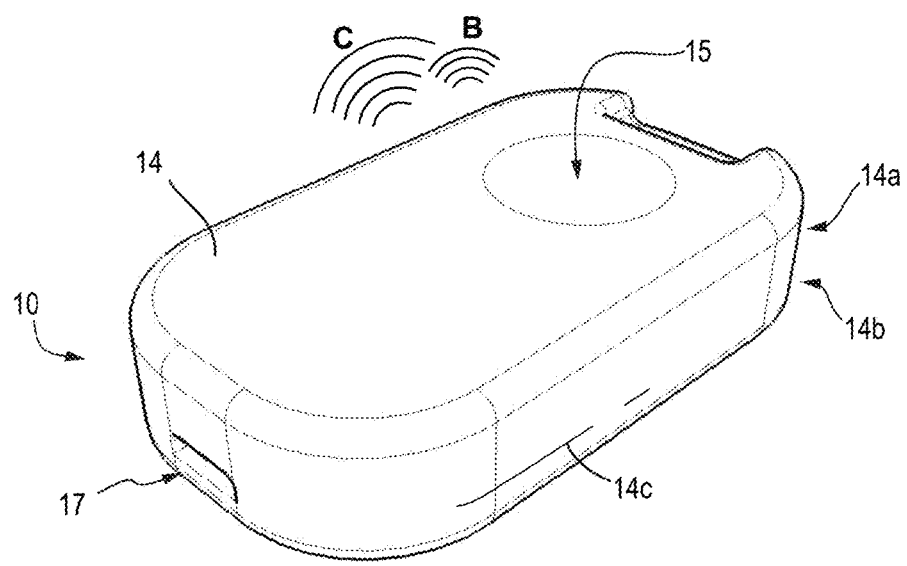
FIG. 2A is a sketch of a first device 10 containing a Bluetooth and a cellular modem pair with button switch on a keychain.

FIG. 2A is a sketch of a first dual-radio XCB device 10 containing a combination Bluetooth and a cellular modem. The device includes a radiolucent hard case 14, shown here with clamshell construction with upper case member 14a and lower case member 14b joined at seam 14c. Optionally a battery access port may be provided on an undersurface of the case 14, or in other embodiments the devices may be sealed and may be inductively rechargeable. A USB port 17 for recharging and data transfer is shown at the back lower end of the device.

XCB devices include a battery or mobile power supply and supporting circuitry as will be described below. The case includes a ring 16 (FIG. 2B) for receiving a lanyard or chain. One skilled in the art will readily appreciate that there are various ways of associating a radiotag with an asset in need of tracking or likely to get lost. Also shown is a button switch 15 formed on an upper surface of the case. The switch 15 may function as a "homing button" to cause the device to CALL HOME when the switch is depressed, as will be described below. These features are representative of radiotags that embody aspects of the invention but are not to be construed as limitations of the inventions as claimed.

In these drawings, signals from the radios are indicated by concentric arcs that connote electromagnetic waves, wider for cellular signals and narrower for BT radio signals.

Figure 2B:
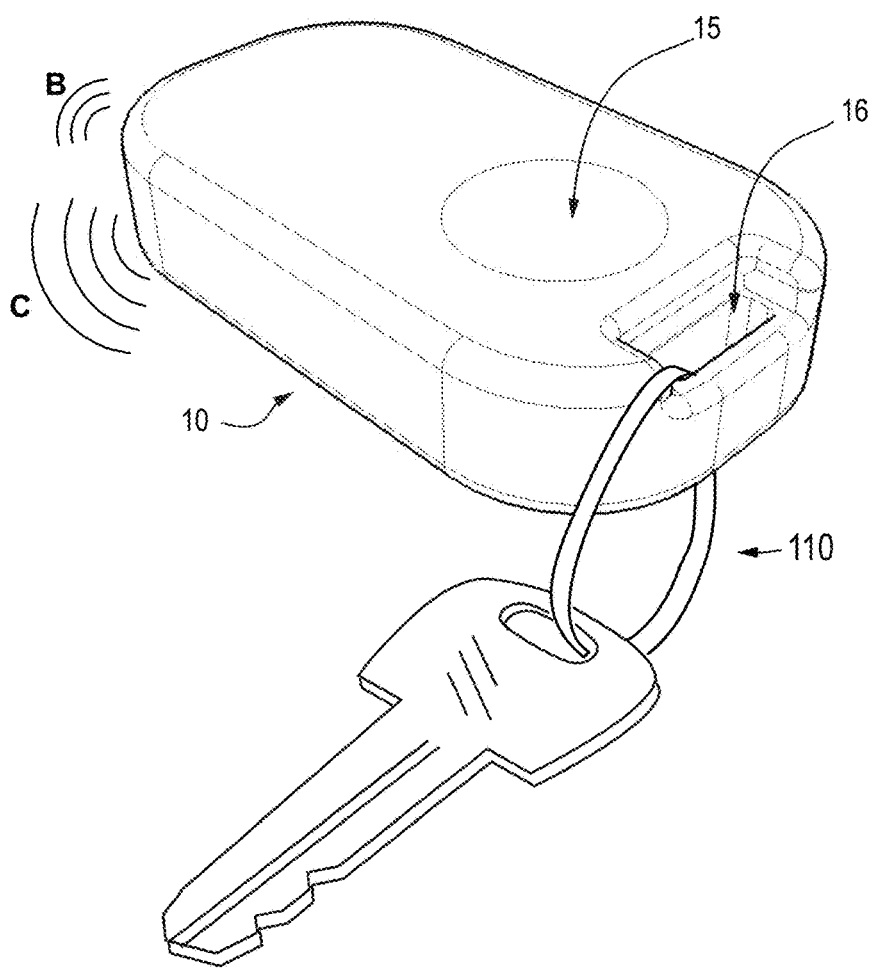
FIG. 2B is a perspective view of the tracking device with button and keychain.

FIG. 2B is a perspective view of first device 10 with keychain through lanyard 16. In these drawings, signals from the radios are indicated by concentric arcs that connote electromagnetic waves, wider for cellular radio signals C and narrower for BT radio signals B.

Figure 2C:
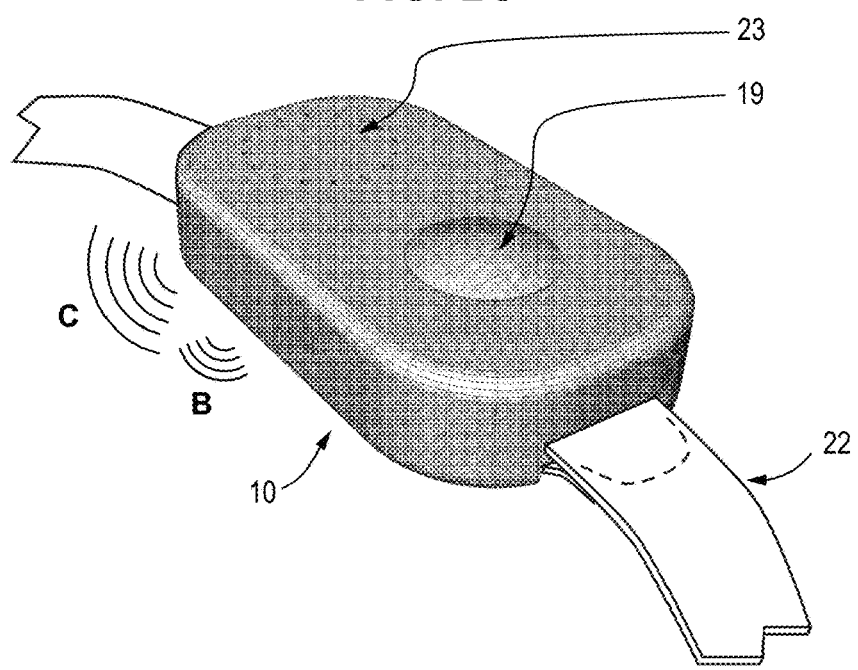
FIG. 2C is a sketch of a pet finder device 10 with collar for attaching to a pet. In these drawings, signals from the radios are indicated by concentric arcs that connote electromagnetic waves, wider for cellular radio signals C and narrower for BT radio signals B.

FIG. 2C is a sketch of a pet finder device 10 with mounting collar 22. Also included is a button switch 19 in the body and an optional speaker 23 and microphone.

Figure 3:
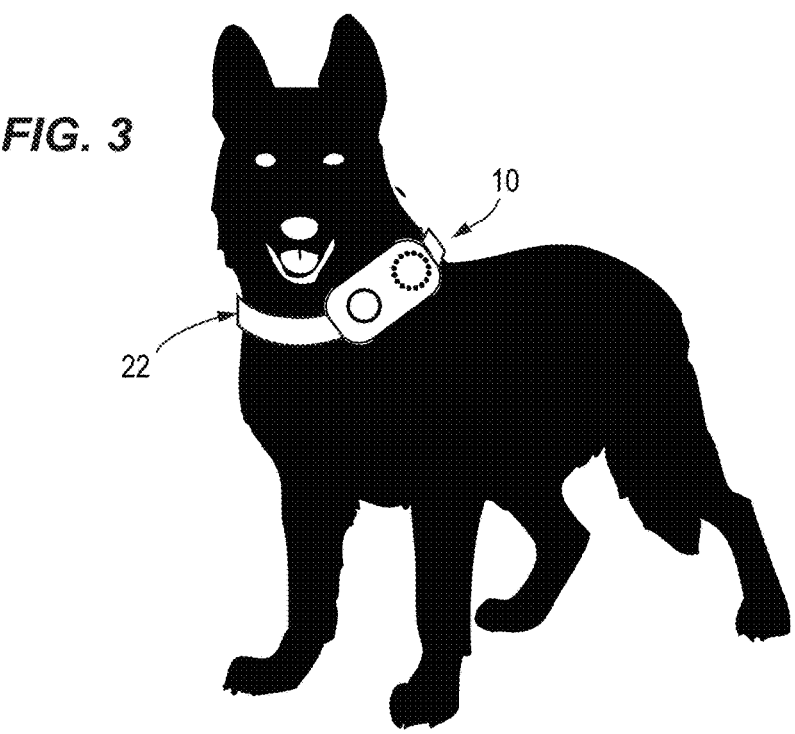
FIG. 3 is a view of a pet finder device with collar mounted on a pet.

FIG. 3 is a view of an pet finder device 10 with collar 31 mounted on a pet. The user interface can include button switches, LEDs and a buzzer or speaker, for example. The buzzer may be suitable as a hypersonic whistle for pet use.

Figure 4A:
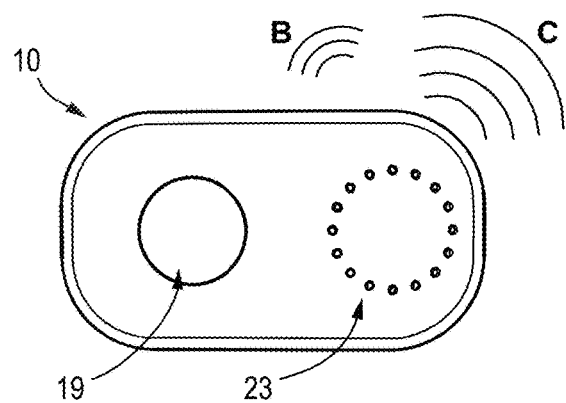
FIGS. 4A and 4B are front and back views of a pet finder.
Figure 4B:
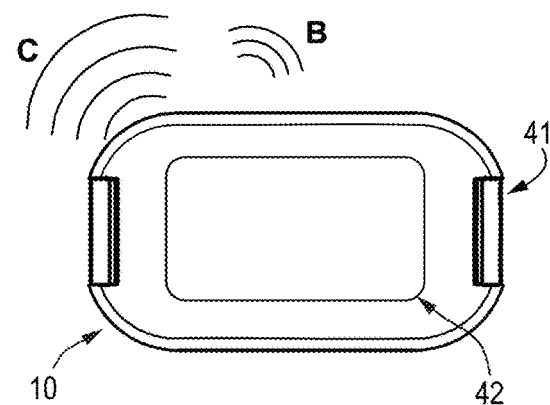

FIGS. 4A and 4B are front and back views of an XCB pet finder device 10. The device is operable on battery power and includes a battery access port 42. Optionally the device may include a USB recharging port or an inductive recharging circuit, for example. The device may include user interface elements selected from button 19, LED, speaker 23, or even a microphone. In this instance body form factor is adapted with end buckles 41 for attachment of a collar strap 22 as shown in FIG. 2C.

Figure 5:
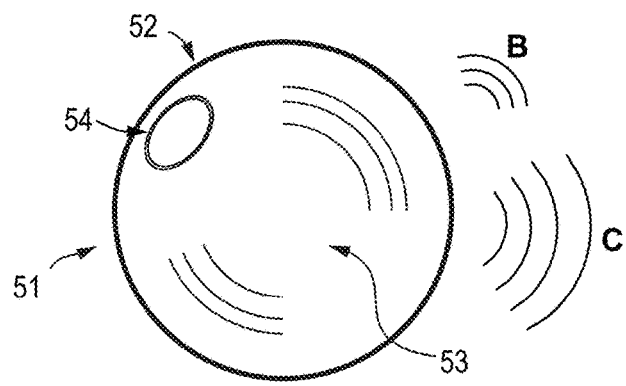
FIG. 5 is a view of a sealed pet finder device.

FIG. 5 is a view of an alternate device 51 operable on battery power. The device includes a sealed shell 52 and potted components for weatherproofing. Optionally, the battery can be rechargeable, such as by inductive recharging. The device may include a multifunction capacitive or diaphragm-type button switch (53, center surface), for example. A ring or hole 54 may be provided to simplify attachment.

In one embodiment, the button switch functions to trigger a CALL HOME when pressed. For example, a passerby, who is able to approach a lost dog, may press the button on a device 52 attached to a dog collar to activate a notification that goes out to the owner of the lost dog, and the notification may include an updated location, and optionally other forms of assistance in recovering the lost animal. Similar applications are readily apparent in managing lost children and assets generally, and will be described in more detail below.

Figure 6:
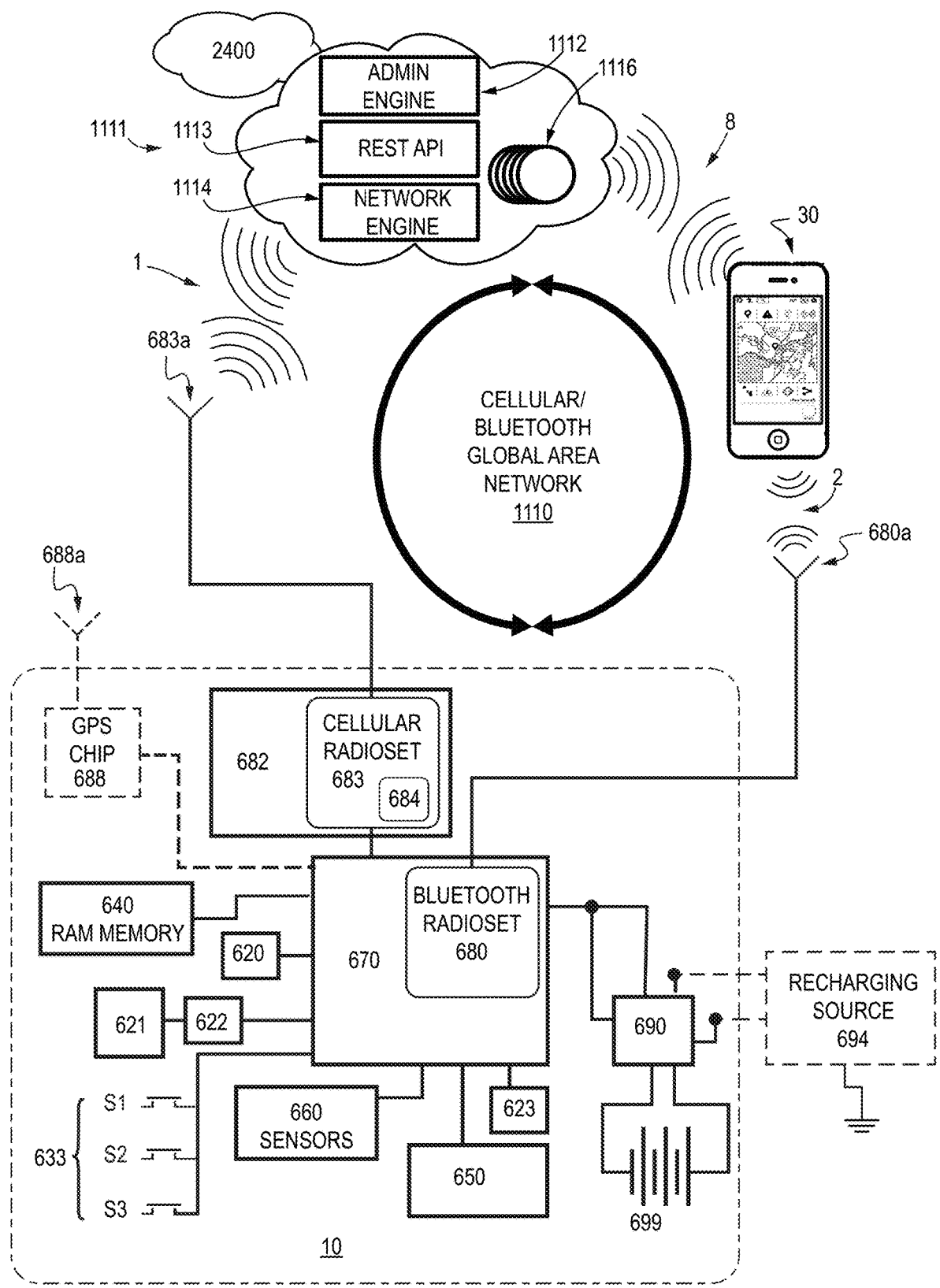
FIG. 6 is a network schematic showing a radio tag and cloud host(s) in a combined BT and cellular network.

FIG. 6 is a network schematic showing radiotag 10 and cloud host(s) in a combined BT and cellular network 1110.

Global area network (GAN, 1110) is built from a cellular network, a Bluetooth network, and a network of cloud hosts 1111. A single radiotag 10 and a single smartphone 30 are shown for simplicity but each layer of the network can include many radio units and computing machines.

The cloud host 1111, broadly, is a virtual network and may also include one or more virtual private gateways (VPG, 2400) with private IP addresses. In a preferred embodiment, CALL HOME traffic 1 addressed to a dedicated IP address is directed to the VPG. Use of private IP addresses with a VPG 2400 reduces the incidence of inadvertent, unauthorized, and network-incidental messaging that can drain battery life from portable device 10. We have found that unsolicited cellular radio traffic on a typical commercial network consumes an enormous amount of power, and use of a VPG is an effective solution (Yasukawa. 2019. Waking and Interacting with an IoT Device in eDRX Mode on Demand).

In one embodiment, the cloud administrative host uses an IP address to access the device 10 by the BT radio or the cellular modem, depending on which radio(s) are active. For security, the radiotag 10 may be operated as a cellular device accessible by an IP address on VPG 2400 to find and track the whereabouts of the device via a dedicated and secure 5G private network or gateway VPG. The cloud administrative host uses the IP address to access the device 10 by the BT radio or the cellular modem, depending on which radio(s) are active.

Data transfer occurs in a packet data network, and may conform to TCP/IP or UDP protocols. Data transfer by SMS messaging is also enabled. Data may include embedded AT commands to a cellular modem, for example, or the data may cause an XCB radiotag processor to generate an AT command to the cellular modem. Packets include a header and payload as known in the art.

Location data is of particular interest in a lost-and-found application. The device 10 may include one or more logic triggers that causes a cellular network connection request, direct or indirect, and the upload of data. We have termed this a CALL HOME 1. The trigger can be sensor data such as accelerometry or button data, a timer, or may be a trigger inherent in the topology of the physical web, for example. A direct upload of location data to the cloud host 1111 or VPG 2400 can be requested by the network or by the device 10, either when the cellular modem 682 executes or responds to a paging window call or when the BT radio 680 receives a cellular connection request via BT radio signal 2. At any time there is a BT connection with a piconet, in which there is a cellular-competent device 10 in the piconet, indirect uploads of data to the network may be executed over BT radio links 2.

In one embodiment, the SIM module 684 may serve to establish an exclusive private IP address for device 10. VPG network 2400 may collect location information periodically from cellular modem 682 to create a "trail of waypoints" of locations of device 10. A motion sensor 623 also improves the efficiency of the devices. For any given time period, if accelerometric data is detected that is characteristic of motion outside of an established safe zone, a position fix is requested and fulfilled over the cellular network, for example. The position fix is not repeated unless motion is again detected.

The cloud host also adds a layer of artificial intelligence. By supplying and aggregating data from sensor networks composed of devices 10, 12, 20, 30, dynamic control of cellular radio activity in the individual devices 10 is enabled. As internodes between cellular and BT mesh networks, devices 10 serve an important role in bridging connectivity over much larger areas, while also preserving the proximity and open intimacy that characterizes BT radio. The cloud host may be useful in storing data and preferences, in looking up device identifiers, in making notifications across the Internet, in making long distance connections, and in aggregating large amounts of sensor data. With increasing use of machine intelligence, aggregated sensor data in combination with geostamps and timestamps can be the source of valuable warnings and notifications addressed to particular user/subscribers or the community as a whole. The deployment of XCB devices 10 by a community results in emergent properties of a system that cannot be predicted from the sum of the individual parts. Synergy is immediately apparent in that location and sensor information can be uploaded directly to a cloud host via the cellular radio (when powered on) and at all times shared with local networks of Bluetooth devices via the BT radio set. Location data kept current in this way provides lost-and-found systems with the capacity to downregulate or upregulate location collection as a dynamic process that responds to variable levels of uncertainty in the system and consumer needs.

The cloud host server 1111 may include a REST API, for example. Once authenticated, the cellular modem 682 with radio 683 can uplink data to the cloud host 1111 and received commands and data. Using an API 1113, the cloud host parses sensor data, radio contact records, extracts relevant information, and combines that information to generate executable commands that may take the form of a notification, a warning, or an intervention. User programmable commands that are conditional on sensor data, location, time or other inputs may be stored in user profiles in database(s) 1116 and accessed at administrative engine 1112. Any notification or executable command is handled by the network engine 1114 and may involve one or more smart devices 30 or other remote machines as intermediaries, or may be delivered directly to the device 10 during a paging opportunity when the cellular modem 682 is receiving or directly to the device 10 in a BT signal via BT radio 680.

Cellular modem, 682 includes cellular radio 683, which is connected to antenna 683a. Modem 682 may be for example a Monarch LTE GM01Q (LTE-M/NB-IoT such as the SQN66430 SiP) or NBO1Q (NB-IoT) LGA module with integrated SIM platform (Sequans, Paris FR) for machine data exchange. Monarch SOCs such as the SQN3330 generally includes an integrated cellular RF front end, but not BT radio. Sequans modules typically support a variety of LTE bands for worldwide connectivity and consume less than 1 µA of power with PSM and eDRX modes and providing for batch data transmission in a centimeter-sized combination.

Generally, the information needed to authenticate to the cellular network is stored in a SIM unit 684 that is part of cellular modem 682 and can also be used for high quality encryption of data. Cellular networks are closed networks and connections are subject to higher authentication security administered by the network. All cellular radio devices are authenticated by IMEI and IMSI information contained in a SIM module, as known in the art. A dedicated frequency is used for coordinating the connection of user equipment (UE) to the network.

GPS chip 688 is shown with a separate antenna 688a. Antenna 680a is tuned for BT spread spectrum transmission and reception. Notifications may be received via either the BT radio 680 or the cellular radio 683, and may result in a display such as activation of speaker 621 via acoustic driver 622. Optionally, a microphone 620 is included so that responses to notifications can be sent. Both the BT radio and the cellular radio are capable of transmitting and receiving voice signals.

The processor 670 can be programmed, or otherwise configured, using software resident in ROM (such as EEPROM 650) or as firmware, or a combination of both software and firmware. MCU 670 includes a BT radio die as an SOC and the BT radio 680 is configured to transfer data and commands to and from the processor. The BT radio can control the power mode and sleep cycle of the processor. Exemplary BT chipsets for BT radio include the Nordic nRF52840 (Nordic Semiconductor, Portland Oreg.) with ARM® Cortex M-4 processor, the Dialog DA1468X family, Dialog Semiconductor, Reading UK) or the Texas Instruments CC1640r2F (Texas Instruments, Dallas Tex.) with low power sensor controller for IoT applications. Other BT chipset manufacturers include STMicroelectronics, On Semiconductor, U-Blox, Silicon Labs, Toshiba, Ankya, RDA, and Cypress (Infineon). CSR (Qualcomm), Broadcom (Belkin) and MediaTek dominate the supply of BT chips used in smartphones.

RAM 640 is provided for storage of volatile data, such as for data logging of sensor data. Sensor package 660 may include a single sensor or various combinations of sensors as a package. In some instances, one or more of the sensors are incorporated into the processor. The sensors may include an accelerometer 623.

The size of the RAM memory 640 is dependent on the size of the memory requirement for data (see below). Stored data may include data from sensors 660 and from switches 633. Data from throw- and button-press switches is considered data. Stored data may-also include radio contact records. The memory may be supplied as cache memory in the processor, or may include external RAM if data logging functions requires it.

Working memory may also include dedicated registers for handling packet composition and decomposition for example, for encryption keys, and so forth. BT and cellular radio signal buffers may be gated by the processor and may include registers for parsing commands and command parameters from datastreams. This memory is generally distinct from non-volatile read-only memory 650 for storing processor instructions. EEPROM memory registers may be supplied, or in some instances firmware or combinations of EEPROM and firmware are used.

To save power, the cellular modem 682 and the processor 670 may default to a power savings mode and it may be a BT radio signal (received on antenna 680*a* and conveyed to the processor by BT radio 680) containing a qualified wake signal that tasks the processor to initiate some routine that wakes up various higher functionalities of the circuitry of device 10.

These higher functionalities may include initiating an uplink or a tracking area update (TAU) via the cellular modem 682. In one illustrative embodiment, the cloud host sends a signal to the BT radio 680 via the BT radio of an intermediary device such as smartphone 30, and that signal will cause the cellular modem 682 to initiate a CALL HOME 1, for example, optionally bypassing smartphone 30. In this way, the cellular modem can kept in a dormant or semi-dormant state most of the time but retains the capacity to report to the network and to execute network commands with reduced latency in response to an override command. The cellular modem can minimize or at least manage the kinds of energy demands illustrated in FIG. 21, where an oscilloscope trace showing a power consumption cycle of a full TAU cellular radio event.

Surprisingly, the Bluecell radiotag is enabled to receive a cellular power management mode override signal (or related power management parameters) in a BT radio signal sent over a piconet or via link 8 to a compatible smart device 30 and therethrough 2 in a connected or connectionless data transfer to the BT radio 680. Alternatively, during a CALL HOME 1, the cellular network may make modifications to the default cellular power savings mode.

Sleep management can include a restricted schedule of cellular activity, for example in a DRX or eDRX mode (extended discontinuous reception cycle) in which the network management node and the user equipment pre-arrange discrete time intervals in which pages will be delivered. The receiving device wakes up to monitor for a paging event (physical downlink control channel) at discrete intervals (along the lines of what is described in US Pat. No. 10313085 to Namboodiri and PCT Pat. Publ. Nos. WO2017065671 to Siomina).

During an eDRX event, the cellular receiver is active and linked to the network so as to receive a page. Reception is an active process and may involve transmission of signal quality responses or command acknowledgements. Configurable parameters of eDRX include Paging Time Window (PTW), HSFN (system hyperframe numbering) and eDRX cycle length duration. The eDRX updates the clock synchronization. In a paging window, new commands can be received as a downlink, but generally an eDRX goes by without the need for an uplink of data in a paging opportunity. In modified eDRX, the initial paging window becomes a connection for data uplink so that a cellular location fix by the network PoLTE service or an equivalent can be completed. The device then returns to sleep or idle mode unless other paging instructions are sent. eDRX parameters are established during at ATTACH and TAU data transfer in the initial connection request or in subsequent updates to TAU. By these adaptations, eDRX can become a routine process of acquiring and storing a series of locations or waypoints, each with a timestamp.

Wake up in eDRX can be modified in response to a PDCCH page with a RCC-compatible request for location assistance. The network location assistance request (LAR) involves sending a snippet of signals captured from a plurality of cellular base stations back to the network, generally about 30 Kbytes in length, and receiving in return, a position fix with latitude and longitude from the network. In this way, network location fixes may be obtained every 5 min or 10 min, and there may be a TAU once an hour or three times an hour as required to maintain network synchronization and to balance network loading, for example.

During a tracking area update (TAU), if for example the device 10 has shifted out of a cellular tower coverage area, the cellular modem will lock on to a new tower with stronger signal to authenticate itself and renew its network connection at the new tower. Location data is updated during this "handover" process and will be stored in the memory of the host device or in a network database. The cloud host 1111 can be notified if device 10 is reallocated from one cell to another as it moves. Because this can occur when cell traffic is being levelled (i.e. by shifting users from a crowded cell base station onto an adjacent base station having lighter traffic) the cloud host can monitor the base station carrier channels in the network path to differentiate location changes that are traffic load driven versus changes initiated because the cellular modem 682 detected a stronger signal from an adjacent base station and elected to initiate a handover to the new system transmitter because it had been moved.

Once the cellular radio is on, then network-assisted location fixes on its transmissions may be performed automatically. When requested by the network, the device 10 may supply GPS coordinates or data to assist in AGPS, for example. The device may optionally include a Satnav radio 688 and antenna 688a with specialized processing module for calculating position from the timed signals of satellites in low earth orbit. Some cellular radio chips are provided with the accessory GPS radio integrated into the die. If needed, a network location assistance request (LAR) can seed a Satnav positioning calculation by the onboard GPS chip so as to reduce time and energy for making the calculations. A device energy budget may be used to balance the relative need for Satnav positioning calculations versus network-assisted LAR position data and may be configured according to user specifications or modified on the fly by commands sent from the network. The network can use PoLTE, AGPS to assist in device GPS calculations.

BT radiobeacons or hubs having known fixed locations can also be used to refine location, particularly in indoor environments. Google supplies Eddystone and a Proximity Beacon REST API that allows users to register a beacon with location (Lat/Long) and indoor floor level, for example, which is wiredly used to geotag commercial establishments and places of interest as a physical web. Reference hubs 20 may also function as "lighthouse radiobeacons" in broadcasting position information.

Uploads of location data stored in memory 640 may be executed from time to time. A direct upload can also be requested by the network or by the device, either when the cellular modem 682 executes a paging window call or when the BT radio 680 receives a cellular connection request. During a BT connection with a piconet, in which there is a cellular-competent device in the piconet, indirect uploads of data may be executed over BT channels. A powerful set of tools for location-directed network services emerges by combining a Cellular Remote Locator Services Toolkit and a Bluetooth Proximity Locator Services Toolkit, as will be described below.

The device may be rechargeable from an optional recharging source 694. Battery 699 may be disposable or rechargeable via circuit 690. Other energy harvesting means known in the art may be used to extend the operating lifetime of the device beyond that offered by one full battery charge and a switching regulator may be used to manage power to the processor and radios.

Figure 7A:
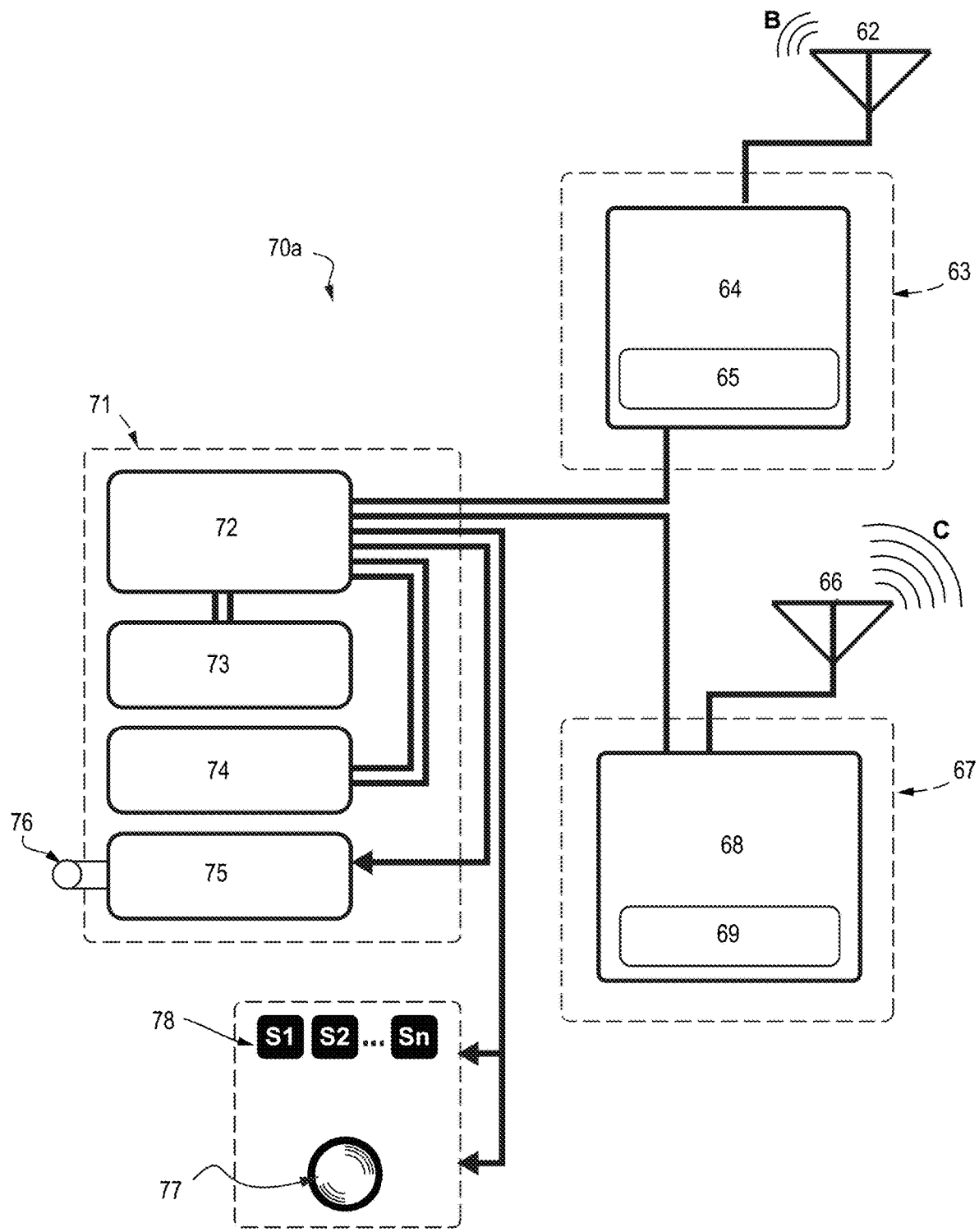
FIGS. 7A, 7B, and 7C are schematics of alternate dual-radio device embodiments.
Figure 7B:
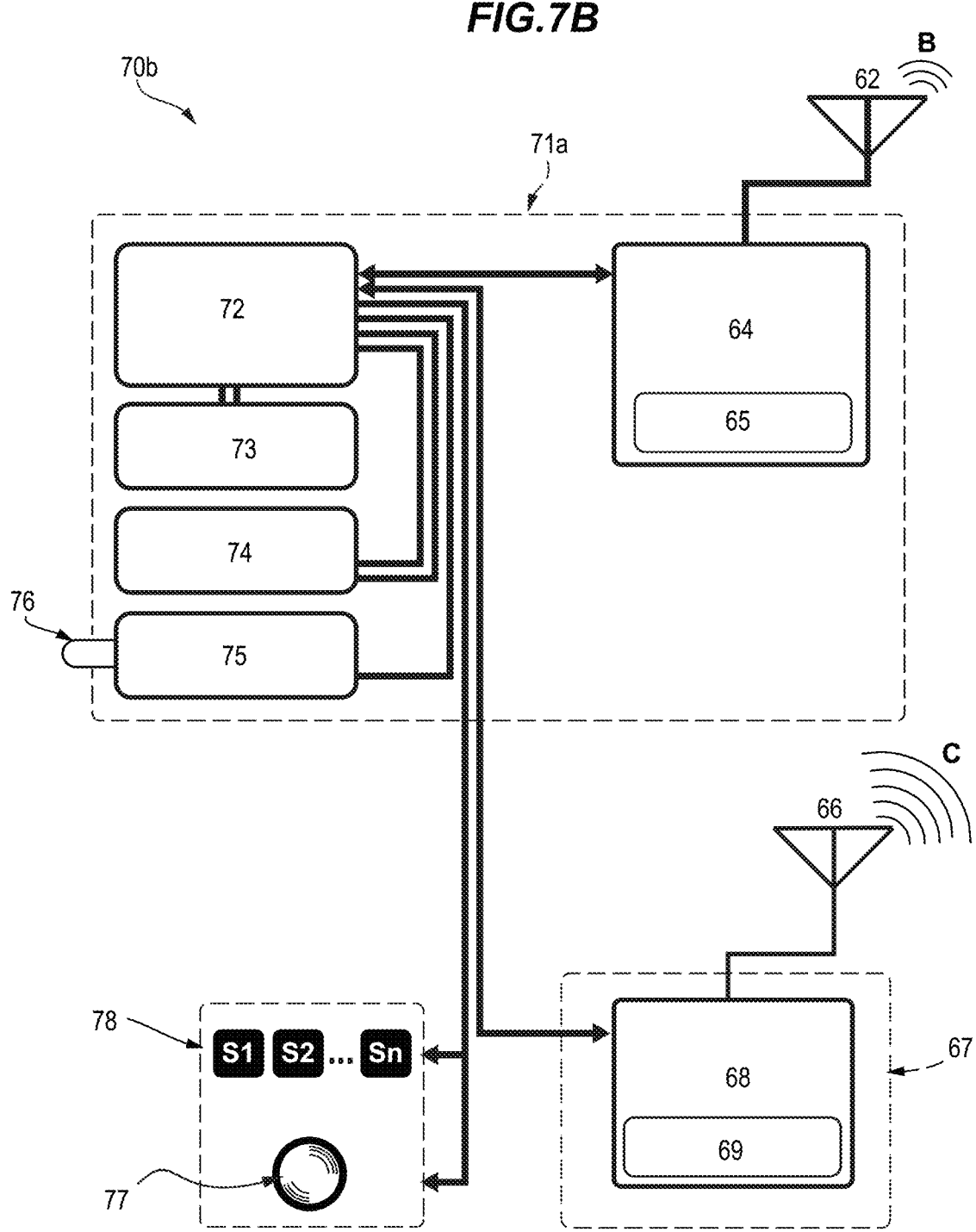
Figure 7C:
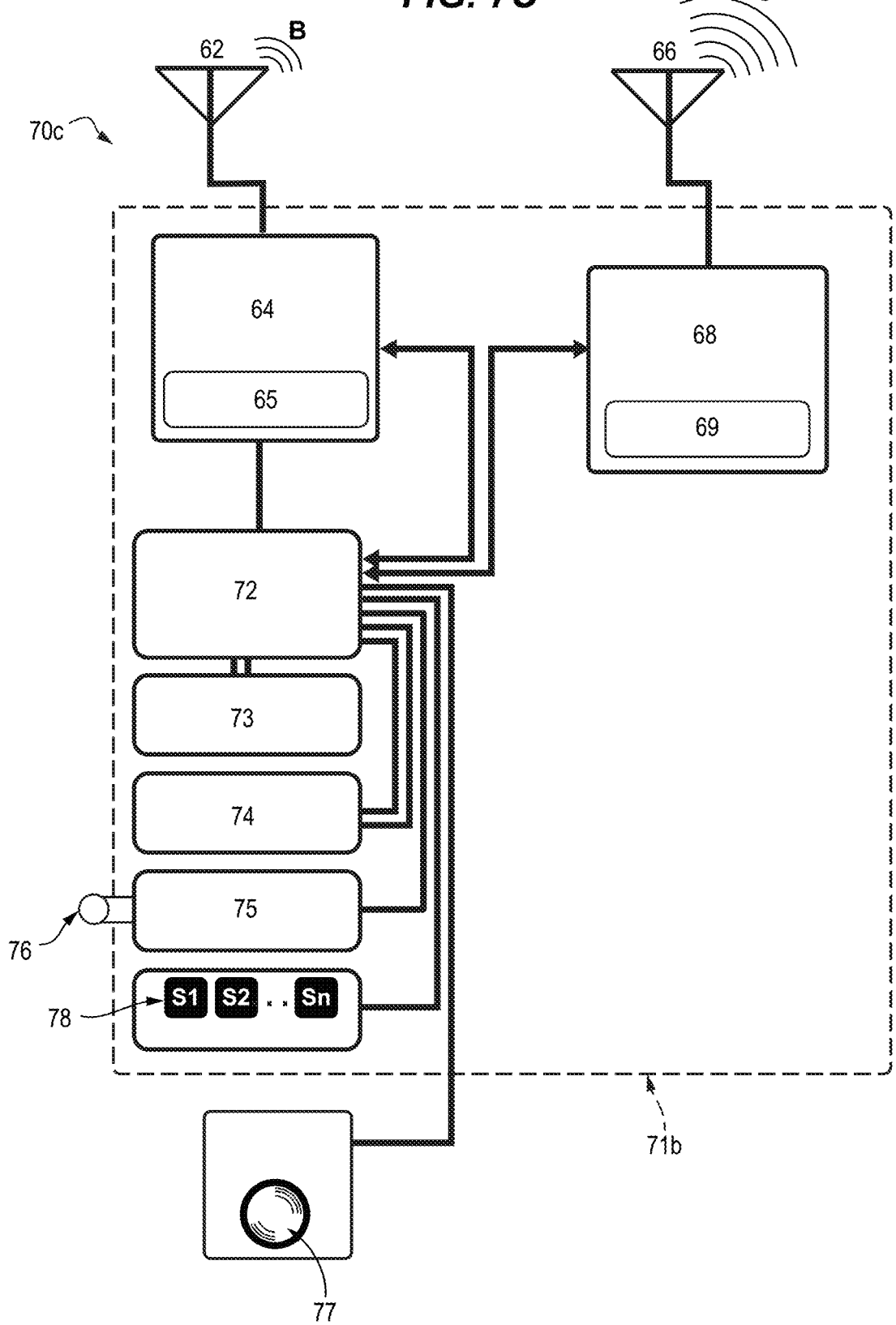

FIGS. 7A, 7B, and 7C are schematics of alternate dual-radio device embodiments. Radiotags of this kind can be attached to various assets or to pets, for example, and may also be worn or carried by children in need of cloud-based locating and tracking services. The devices are characterized by a functional combination of two radios: (A) a Bluetooth radio operable with low power for extended battery life in portable use; (B) a cellular radio in a modem that is connectable to LTE and 5G cellular network. The two radios work cooperatively to connect to ad hoc local mesh networks characteristic of Bluetooth and to the cellular basestations (eNodeB) of cellular telephone networks.

FIG. 7A is a schematic of a first device 70a having separate cellular modem 68 and BT radio unit 63 that share control and are linked to a single processor 72 and supporting circuitry. The processor assembly 71 includes ROM 73 and RAM 74. In some instances the processor instructions are not supplied by software but instead are hardcoded into an array of logic gates within the processor.

The unit is battery powered. Digital radio may be by frequency (GFSK) or phase (DPSK) modulation of a carrier baseband. The device includes two antennae, one 62 for the BT radio at about 2.45 GHz and one 66 for the cellular radio at LTE bands. The antennae may be printed on the circuit board in some instances, but may extend from the board as by bayonet mounts and are secured to or embedded in faces of the housing members, which are generally made of a radiolucent material.

BT core 63 is a low energy processor and includes basic computing functionality for executing programming as well as the capacity to compose, broadcast, receive and decompose digital packets. The BT core has a unique feature that allows an external "wake up" command in the form of a "qualified wake signal" can bring it up to full power. By activating the BT core, the entire device 70a, or selected parts of the device, can be selectively activated. Even if the cellular radio is turned off to conserve energy, it can be activated by signaling the BT core 63. The "always listening" mode is awake, but other parts of the BT core and processor are in standby or are asleep and internal BT radio power management circuitry wakes up accessory functions only when needed and only long enough to complete an assigned function before being put back to sleep mode. This aggressive power saving mode is responsible for the very long battery life of these tiny devices.

The BT radio component 64 is generally a transceiver. As per the BT Specification, the transceiver can be operated in PASSIVE mode, listening only, or in ACTIVE mode, in which the device is discoverable and will respond to INQUIRIES and PAGES so as to make connections or pair with other like BLE radios. The BT radio can also operate in an advertising beacon mode with repetitive transmission while remaining not connectable. Both BT radios 63 and cellular modem 67 have more than one wake or sleep level. Each wake state has an inherent energy draw as will be discussed with reference to FIG. 8A below.

Each radio includes at least one radio unit identifier (RUI). The BT radio 63 includes a BT core 64 and memory 65 containing a EUID assigned by the manufacturer, for example. A derivative of the EUID or BD_ADDR unique radio identifier may be transmitted with broadcasts in INQUIRY mode. The cellular modem 67 includes radio 68 closely linked to a SIM (69, subscription identifier module). The SIM is a microprocessor-based chip that generates an IMSI (international mobile subscription identifier) that is required to register the device on any cellular network. In some instances the SIM is a card inserted into a Molex connector for example. The SIM may be a nano-SIM, but in other embodiments the SIM is an eSIM (embedded SIM) that is integrated into the circuit board and is not removable. Future SIM units may be software based, but all rely on the use of 128-bit keys to authenticate the device. The manufacturer's IMEI (international mobile equipment identifier) may also be used for security. The cellular radio generally includes a modem.

The processor 72 may be a microprocessor or microcontroller and may include a co-processor or graphics processors. The processor is a solid-state digital device that can be programmed, or otherwise configured, using software resident in ROM 73 or as firmware, or a combination of both software and firmware.

The master processor 72 can delegate BT radio control to the BT unit 63 to save energy. The BT radio 64 can cycle to a standby "passive listening" mode, a unique feature that allows an external "wake up" signal to bring it up to full power almost instantly. By activating the BT core 64, the entire device can be activated. Parts of BT radio that are not in use are in standby or are asleep, and accessory functions are activated only when needed and only long enough to complete an assigned function before being put back to sleep mode. "Always listening" mode is like a flickering candle—with very low reception latency. This aggressive power saving mode is responsible for the very long battery life of these tiny devices.

Flash memory 74 is provided to store data, including sensor outputs and history of radio contacts, including any timestamps and location stamps. An alarm apparatus 75 with LED 76 is used for locating the radiotag when at close range as part of the Bluetooth Proximity Locator Services Toolkit. The alarm apparatus may include a speaker that can be actuated to attract attention and/or a buzzer that vibrates.

Switch 77 and sensor module 78 are peripherals that attach to or are surface mounted on circuit boards carrying the chips. The button switch 77 has multiple functions such as in actuating processor commands. A sensor or package of sensors 78 may be included. A motion sensor is typically provided because the information that a radiotag is moving or stationary is often relevant to whether it is lost or needs to initiate a CALL HOME.

FIG. 7B is a view of an alternate device 70b. The device schematic is similar to that of FIG. 7A, but includes a higher level of circuit integration. Microcontroller assembly 71a is an ASIC or SOC with controller 72, BT radio 64 and cache memory 65 for storing the radio RUI. Integration of a particular processor and radio components is partly a matter of convenience but is also useful in miniaturizing the tracking device. As shown here, the processor assembly includes ROM 73, RAM 74, and an alarm apparatus 75 with surface-mounted LED 76. The cellular modem 67 with radio 68 and SIM 69 is packaged separately. The interface components, including sensors 78 and button switch 77 for manual actuation of some commands, are separate units so as to be mounted through or on a housing instead of on a circuit board.

FIG. 7C is a schematic of another embodiment of a device 70c, this one having an ASIC 71b that includes a fully integrated combination of both radios 64,68, at least one processor 72, including supporting circuitry 73, 74, 75. The cellular radio includes a SIM module 69. The BT radio includes a radio unit ID cache 65. A sensor package 78 is also integrated into the ASIC. Again this is useful in miniaturization. Two antennae 62,66 are provided separately as shown, but may also be integrated into the chip. A button switch 77 is wired separately to the processor.

The integration shown in FIG. 7C is a higher level of integration than currently practiced. According to current practice, the cellular radio is a fully integrated modem 67 with basic MCU included. AT commands may be sent to the modem to control cellular activity, but a great deal of the cellular activity is controlled as part of the network connection 1. FIG. 7C may be interpreted as a synthetic radio pair within an ASIC, in which the integrated processor functions as a modem.

Figure 8A:
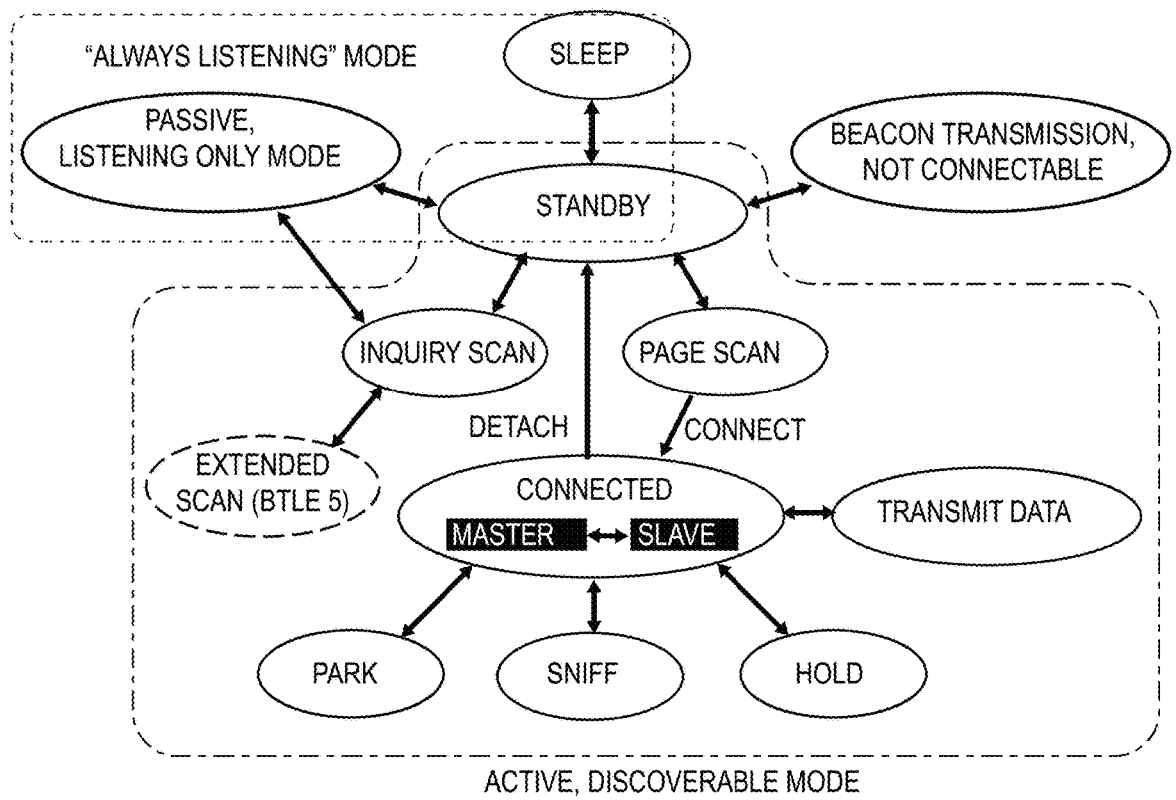
FIG. 8A is a view of power states of a BT radio showing multiple sleep and standby states with functional modularization of power consumption. An "always listening" state is defined.

FIG. 8A is a view of power states of a BT radio showing multiple sleep and standby states with functional modularization of power consumption. The states correspond to the BT protocol stack. The lowest level of functionality of a BT radio is a sleep mode running with low power clock only. To approximate an "always listening" radio mode, a minimal STANDBY state alternates in rapid succession with a "PASSIVE LISTENING ONLY" mode, in which the radio will receive Bluetooth radio signal traffic and may forward received signals to the processor, but does not transmit responses or solicit inquiries. In this PASSIVE mode, the device is unresponsive while listening for and recording non-specific radio contacts and may not be discoverable. By adjusting the STANDBY-LISTENING ONLY duty cycle, a very low energy, low latency system can be achieved that meets performance goals in most respects for an "always listening radio" (ALR) and "wake up radio" (WUR). The latency is almost not perceptible to the user, and the radios are readily able to resume the connected state in a familiar piconet without user attention or intervention, for example, by transitioning from STANDBY to CONNECTED in a few quick steps.

A discoverable Bluetooth radio may be configured to listen for (i.e., SCAN) and to respond to PAGE and INQUIRY signals from other units. These energy states correspond to "INQUIRY SCAN" and "PAGE SCAN". In ACTIVE listening, the device will recognize and respond to inquiries and pages that include a recognized access code. A PAGE is a radio signal that initiates a connection. The radio unit that receives the page responds in a way (by sending a FSH packet) that leads to a formal CONNECTED mode between the receiving and transmitting radio units. In CONNECTED mode there are two substates: MASTER and SLAVE, which for any two devices are interchangeable.

Bluetooth radio is notable for its robust resistance to interference and dropped connections, and has been widely adopted. The BTLE radio protocol standard is attractive than BT Classic and BTDM protocols because of its low energy consumption. Advantageously, controllers with integrated BT radio cores operating at 1.8V are readily available. A BT radio in standby "always listening" mode may burn less than 30 uAh power while retaining the capacity to wake up the processor and accessory circuitry from deep sleep in response to a radio command from a smartphone or a reference hub or in response to sensor data, and thus supports portable applications for IoT use. Channel listening without response participation consumes only 0.3 mA at parts of the duty cycle when the receiver is on. In standby between listening periods, power consumption drops to less than 60 uA (Karjalainen O et al. A Comparison of Bluetooth Low Power Modes, 7th Intl Conf Telecomm. 2003. IEEE DOI: 10.1109/CONTEL.2003.176900). By controlling latency in a reasonable range, overall power consumption can average out as a sub-milliwatt load (while offering ALR continuously during extended remote deployment).

BT radios may also be operated in a BEACON TRANSMISSION mode, which is not connectable. The radio broadcasts a canned message at a regular interval and is unresponsive in this state to any radio responses or inquiry traffic. A baseline energy budget for a BT radio in not-connectable advertising mode may consume about 30 uAh assuming an intermittent transmit period of 20 ms, a transmit cycle of 2.5 sec, (i.e., 1440 transmits per hour), and a transmit power of 3.5 mA (0.3-30 mA depending on packet type and radio hardware). In some BT radiobeacons, the transmission duty cycle is adjustable. Transmit power and frequency may be configured according to the application, and with increasing miniaturization of chip architecture to 14, 10 or even 7 nm gate structures, total energy consumption continues to fall sharply, enabling increasingly longlasting IoT devices in packages using either disposable or rechargeable batteries.

Connected units establish a "pairing" relationship that anticipates the frequency hopping regime and any HOLD, SNIFF, or PARK timing. The BT baseband/link manager configures low power sleep and standby modes that separate active transmission and reception sessions.

Access codes define the specificity of the relationship between the units. These formalities are native to the Bluetooth specification, which has received an essentially global adoption as the BT standard for wireless devices ranging from headsets to keyboards to printers to thermostats, smoke alarms, coffee pots, and smart doorlocks to smartphones.

For example, a first BT device will send an INQUIRY packet 128 times in 1.28 seconds, each inquiry packet is sent in 16 time slots (10 ms, 625 us each) over two alternating sets of frequencies. The INQUIRY packet is short, just an inquiry access code. A second BT device, operating in an unsynchronized listening mode, intercepts one of these transmissions by coincidence (there are 79 possible frequencies, three of which are reserved as advertising frequencies in BTLE). The Baseband protocol causes each radio to use pseudorandom "frequency hops" to jump from frequency to frequency over the spread spectrum (U.S. Pat. No. 2,292, 387). A device that is in INQUIRY SCAN at some crossover hop will intercept a packet with an inquiry access code that it recognizes, or that it chooses to accept. The frequency hop protocol is inherent in the access code, and a device that accepts an access code can then join the hop sequence with the first device and can send an FHS response packet containing its hardware address and its clock so that the first device can specifically address it with further instructions, if permitted. The interaction may then rapidly be escalated to a PAGE and PAGE SCAN interaction, resulting in a CONNECTION that formally makes a piconet link in which the RUIs of the radios are stored in device memory. The piconet relationship defines one of the devices as a "center" device ("master") and the other device as a "peripheral" ("slave") for purposes of organizing the transmission and receive sequences. At the hardware level, these roles are interchangeable and are controllable by a master-slave switch.

A BT device can participate in two or more piconets as separated by time division multiplexing with millisecond separation. While more limited in the newer BTLE standards, in one embodiment, any BT device may belong to a hierarchy of piconets, in which its participation in a second piconet is alternated with its active participation in a first piconet.

The device in the central role scans for BT radio sources, looking for advertisements and inquiry responses. The device in the peripheral role advertises itself and offers a service. GATT server vs. GATT client determines how two devices talk to each other once they've established the connection. GATT metadata is transferred from server sensor node to client center node, for example.

To inquire about other radio units in a receiving area, BT radios may also promiscuously announce their presence to other BT devices by sending a general INQUIRY access code (0x9E8B33, GIAC). An ID Packet may be exchanged in response to a FHS packet. Access codes are classed as DAC, IAC and CAC, indicating Device Access Code, Inquiry Access Code, and Channel Access Code, respectively, the details of which relate to link management. All packets begin with the CAC, a DAC or IAC, and a clock number segment. A correlator identifies relevant packets for processing. BT devices acquire information about other local BT radios in this way.

In a piconet, using link management, devices that are parked or lose a pairing connection can ignore public traffic but will "wake up" (almost instantly) in response to a beacon signal from a familiar or "whitelisted" partner—so as to restore or recover a piconet connection. The listening device can also partially wake up its MCU so as to log any radio contacts, while not responding further.

Not all radio interchanges result in a CONNECTION, but the listening radio can record information about the transmission, and by escalating to INQUIRY SCAN without wasting time or energy, will receive more detailed information about the transmitting device.

Bluetooth Core Specification, Version 5.2 and Supplement, (2019, incorporated herein by reference), includes an "Extended Inquiry Response". Data types may be defined for such things as local name and supported services, information that otherwise would have to be obtained by establishing a CONNECTION. A device that receives a RUI and a list of supported services in an extended inquiry response does not have to connect to do a remote name request and service search, thereby shortening the time to useful information reception. Backchannel communications facilitate the connectionless mode.

Figure 8B:
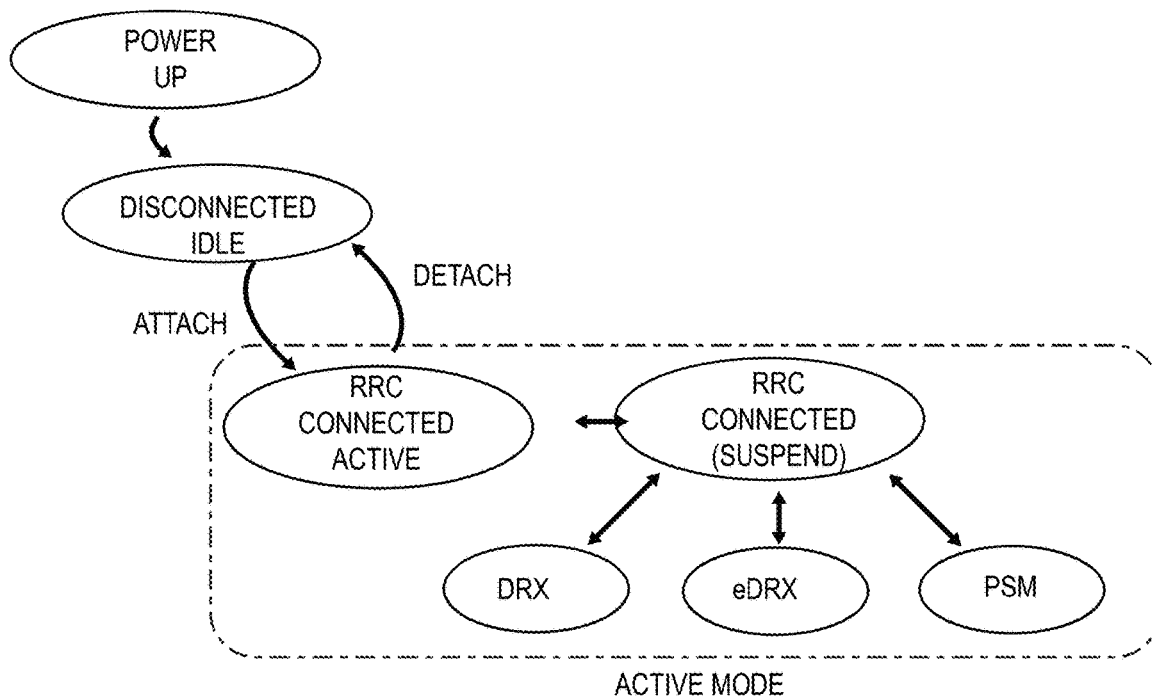
FIG. 8B is a view of power states of a cellular modem according to the 5G network standard.

Power states associated with 5G cellular network management are drawn in FIG. 8B. The energy states correspond to a Cellular radio packet environment protocol stack. ACTIVE/CONNECTED mode can include reduced power states. Power savings is achieved by reducing the duty cycle for the radio and associated processor (DRX, eDRX, PSM). These energy states are established by protocols set forth by network operators and by hardware features native to the devices; the UE and the network agree on a wake up schedule, i.e., a "duty cycle" with designated down time.

Following power up, the radio can exist in a low energy DISCONNECTED IDLE state until authenticated to a network. Once connected to a network, reduced power modes that do not include regular updates at frequent intervals are problematic in cellular radio. If the connection is lost and the device goes into low power disconnected idle, the user equipment (UE), without an assist, cannot be aroused from sleep or contacted by the network except during a designated "wake" period. In connected mode, the system implements only PSM as a standby condition. DRX and eDRX states operate on a reduced duty cycle in which the interval between network refresh windows cannot be extended indefinitely. If the network connection fails, the unit defaults back to DISCONNECTED IDLE and must initiate a new connection in order to be tracked by the network.

A Radio Resource Control (RRC) protocol controls the air Interface. The major functions of the RRC protocol include connection establishment and release functions, broadcast of system information, radio bearer establishment, reconfiguration and release, RRC connection mobility procedures, paging notification and release and power control. By means of signaling functions, the RRC configures the user and control planes according to the network status and allows for Radio Resource Management strategies to be implemented. The operation of the RRC is guided by a state machine which defines specific states of the UE relative to the network.

LTE power states have evolved with the introduction of 5G. In LTE, the EPS (evolved packet system) Connection Manager is in IDLE unless there is an active connection, whereas in 5G, the Connection Manager connects when the user equipment is attaching, and stays connected whether the connection is active or "suspended". In other words, the RRC is in DISCONNECTED IDLE or CONNECTED for LTE, and is INACTIVE or CONNECTED for 5G.

Standard cellular radios of smartphones may have signal strengths of 0.6 watts or 3 watts (for comparison, most Citizen Band radios transmit at 4 watts). Battery voltage is typically 3.8V. As a result, a typical transmission consumes 150 to 800 mA, not a trivial amount. Total current load on a smartphone in use ranges from 0.6 to 1.9 A, of which only 50 mA is related to WLAN radio draw. Other processes such as GPS calculations, processor boot and instruction set execution, camera imaging, capacitive screen sensors, and LED display lighting account for the remaining draw. LiPo batteries in Android smartphones may have a battery capacity of 3000 to 4000 mAh. Not surprisingly, most smartphone users find that the battery requires daily recharging, as would not be acceptable for a micro-sized device that is to be remotely deployed without access to a recharging dock for extended periods of time. As a consequence, a radiotag device for IoT use must find energy management solutions that surpass conventional cellular performance benchmarks.

In one embodiment, BT radio power states can be used to manage cellular low power states so as to implement a more robust standby condition. The BT radio core can actuate and adapt the cellular modem (and device processor(s)) according to more flexible rules that override the inflexible duty cycle that governs cellular extended sleep modes in conventional cellular modems. The BT radio can also control a CALL HOME event, which includes the initiation of a cellular Connection Request with network attachment if absent. In other words, the BT radio can assist in recovering from a cellular connection failure.

In our experience, in the devices 10, 70a, 70b, 70c and applications described here, about 4% (or less) of the energy of a typical cellular modem is needed—on the condition that cellular radio activity is throttled by the BT radio as described here. With stringent application of integrated power management, device field life on a single charge can approach one year. Power savings are achieved by selectively powering the cellular modem and controlling power to the processor according to the state of the BT radio, and by establishing qualifying radio signals that, when received, wake the processor. By using the BT STANDBY "always listening" mode to control the cellular modem, a "Wake up!" command may be executed so that the cellular modem of the device is activated to initiate a cellular network connection with a cloud administrative center on any available cellular network. The initiation of a cellular network connection is termed here as a "CALL HOME" 1.

Figure 9:
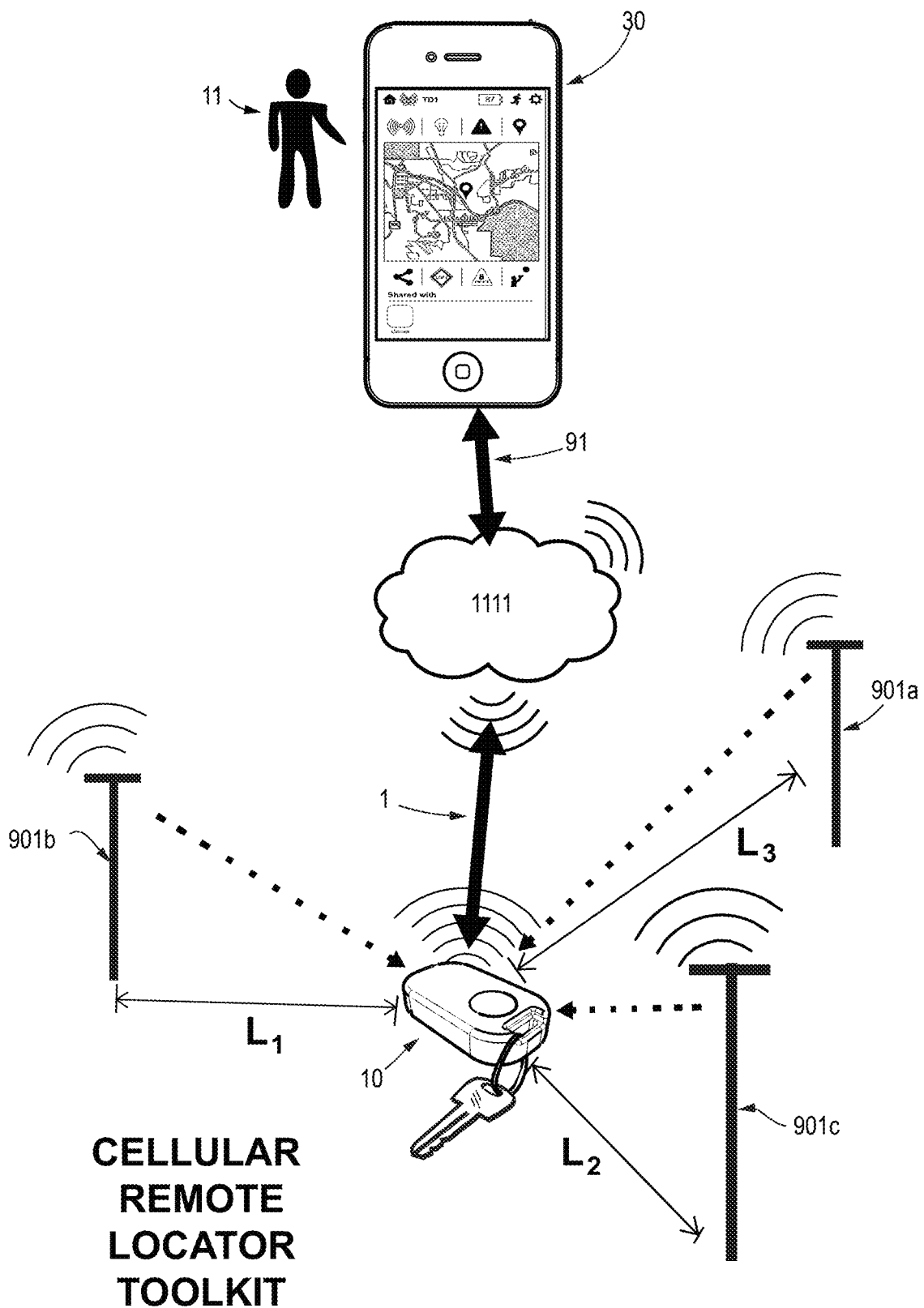
FIG. 9 and FIG. 10 are views comparing and contrasting BT and cellular localization strategies and define a CALL HOME. Depicted are a Bluetooth Proximity Locator Services Toolkit and a Cellular Remote Locator Services Toolkit.
Figure 10:
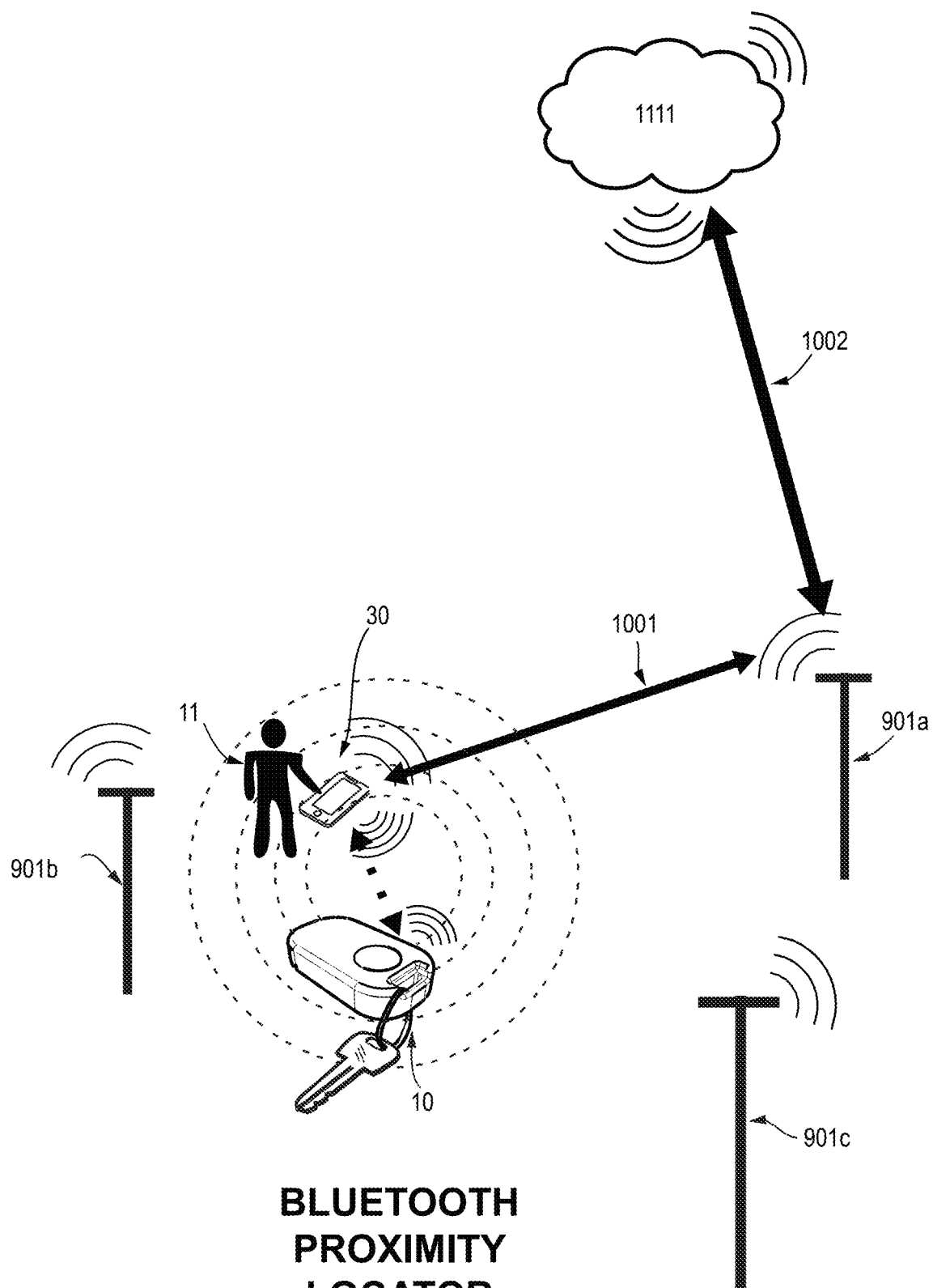

FIG. 9 and FIG. 10 are views comparing and contrasting cellular and BT localization strategies. Cellular location tools are termed a "Cellular Remote Locator Services Toolkit" and may include triangulation and network-assisted location services. The toolkit includes components of the radiotag with cooperative functional connections to a network or smart device that expand the user interface, display and analytical capabilities of the toolkit. The figure defines a CALL HOME 1. A CALL HOME generally includes a current location update and may require a TAU. In one instance, the cellular modem of radiotag 10 is awakened on a scheduled paging window or by a trigger and a network connection with a cloud host 1111 is refreshed or re-established. The device 10 may call home to report location, or may call home to obtain a location fix by POLTE, for example. Alternatively, location can be triangulated from cell towers 901a, 901b, 901c, or by GPS, for example. The location may be stored in a database on cloud host 1111 or may be stored in an internal memory of device 10, or both, for example. The current location fix will inform any notification 91 to a user 11 via smartphone 30. Once a network connection is established, the user/subscriber 11 has the option of adjusting the cellular radio power management and sleep settings, such as to continuous or more frequent updates so as assist in tracking and recovery of the radiotagged asset. Typically the software application or a cloud host can log and plot aggregated data to generate a map of where the radiotag is located. For example, if device 10 is outside a safe zone and is in motion without being accompanied in proximity to user 11, then the notification may include the current location with timestamp on a map displayable on the user's smartphone 30, and may even show a trail of waypoints over time if the device continues to move. The notification 91 may include more options for the user to respond or offers of further assistance. By switching the cellular radio to continuous operation, battery life will be shortened, but the option may be loss of the radiotagged asset, so having cellular tracking capacity is clearly an improvement over Bluetooth tracking alone, especially over longer distances of separation.

The Cellular Remote Locator Services Toolkit may also include a service for initiating a CALL HOME in response to output from an accelerometer or a electronic heading sensor, for example if there is an impact or the tagged asset is moving in a direction away from where it should be, circumstances that would warrant getting a current location update reported to the cloud host and perhaps a notification to the owner/subscriber. The same Toolkit can be configured to report body temperature sensor output or temperature sensor output as can be useful in fever monitoring or cold chain tracking, for example. The radiotags can include memory for storing sensor data output so as to be useful for a wide range of specialized applications as will be described further below.

Cellular location fixes are less useful over very short distances, but the combination with BT in radiotag 10 offers an elegant solution that uses the best characteristics of both radios, combining the Cellular Remote Locator Services Toolkit and the Bluetooth Proximity Locator Services Toolkits.

FIG. 10 depicts Bluetooth radio locating capability. This is a short-range function and uses radio proximity determinations to zero in on the location of a lost asset. We term this functionality the Bluetooth Proximity Locator Services Toolkit. In this instance, the Bluetooth radio of user handset 30 listens for surrounding BT radio traffic and identifies a received signal strength (RSSI) of each BT radio signal. The signal strength is an approximation of proximity within a range of a few feet to a few hundred feet. Bluetooth radio antennae are not generally directional, so RSSI is indicative of a radius around a BT radio signal source, shown here centered on radiotag 10. As the user 11 gets closer, the signal strength increases and the location of the source of the signal is more obvious. The signals of BT radiotags are distinguishable by their RUIs, and in one embodiment, a user 11 who is searching for a lost item can open a user interface on smartphone 30, and by pressing a device-specific icon on the interface, cause a particular radiotag to emit a beep or flash so that its location is revealed to the senses, even if partially concealed. The command is transmitted in a BT signal to the radiotag.

Bluetooth range finding may be initiated at distances of 300 to 500 ft in some conditions, but proximity tracking is strongest within 20-40 yards, and for longer distances, the cellular tracking techniques discussed with respect to FIG. 8A may be more effective. For comparison, commercially available GPS, by itself, is accurate only to 20-30 yards. Thus, the light, speaker and buzzer of an alarm apparatus that can be activated when the user is within sight or hearing of the radiotag is more effective than GPS alone. The cellular and BT tracking systems of FIGS. 8A and 8B are complementary in geolocating a missing asset, child or pet; a missing radiotag can be located via cellular triangulation at a long distance, and then when the user is in BT radio proximity, the user can actuate a beeper or LED on the radiotag 10.

As described in U.S. Pat. Nos. 9,392,404, 9,892,626, and 1,050,281, any happenstance discovery of a BT radio signals by a smartphone belonging to a community of users (13, FIG. 13A) can also result in recovery of a lost item. Briefly, smartphones may be configured to report BT radio signals and RUIs to a cloud host, and by matching the RUI to a user profile, the cloud host can generate a notification to the owner 11. A map can be displayed in which the map coordinates are obtained from the system and an icon displaying an approximate position of the radiotag.

Advantageously, the transient BT radio contact between a community smartphone and a wayward radiotag 10 can also result in actuation of the cellular modem of the radiotag. A report 1001,1002 transmitted to the cloud host via cellular tower 901a brings the cloud resources of the system to bear on recovering the lost asset. When the cloud host receives a report of a signal matching the identifier of a lost radiotag, the system can generate a command to turn on its cellular modem, and can send that command 91 (FIG. 9) to the radiotag via the community smartphone 31, as described in FIGS. 13A and 13B below.

The Bluetooth Proximity Locator Services toolkit includes components of the radiotag and cooperative functional connections to a network or smart device that expand the user interface, display and analytical capabilities of the toolkit.

The Bluetooth Proximity Locator Services Toolkit may also include a service for initiating a CALL HOME in response to sensor data output. For example, an impact as sensed by an accelerometer can cause the Bluetooth radio core to broadcast an undirected Bluetooth advertisement for help, and to activate the cellular modem. A Bluetooth proximity monitoring system can cause the cellular modem to uplink data if another Bluetooth device breeches a proximity threshold mandated for communicable disease mitigation. The same toolbox can cause a CALL HOME if a Bluetooth radio tether is lost or fluctuates. The BT toolbox can include a dynamic gain adjust and can transmit a TX POWER index in its messages. By assessing received signal and transmitted signal power, a path loss can be calculated. The radiotag can increase transmit power if needed to recover a lost or intermittent radio tether, for example. The BT toolbox can also include memory for storing and white-listing radio contacts, such as members of a familiar piconet, and can prepare radio contact records of familiar and unfamiliar radio contacts as part of a snapshot of the surrounding BT radio environment to assist in location-related services. The radiotags can include memory for storing sensor data output so as to be useful for a wide range of specialized applications as will be described further below.

FIG. 11 is a general flow chart of a method 1100 for operating location management services with an economy of power consumption. In the analysis, a radiotag 10 is operated with a companion handset 30 and an application for executing the algorithm 1100 is assumed to be installed in computer-readable media on the handset. The analysis is directed at correctly identifying scenarios in which a location fix is needed and the cellular modem should CALL HOME.

Generally, any monitoring of location begins with a memory that associates an initial "location fix" in memory with a timestamp at time T=0. This memory may not be in the device 10, but may instead be stored at a higher network level, for example in a smartphone 30 or in a cloud server 1111. Generally, the initial location of the radiotag and the smartphone are assumed to be in close proximity, as during setup, or in the morning of a workday when both items are where they are supposed to be. At time T=0, the location of the smartphone can be taken as a proxy for the location of the radiotag and no further location fix by the radiotag is needed. Updating the location of the smartphone is a routine matter and is not an issue. The more pertinent question 1101 is whether to get a location fix by activating the cellular modem of the radiotag 10. While it may be desirable to have a current location for the radiotag at all times, from a power management standpoint in a portable device, this is not practical. Getting a location fix consumes power.

The decision tree for whether or not to get an updated cellular location fix for the radiotag at a future time T=T+t, where t is an interval selected based on predictive accuracy, can be made so that unnecessary location fixes are avoided by attention to a) initial location, b) the presence or absence of defined safe zones, c) data related to accelerometry of the radiotag and the smartphone, and d) any recent change in relative proximity of the radiotag and smartphone.

In a first approach, the location fix at time T=0 can be classified 1102 as whether the location is inside a "Safe Zone", where a safe zone is user defined as a space in which order is maintained and things are where they are supposed to be. By using radio-delimited safe zones, a YES or NO answer can be given to the question of whether a radiotag is inside or outside the safe zone. If the radiotag device is "tethered" to a reference hub or a smartphone by a radio signal that defines and anchors the safe zone, then the need to actually get a new location fix may not be urgent unless the tether is broken and lost or is intermittently broken. If the radiotag is not in a safe zone, then it may be necessary to get an updated location fix, but only if conditions are met that merit the energy consumption. Outside a safe zone, there is no simple assurance that something will stay where it is supposed to be.

A device that has moved cannot be assumed to have remained in its established location. If device 10 includes an accelerometer 623, then the simplest sensor output can be a MOTION truth value, TRUE or FALSE. Because the smartphone also has an accelerometer, a Truth Table can be constructed 1103 comparing motion truth values for the radiotag versus the smartphone. The quality of motion (e.g., hard vs soft acceleration), the speed, duration, and the direction are also useful, but the simplest and most economical bit of information from the sensor is whether motion has occurred or not.

If neither the radiotag nor the smartphone have moved 1104, then the radiotag can continue to SLEEP.

If motion of the radiotag has not occurred 1105, but the smartphone has moved, and the radiotag is not in a safe zone, then it may be appropriate to generate, by the smartphone, a LEFT BEHIND alert, and to actuate the cellular modem of the radiotag for a CALL HOME so that its current location can be tracked and the owner/subscriber can be notified. In some instances, however, smartphone motion may occur that is incidental to normal activity, and the LEFT BEHIND alert is reserved for situations in which the radio tether link is lost or about to be lost. A radiotag that has not moved, but loses its radio tether to a smartphone, may CALL HOME to cause a LEFT BEHIND alert to be sent to the smartphone if the radiotag is not in a safe zone 1105.

If motion of the radiotag has occurred 1103 at time T=T+t (i.e., after an elapsed ΔT, where the time interval is programmable), then it may be useful to look 1106 for a change in proximity. Over a range of several hundred feet, RSSI is a first approximation of distance between the radiotag and the smartphone. The proximity may be increasing or decreasing. Proximity is measure by Bluetooth radios as part of core competencies of BT radio and the smartphone will continuously monitor the RSSI of the radiotag signal as part of routine operations.

If there is no change in proximity, then any motion signal 1103 may be spurious and would not necessitate a need for a new location fix. Proximity will continue to be monitored. Similarly, an increase in proximity (strengthening RSSI 1109) is intuitively not likely to indicate a risk of loss of signal, and the algorithm 1100 can be looped to continue to monitor for motion and proximity.

But a fading or intermittent RSSI 1108, as indicates decreasing proximity and increasing separation, could be followed by a break in the radio tether, and for a tracked asset, may necessitate an immediate CALL HOME to get a new location fix and to generate a LOST or LEFT BEHIND alert notification to an interested party. The LOST alert generally occurs if a motion mismatch was detected between the motion of the smartphone and the radiotag, and the LEFT BEHIND alert occurs if there was not motion of the radiotag but the smartphone was in motion.

The logic of the method helps to distinguish between conditions that necessitate expenditure of energy versus conditions that permit resumption or continuation of a resting sleep or standby state. Under ordinary conditions, a sleep state would not be interrupted to CALL HOME unless there was a pattern of motion and/or a change in radio proximity.

Exceptions could be made if the motion data is more granular, for example a hard impact could merit a CALL HOME with status report even if proximity data is unchanged. And it may be appropriate to maintain an awake cellular network connection if Bluetooth radio proximity measurement is no longer possible because the signal has been lost, even if there is no motion.

The time interval ΔT for iterations of the method 1100 may be adjusted according to conditions. For example, in a safe zone, infrequent execution of the loop may be unnecessary. An interrupt flag on the processor can be set against the accelerometer output. Iterations can be more frequent if the motion activity is greater. Outside a safe zone, the loop may be executed more frequently, and the timing can be dependent on the nature of the motion input, on temperature or on a change in temperature, on changes in acoustic patterns, or on changes in Bluetooth radio traffic patterns, for example.

Similar information can be obtained from other sensors. For example, a temperature sensor may provide evidence that a device has moved from a room temperature environment to an outdoor environment. A compass, Gsensor, or gyroscopic sensor output can suggest a change in attitude (or altitude). Acoustic information collected by a microphone may also suggest a transition from one environment to another. Motion sensor data can be collected and transmitted as described in U.S. Pat. Nos. 9,961,523 and 10,638,401 without added length of the BT radio message format, for example, and similar packaging can be used to transmit other sensor outputs.

FIG. 12 demonstrates sequential use of Bluetooth and cellular radios as a proximity tracker in a hybrid Bluetooth/cellular wireless system 1110 for monitoring radiotagged assets, here a "lost keys" scenario. Here radiotag 10 is shown attached to a keychain 110, and the scenario is one in which the keys are dropped by an owner 11 while enroute to an appointment. In the sequence of snapshots of FIG. 12, as the owner 11 walks, companion device 30 monitors signals from the radiotag 10. This data may be shared with a cloud host 1111 in sequential transmissions 1231, 1232, 1233. Initially, all is well, but the owner drops the keychain at 1234, and does not realize the keys have been lost.

System 1110 can detect the drop of the keychain in several ways. There may be a loss of the BT signal, but before that, from accelerometer and motion sensor data, the system can infer that the owner is walking ahead without the keychain because motion of the radiotag has stopped even though the owner has kept walking. The system flags the spot 1234 as the last known location of radiotag 10 and recognizing the illogic of the motion sensor data or other indicia of disorder, issues a notification 1235 and causes an alarm such as a bell or a vibrator on the owner's handset 30.

Devices 10 may use a multi-axis accelerometer 623 to detect movement and velocity of the device, a useful bit of information in understanding what is happening to the device. Is it being moved? Has it fallen still? Answers to these questions can be of great help in knowing where to look for a lost device and systems for generating accompanying alerts and notifications that provide motion sensor data are described for example in U.S. Pat. Nos. 9,564,774, 9,774,410, 9,900,119, 9,961,523, U.S. patent application Ser. No. 15/959,250, and US Pat. Pubs. 2015/0356862, 20150356858, and 20180190103, wherein all said patents and applications are co-assigned at this filing and are incorporated herein in full by reference.

The owner may realize the problem within a few seconds and go back to retrieve the keys, but if not the system 1110 continues to intervene. If the owner becomes so far separated that Bluetooth connectivity is about to be lost, as evidenced by a weakening RSSI, then the device 10, lying on the ground, will wake up its cellular radio and begin broadcasting an alarm 1236 at cell tower 901d that is relayed 1237 to the cloud host 1111. When the owner finally realizes he has lost his keys, he may activate a screen on his handset 30 and is guided by a map display back to the spot 1234 where the keys were lost. When in radio proximity, the owner can use the BT Proximity Locator Toolkit on smartphone 30 to activate a beeper or light on the lost radiotag 10 and then search using hearing and sight.

Even if someone else picks up the keys, for example, and turns them in to the cashier at the nearest business from which the owner would have exited, the system 1110 will know that the keys have been moved and via the cellular radio can pinpoint the updated location where the keys are to be found.

The administrative server 1111,1112 (FIG. 6) keeps location data and can help the user/subscriber recover the keys even from across town or across the other side of the world. The system will not alarm unnecessarily, such as when the keys are in a safe place at home, but can help the user avoid getting locked out of the car. Thus some locations can be defined as safe locations so that if a radiotag device has not left the safe location, then the system will default to the less energy intensive Bluetooth Proximity Locator Services Toolkit and its finder application to execute a proximity search instead of activating the cellular modem.

Similarly, a user/subscriber can program radiotag 10 attached to a keychain 110 to automatically tag the location where he parks his car. For example, when the car has stopped moving and the owner has exited the car, accelerometric data is recognizable as characteristic of parking a car. Or a button press may be used. The radiotag sends this data to the companion handset 30, and a map pin is stored in memory that shows the location and the time the car was parked. The map pin will be updated if the car and driver moves again. It is a simple matter to call up this information if the owner has forgotten where his car is parked. And perhaps of equal value, the system can keep track of time on a parking meter, flag a warning when the time is almost up, and even contact an automated metering system operated by a city to add minutes when the owner is unable to tend the meter.

By incorporating cellular radio, the distances at which lost devices are retrievable is increased from tens of meters to tens or hundreds of kilometers. For example, a device that has been pilfered may show an unexpected burst of motion, resulting in an UNAUTHORIZED MOTION alarm, but mere notification is insufficient to result in its recovery. However, with a cellular connection activated, the device can CALL HOME 1 from wherever it ends up, and will provide a location where it can be recovered. In addition, the owner's friends and the community of user/subscribers can also watch for it. Any smartphone that detects the BT radiotag signal becomes a global finder for locating the lost item.

At any time BT connectivity is good and the companion smartphone 30 operated by a user/subscriber 11 is in BT radio proximity, the cellular modem of radiotag 10 may be kept in SLEEP mode to save energy. SLEEP mode will have features of PSM mode, for example (FIG. 8B). Alterations to PSM, DRX and eDRX modes can be triggered remotely using Bluetooth radio signals routed through a smart device or reference hub that is connected to the cloud, or when the cellular radio is AWAKE and receiving direct commands from a cellular radio network in a paging window. The cloud host can then immediately send a notification to the owner's smartphone 30, or if that opportunity is missed, the hard impact of the keychain when dropped can trigger actuation of the cellular modem of the radiotag, and the radiotag can make a CALL HOME 1, reporting its status and location to the cloud host. The cloud host then can command the radiotag to keep its cellular modem active while simultaneously notifying the owner.

Logic conditions in which the cellular modem is in SLEEP mode are those, for example, in which (a) the radiotag 10 is in a familiar "safe" location, such as at home or at an office, and not moving away from that location; or (b) is receiving a familiar BT radio tether signal from a hub or companion smartphone 30. Also, when accelerometry and motion sensing indicate that the device is stationary, the processor may shut down the cellular module until movement is detected. If movement is detected, the cellular wakes up to CALL HOME if at all, only according to a regular schedule, the periodicity of which is selected by the user or by the requirements of the network to keep the cellular device authenticated on the network.

Some logic rules for activating cellular modem may be based on RSSI. Other contextual information available to the cloud host or to the user's handset may be used to determine what if any added intervention is appropriate.

Figure 13B:
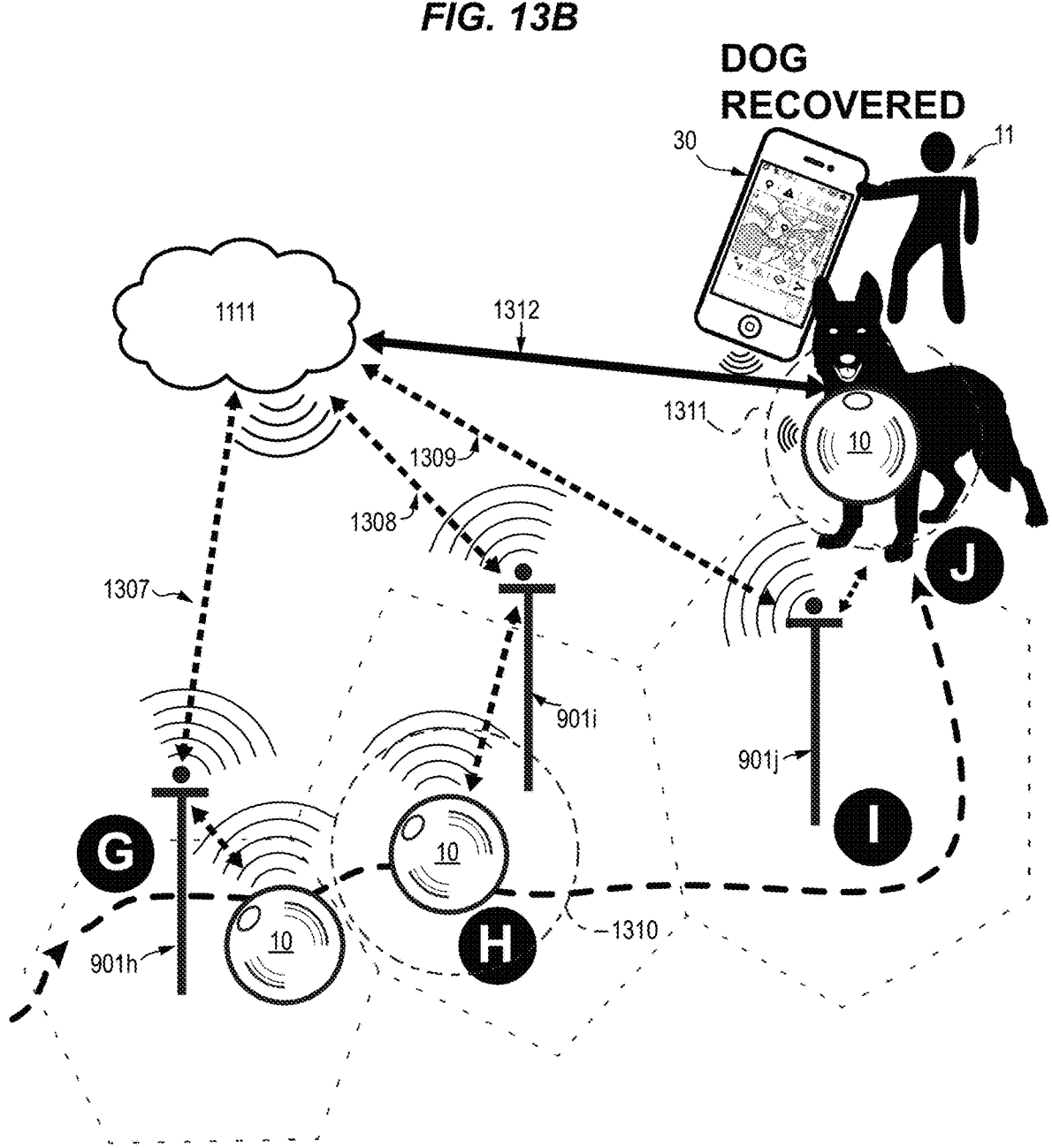

FIGS. 13A and 13B form a composite view that illustrates discovery and tracking system features in a "lost dog" scenario over an extended distance that includes several cellular towers (the distance being large enough that cooperative engagement of both the BT and the cellular radios is required to recover of the lost item). FIG. 13A illustrates a series of events that result in a cellular network connection and a location fix. FIG. 13B extends the concept of Bluetooth Proximity Tracking as a complement to cellular tracking.

Initially, at point A, the owner attaches a new radiotag 10 to the dog's collar, and installs "application" software in a companion smartphone 30 so that the radiotag RUI can be captured and the device set up for use. When setting up a new radiotag 10, a prudent owner will generally select eDRX and PSM settings to limit radio activity of the cellular modem to short periods or intervals. In contrast, the BT radio is typically set to "always listening" and will respond to BT radio commands from smartphone 30.

By way of illustration, the dog jumps the fence and runs off. By point B, the dog is lost. At this point, the cellular modem is asleep and the BT radio is listening but is out of range of the owner's smartphone 30. At C, the radiotag 10 is out of range of cell tower 901e, and even if it was in range, the cellular modem is in SLEEP mode and not available in a paging window. Because the cellular modem is programmed to be on and to CALL HOME only at certain intervals set up in eDRX or PSM, or if a cell tower is not available at the active time, the call will not go through, such as occurs at point C.

Something interesting happens at point D. The lost device 10 enters BT radio proximity to a compatible smartphone 31 carried by a community user 13, who is passing by. A Bluetooth discovery event occurs that allows the BT radio of the passerby's smartphone 31 to connect to the BT radio of device 10, and the passerby's smartphone sends transmission 1301 to cloud host 1111. The message 1301 contains the radio unit identifier of the lost radiotag, along with a timestamp and typically a geostamp.

Almost instantly, the cloud host server 1111 sends a command 1302 back to the lost device 10, commanding the cellular modem to wake up and CALL HOME. A network communications link is established. During the brief time in which the two devices 10,31 are in BT radio proximity, the cloud host will "borrow" time on the community device to send a BT command 1303 to the lost radiotag through cell tower 901f to smartphone 31; then using the BT radio of the community device 31 as a proxy for the owner 11. This can be an AT command sent to the cellular modem over the BT radio, for example. XCB radiotag 10 is preprogrammed to know how to make a CALL HOME and that information is stored with its SIM module. On receipt, radiotag 10 is configured to wake its cellular modem and override any cellular power management protocol.

Typically the network command to CALL HOME is queued for delivery while waiting for any first discovery of a lost radiotag so that it can be automatically and quickly initiated during any brief BT radio-mediated contact between any community device 31 and the lost radiotag 10. In this way any fleeting BT contact can be "leveraged" to power up the cellular radio location tools of the lost device 10.

Once the cellular modem is ACTIVE and CONNECTED to a network, it can receive direct cellular commands 1304 from the cloud host or from its owner via cell tower 901g. Almost simultaneously, (point E) the cloud host server 1111 notifies 1304 the owner 11 and displays a map location of the lost dog on the owner's handset 30. As instructed by the owner, who can now enter direct cell-to-cell radio messages, the lost device at point F is updating location on a more frequent schedule 1305,1306. The cellular radio of radiotag 10 is now ON and a handoff to a next cell tower 901h is a routine matter at point G, referring to FIG. 13B.

By points G and H, cell towers 901h and 901i have received and forwarded a series of waypoints to the cloud host in signals 1307,1308; this continues 1309 at cell tower 901j, so that the owner can map a trail of waypoints tracking the lost device through the series of cell towers and extrapolate where the dog is going. Dashed circle 1310 indicates an approximate cellular location fix at point H.

Each cell tower reports an updated location with timestamp and the cloud host updates a map for the user on handset 30 so that the user can estimate an intercept point to catch the lost dog. By the time the lost dog is at point I, the owner is waiting to intercept it at point J. For final tracking at point J, the owner will switch on the Bluetooth Proximity Tracking Tools on the handset 30. By doing a sweep, an increase signal strength may be detected. When closing in (dashed circle 1311), using the Bluetooth Proximity Locator Services Toolkit, the owner can send a command from the handset 30 to the radiotag 10 to launch an alarm state, causing a buzzer to go off. In one embodiment, the radiotag is configured to emit a dog whistle alternating with an audible tone that the dog has learned to obey. Even though the dog is in an alleyway, the owner can readily find it using the audible tone and the approximate position of the cellular location fix as shown on a streetmap of the area displayed on smartphone 30. On command from the Toolkit, an LED on the radiotag may also be illuminated to improve visibility if the alley is dark. Using these tools, the combination of network assisted location fixes and BT proximity radio commands, the dog is quickly re-united with the owner, even if the dog has strayed across town or into another State. Even though cellular coverage is spotty in some rural areas, if the owner can get close enough, BT radio is sufficient to know where to spot the dog.

More generally, in one embodiment, the tracking methods enabled by system 1101 in combination with radiotags 10 include receiving a message that identifies a transmission from a lost radiotag at cloud host 1111, the cloud host having an administrative server configured with an instruction set and an administrative database containing user profiles, such that the instruction set including instructions for: (i) parsing the message so as to extract the radio unit identifier (RUI), any sensor payload, and any associated timestamp, proximity measurement, or geostamp coded therein; (ii) then, based on the owner identification, sensor payload, and any contextual information associated therewith in a user profile, (iii) formulating a command or a notification, such that the command or notification is based on rules associated with the owner profile in an administrative database and any rules implemented by a system administrator on behalf of a community of members; and finally, (iv) transmitting the command or notification over a network to at least one smart device 30, to a remote machine 31, to a radiotag 10 or to a BT radiotag 12, or to any other actuable device.

In a variant on the lost dog method, the XCB radiotag 10 on the dog's collar can include a homing button, such that if the dog can be approached by a passerby, the passerby can press the button to initiate a CALL HOME. The radiotag has an IP Address and will contact a cloud server over a virtual private gateway to reduce unwanted radio traffic and prevent unauthorized location tracking. The cloud host will receive the dog's current location, and may even be able to patch through a live voice call between the owner and the dog, or the owner and the passerby, by which helpful reassurance and information can be exchanged. Such radiotags may include a speaker and microphone in a weather-resistant package if desired. Any voice call made via a packet data environment with a radiotag 10 necessarily will consume significant battery power, but if it leads to the pet's swift recovery, then the radiotag can be easily recharged or replaced.

While the illustration here relates to a lost pet, the same apparatus can log temperature information in a shipment from point A to point J, for example, or, illustrated in FIG. 23 by another example. The logged data can be periodically reported to cloud host 1111 during a scheduled CALL HOME or if the temperature of the shipment as sensed by the radiotag 10 crosses a threshold. Analogously, a button on the radiotag can elicit a CALL HOME to activate tracking, to alert the shipper that the shipment has been received, or to prepare a report that plots a temperature history for the shipment, for example.

In other embodiments, the method may include provision for transmitting a command such that a physical transformation will be achieved, for example opening a garage door, or rolling down a car window, where the owner is not in physical proximity and needs assistance in performing the action. The command to the plurality of remote machines or actuation devices may be a command to execute a machine action or to actuate a device.

The owner typically will preprogram the radiotag 10 with a duty cycle for the cellular radio set, setting wake/sleep duration and frequency, and any eDRX and PSM parameters, along with any geofencing and location suppression so as to reduce energy drain and activation of alarm features where none is needed. Alarms associated with motion patterns are used to further control unwanted activity. These preset features can be reprogrammed remotely; even if the device is lost.

Scheduling cell connectivity conserves power by setting rules that help reduce power loss. The device can be put to sleep for example, when it is safely at home (at a "home location" defined and fixed in memory). Or the sleep mode may kick in only at night, and the clock in the device will turn the device off at 10 PM and back on at 6 AM, for example. Alarms for specific geographical limits may also be preset, as will be described further below.

If the radiotagged asset not found promptly, then the owner can report the lost device 10 to a cloud administrative server, generally on a web page or user interface accessed through a smart device 30. Because the radiotag device is identified in the database by nickname, radio unit identifier (RUI) and/or IMSI, the server typically can analyze incoming radio traffic reports in real time and flag those reports that include the identifier(s) associated with the lost device. Because a timestamp and location are included with the incoming radio contact reports, the server can notify the owner and show a map locating the most recent contact or plot a series of contacts to extrapolate its location. The system assembles information to construct a preliminary location of the missing device. First contact enables the system to now use cellular communication and more powerful the more wide-ranging location tools of the cellular network(s). These can include AGPS, capture of actual GPS locations from nearby smartphones, triangulation from cell towers, advanced forward link trilateration (AFLT), POLTE, and use of community resources to identify radio landmarks associated with the first contact. A map is constructed and the system may present a detailed GUI to help the owner map and grasp the location information and take action to recover the device. Based on where the initial contact is, for example, the owner can send the information to friends who might be able to assist if the device has been left at a friend's house.

A strategy for finding the device is quite different if the missing device is stationary versus a device that is on the move. If stationary, the cloud host can assemble aggregate information to finalize a consensus location (the office, the grandparent's house, the doctors' office, the restaurant, and so forth). It is then up to the owner to go there and do a sweep using the Bluetooth Proximity Locator Services Toolkit to find the device either using an RSSI sensor as an indicator of distance, or activating a visual or audible alarm. Positions obtained by Bluetooth RSSI mapping are generally about as good as those obtained by commercial GPS, but when in close radio proximity, activation of an alarm display, visual or audible or both, will generally be sufficient to find the lost device, even if it has fallen into a dark corner or is in a coat pocket.

The device is more difficult to locate if it is moving. The assistance of the cloud host is essential. The cloud host will receive periodic reports of cellular contacts, cellular coordinates by GPS, Bluetooth contacts, and so forth, and may be able to use predictive algorithms to extrapolate possible destinations or intercept points were a realistic attempt can be made to recover the device. Receiving location information from a cluster of cell towers by a process of advanced forward link trilateration (AFLT), AGPS or PoLTE as an alternative to the traditional triangulation with directional antennas has proved increasingly accurate in areas covered by cellular service carriers when used in combination with machine intelligence now becoming frequently a part of every online search. Chances are quite good that the location is going to be accurate within a few yards.

Safe Zones

Figure 14A:
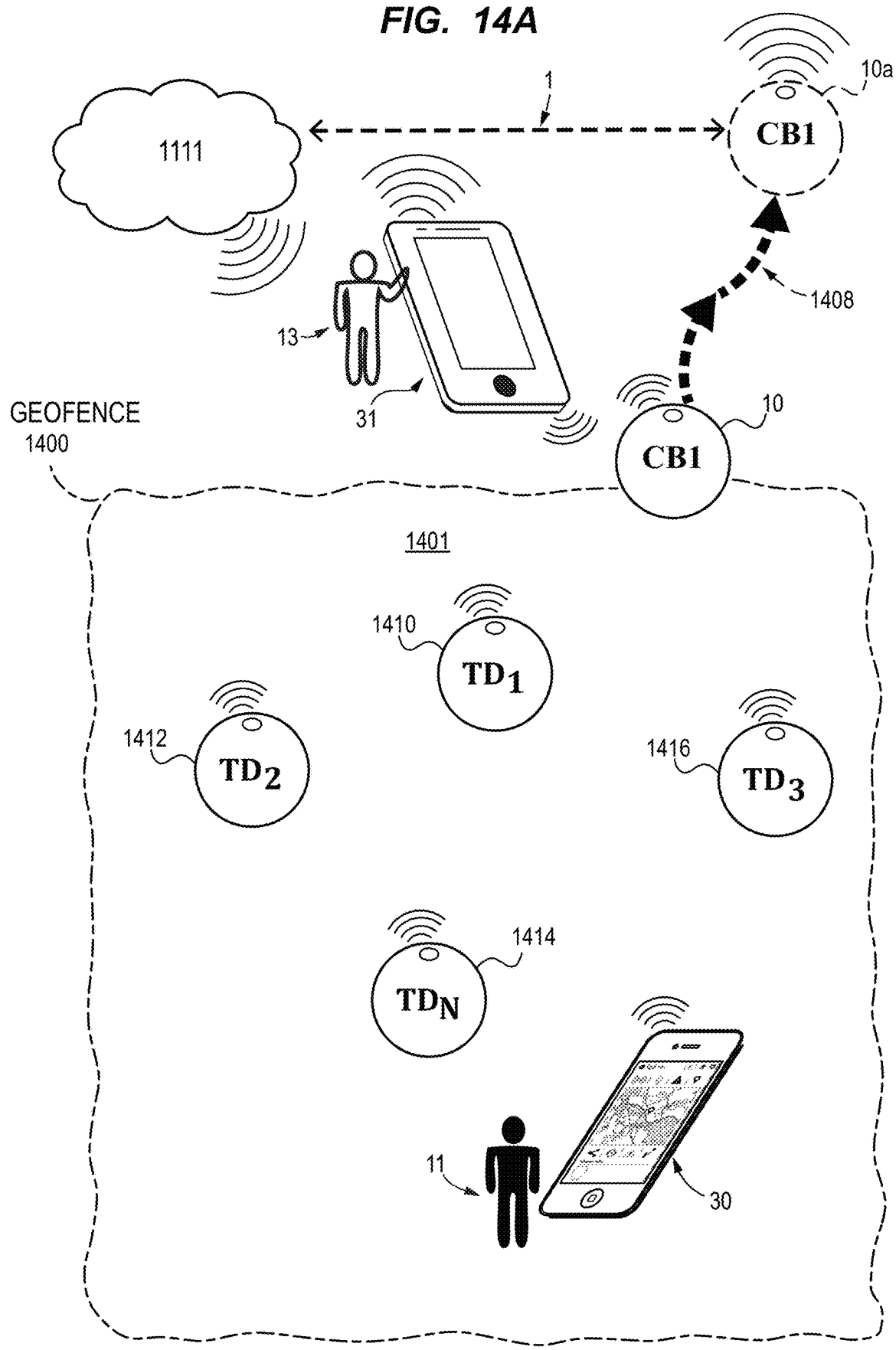
FIGS. 14A and 14B are views of location tracking applications using safe zones.

FIG. 14A illustrates use of a "safe zone" to monitor BT radiotags; shown here describing use of cloud cutting to enforce an exemplary radio geofence 1400. Radiotag CB1 (10) is a dual-radio XCB device 10; radiotags TD1, TD2, TD3, TDN (1410, 1412, 1414, 1416) have only a BT radio. The radiotags are assumed to be associated with selected assets belonging to or of interest to user 11, where 'N' is an integer indicating a number of radiotagged assets. While the radiotags may be attached to assets by any convenient mounting or attachment hardware, the radiotags may also be built into or embedded in the body of the assets. Each radiotag is registered in a user profile on a cloud host 1111. Safe zones may be used with XCB radiotags for enhanced pet finder services, for example.

Smartphone 30 is operated by user/subscriber 11 and includes software for displaying and operating a user interface. The user interface is designed for tracking the radiotags, entering user commands, receiving notifications, and creating or updating the user profile. The software defines an "application" or "control program". The user profile includes a programmable definition of geofence 1400 and is stored in computer readable media in the cloud host 1111.

Geofence 1400 bounds a "safe zone" 1401. The geofence can be defined by GPS coordinates or by reference to a location such as "home" or "office" having fixed coordinates. For example, the geofence can be described in several ways: by (a) coordinates for a northwest corner and a southeast corner of a rectangle (or more properly a "spherical rectangle") to describe a geographic area with enclosed topology, (b) a center coordinate and a radius or diameter, (c) a GeoJson-formatted list of points that outline a polygon; (d) the geographic area between any two latitudes and any two longitudes; (e) the area above or below an altitude bounding a hill or a valle; or, (f) known dimensions of a room or building with reference to a fixed point in space and time; without limitation thereto. Once established, the geofence defines a test that a computer can perform: given the coordinates and location of a radiotag in space, is the radiotag inside or outside the geofence? This simple test gives rise to a whole range of rules-based commands that can be programmed into a system and executed by one or more remote machines.

Having received and stored a user-defined geofence 1400 and safe zone 1401, the cloud host manages a system for enforcing rules related to the safe zone or zones. Any report of radiotags $TD_1$ through $TD_N$ or CB1 at a location that is not within the expected boundary conditions of a geofence will trigger an "exception notification" to the user/owner 11 via smartphone 30 or some system intervention. Effectively, the system becomes a watchdog that monitors location of the assets and issues an alert to the registered user/owner if a detected location is not within the geofence.

The system includes a community of users 13, each operating a "community nodal device" (referencing U.S. Pat. Nos. 9,774,410, 9,900,119, 10,063,331, 10,361,800, 10,389,459) such as smartphone 31, that scans for signals from radiotags and reports them to the cloud host. The reports include a radio unit identifier (RUI) of the transmitter and timestamp and a geostamp that records the time and place the transmission was received.

For example, smartphones 30,31 make a location determination when a radio signal is received from radiotags TD1 through TDN. A record of the radio contact that includes a radio unit identifier (RUI) associated with the radiotag is timestamped and geostamped before being sent to the cloud host. Signals from radiotag CB1 (10) may also be reported by smartphones 30,31, but the cellular modem may make an independent location fix using internal GPS or network assisted AGPS.

Based on radiotag location information received from smartphones 30,31, and from any independent contact with radiotag 10, the cloud host 1111 looks up any geofence definition(s) associated with each radiotag in a user profile by its RUI and generates an intervention if needed. Thus for example if an asset associated with radiotag TD3 (1416) leaves the area demarcated by geofence 1400, any BT radio contact with community nodal device 31 will result in a radio contact report to the cloud host 1111 and the cloud host will issue a notification to owner's smart device 30 that indicates the time and location that the errant radiotag 1416 was detected outside safe zone 1401. By extension, other community nodal devices 31 may provide a continuing trail of waypoints that update movements of any errant radiotag outside the safe zone so that the owner/subscriber's smartphone can display the trail of waypoints on a map display 30.

If the asset TD3 left with some authorized user (such as a friend), the system may be able to note that radiotag TD3 has paired via BT radio link with an authorized user's smart device, and that information can be weighted by the system in making reports to the owner/subscriber 11. In this way, for example, an employer can keep track of assets that are routinely taken to job sites by employees and returned at the end of the day to a shop or central warehouse.

The timestamp may also be helpful in allowing a user to set time restrictions on the geofence and safe zone so that short term borrowing by authorized users is permitted, but overnight absence of a radiotagged asset from the expected location results in an exception notification, for example. If the asset was last linked to an authorized user, a notification can be sent as a query if there is a temporal exception, asking for an explanation to the authorized user, but if the asset left with a stranger, the system can attempt to track the asset and will report any outside radio contacts unless and until the asset is returned to its expected location within the geofence.

The behavior of XCB radiotag CB1 (10) is distinct from radiotags that lack a cellular radio. When radiotag 10 exits the safe zone at 1408, its BT radio signal is registered by community nodal device 31. A report will be sent to the cloud and the cloud can immediately respond with a command to radiotag 10 to CALL HOME 1 by turning on its cellular modem. Alternatively, the radiotag, recognizing that it is not where it is supposed to be at 10a, will take a location fix on its own and can call home to report. On receiving the CALL HOME, the cloud host will generate a notification to owner/subscriber 11 via smartphone 30. Thus, the devices 10 of the invention enable autonomous tracking that is not possible with ordinary BT radiotags 12 (FIG. 1).

Figure 14B:
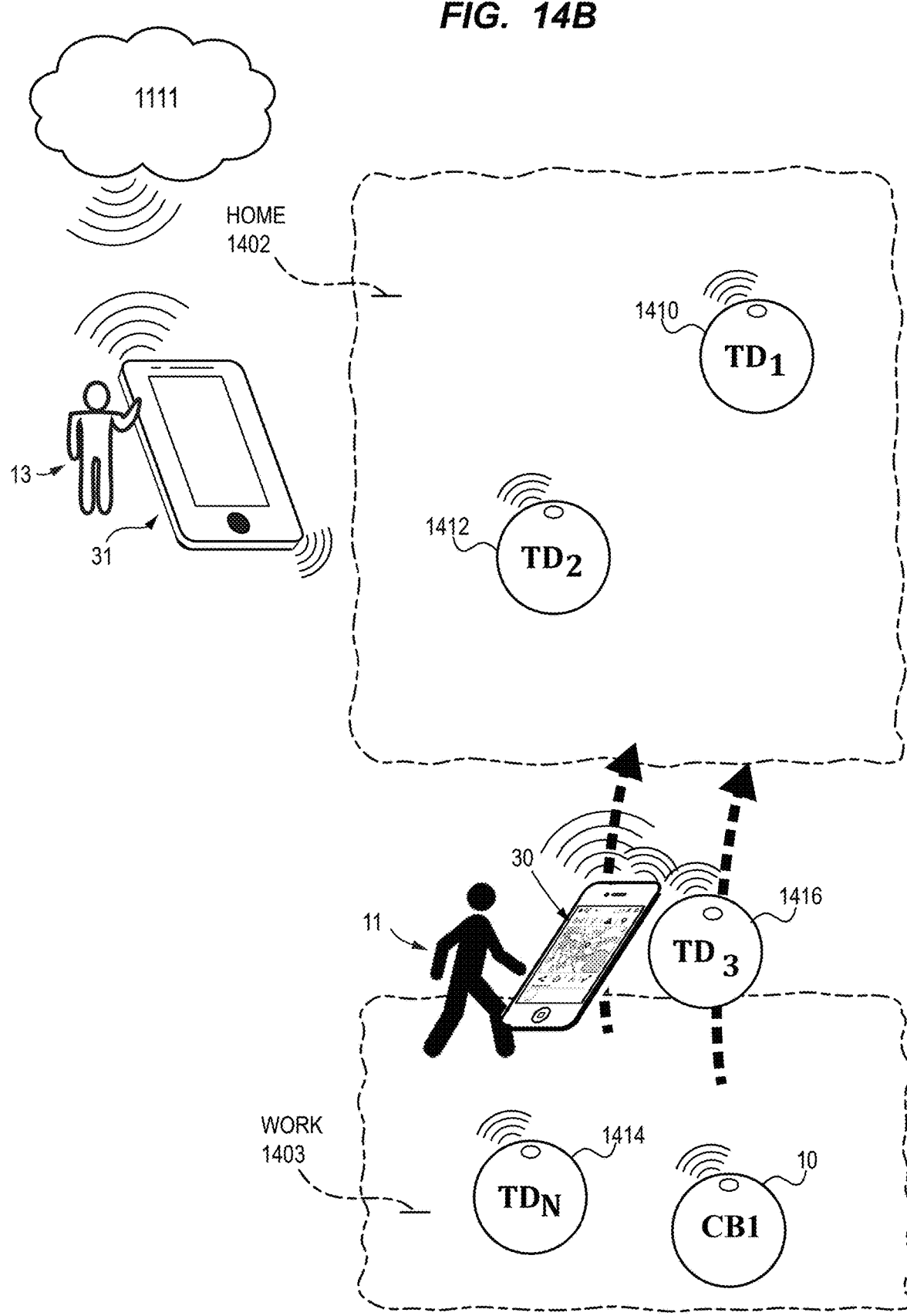

FIG. 14B extends the concept of radio geofencing to a user who programs a first and a second geofence, shown here as HOME location safe zone 1402 and WORK location safe zone 1403. Each geofenced area 1402,1403 is defined by GPS coordinates or by a radius around a fixed anchor point, for example. In this instance, the user 11 may carry an asset tagged with radiotag TD3 1416 back and forth between the two geofenced areas. Radio contact reports sent to cloud host 1111 from the user/owner's smartphone 30 will show that the radiotag is travelling in uniform proximity to the user. Even though there is motion of both the radiotag and the smartphone, because the radio proximity is unchanged, no system intervention is needed. Radio contact reports is received an anonymous user 13 via community nodal device 31 during transit from one safe zone to another are not actionable if the radiotag is accompanied by the owner's smart device 30. At any time that radiotag TD3 1416 is within one of the safe zones 1402 or 1403, the system will not alarm or initiate a CALL HOME if the signal from smartphone 30 is lost. Thus 'safe zones' provide a valuable tool in reducing the complexity of logic conditions for location management.

By extension, the safe zone is adapted to include proximity to the owner/subscriber's smartphone 30. And a geofence can be time-dependent, such that geofences are enforced only in certain time blocks, for example. If any of the radiotagged assets are not in their expected local areas at designated times programmed by the user/owner, and are not in radio proximity to smartphone 30, then a "TAKEN AWAY" or "LEFT WITH" alert may be issued to the user/owner via smartphone 30 or to a secondary authorized user. In this way friends and associates can share assets but still ensure that unauthorized removal of an asset will be noted and tracked by the cloud host. These actions are all managed on the cloud host with essentially no burden on the owner, friends or on the community of users.

The owner/user 11 can select the alerts and threshold values on a user interface and the alerts are stored in a user profile. Any radiotag that is stationary when the user's smartphone is mobile could indicate that something has been left behind, and any device that is moving but moving in a direction away from the user's smart device would also trigger a "wayward motion" or LOST alert, for example. For example, if TD3 (1416) is moving with user 11 but TDN (1414) is not, then a "left behind" alert is caused to be issued even before the owner has left the area defined by work geofence 1403.

BT radiotags TD1 and TD2 1410,1412 are dependent on community user device 31 to send a radio contact report to the cloud host so that the system can evaluate and intervene if the radiotag has left the safe zone. In contrast, radiotag CB1 (10) is not dependent on an external monitor, and can CALL HOME at any time to report a current location or to request location assistance from the network, for example if there has been a power failure in an office building, if there has been an earthquake, a shock, a temperature drop, or any of a variety of conditions, including a change in the radio signal environment in its vicinity. TDN 1414 is passive, and reacts to commands from the system but is not able to take action if lost; but CB1 10 can report itself lost and act to cause a system notification to the owner or a direct intervention. A wayward XCB radiotag 10 (CB1) can initiate a cellular network connection to report its own position and if that position is outside the boundaries of a defined safe zone, then the system will intervene, either by notifying an owner/user 11 or by directly causing an alarm display on the radiotag, for example. Radiotag 10 capacity to obtain a location fix can be based on an onboard GPS or AGPS capacity or based on some cellular network serve such as LoLTE or PoLTE, for example.

In one embodiment, power management in radiotag 10 follows principles set forth in FIG. 11. When the initial location is within a safe zone around owner/user 11, the cellular modem of radiotag 10 is in SLEEP mode. In response to motion detected by the radiotag, or by loss of radio proximity detected by the BT radio of the radiotag (where proximity to smartphone 30 is assessed), the device can wake up its cellular modem to CALL HOME and get a location fix.

Alternatively, the smartphone can monitor RSSI proximity of the BT radio signal from radiotag 10 and if there is an increased separation (decreased RSSI), for example, the smartphone 30 can send a command to the radiotag 10 (via the BT radio) to wake up the cellular radio and CALL HOME.

The safe zone can also be defined by a boundary condition established by a "radio tether" to a reference smart device or other stationary anchor or hub. The radio tether incorporates two concepts that were described in FIG. 11: accelerometry data and radio proximity. For example, radiotags TD3 (1416) and TDN (1414) may be tethered in a piconet with radiotag CB1 (10). By making radiotag CB1 the master of the piconet, it can generate a CALL HOME if there is some exceptional circumstances such as motion in radiotag TDN, which is intended to stay at the owner's desk. The role of master can be switched among radiotags and smart devices, so that, for example, the smartphone 30 can take over the role of master for radiotag slave TD3 when the owner departs for home, but while at work, device CB1 can be the master of the piconet when the owner goes to lunch but does not take the radiotagged assets with him. Where several radiotags are in use, any discrepancy between one radiotag and the others increases the probability that an alert should be issued. Any discrepancy between the motion of a device that defines a radio tether and a radiotag associated with the tether will also result in an alert.

Mobile Safe Zone

Figure 14C:
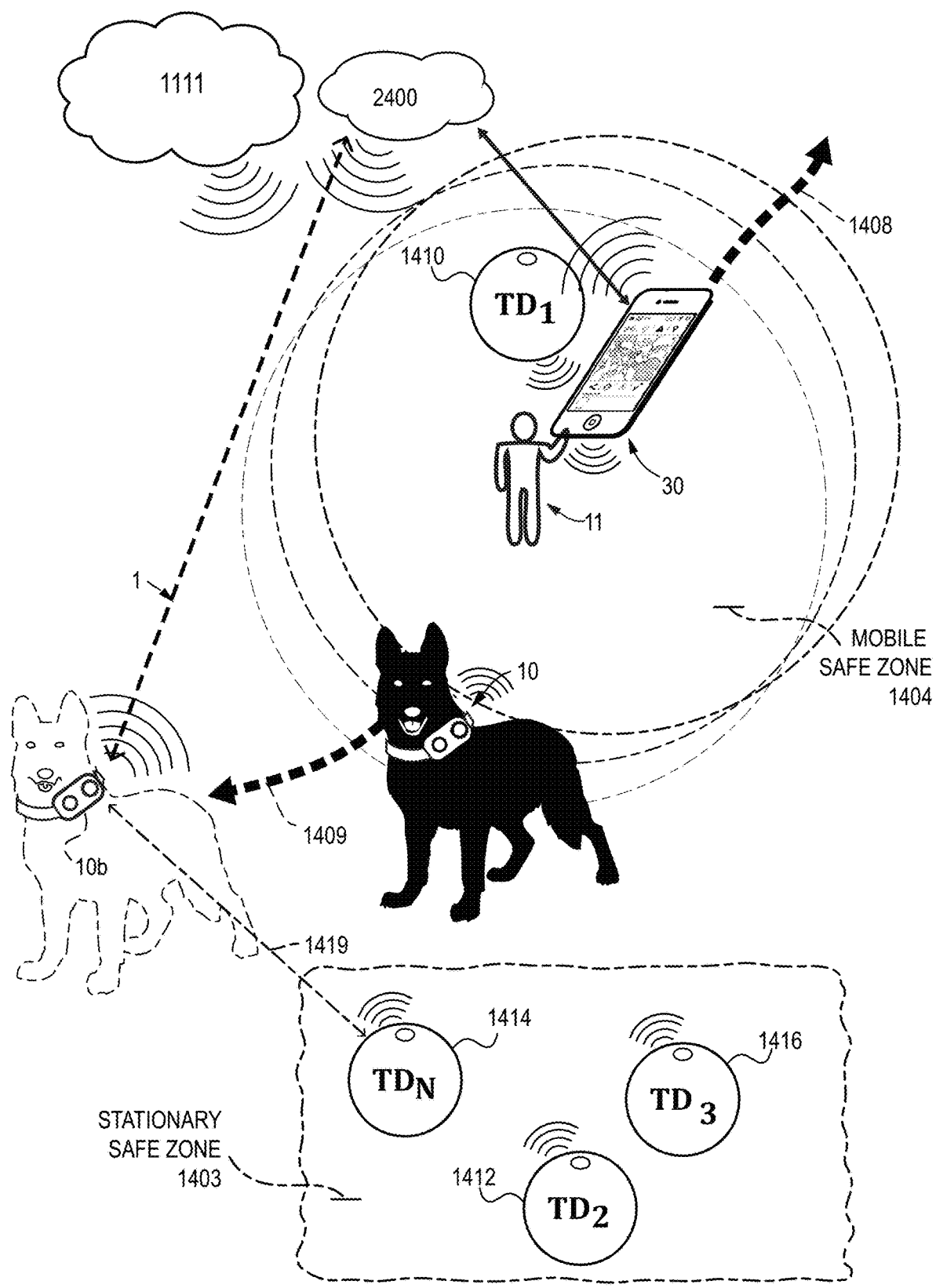
FIG. 14C extends the concept of a mobile radio safe zone as relate to pet location monitoring services.

In FIG. 14C, mobile safe zone 1404 is defined by smartphone 30, and the moving boundary of the safe zone (dashed circles) migrates with the direction 1408 of the smartphone 30.

In an exemplary embodiment, the mobile safe zone can be used to monitor a companion pet, shown here as a dog with radio collar 10. If there is excess separation 1409 between radiotag 10 and the smartphone 30, such that the length of the radio tether increases to 10b, a threshold is crossed before radio contact is completely lost, and that threshold can be a trigger for a CALL HOME 1. Location data may be routed through the virtual private gateway 2400 using a private IP address that minimizes network traffic and avoids security issues of the public IP networks. The cloud host will cause a notification to the owner/subscriber 11 if the location data violates a rule associated with the mobile safe zone.

Loss of signal from a radiotag can result in a system alert, but even before the signal is lost, the system can detect a fading signal or can receive motion data from the radiotag 10 if the radiotag includes an accelerometer or an electronic heading sensor, and by comparing that data with motion data from the smartphone 30 for example, can preemptively issue a LEFT BEHIND or LOST alert, for example. If there is a motion mismatch in direction between the smartphone 30 and the radiotag 10, then the decision to wake the cellular modem is easier. For example, if the smartphone 30 is in motion but the motion sensor in the radiotag 10 indicates no motion, then a LEFT BEHIND alert is generated. And if the smartphone 30 is moving 1408 in one direction or at one velocity, and the radiotag 10 is moving in another direction 1409 or at another velocity, then a "wayward motion" or LOST alert is triggered and pushed onto the user's smartphone 30. Before the radio link is broken, the system assesses any drop in radio proximity (e.g., RSSI of radiotag at 10*b*) as sensed by smartphone 30 and causes the smartphone to vibrate or alarm to call attention to the exception. Or alternatively, a buzzer or vibrator in radiotag 10 may be actuated so that the user takes no more than a few steps before being alerted that the radiotag (and any radiotagged asset) is no longer moving in step. The system, the owner, or the radiotag may actuate a hypersonic whistle built into the radiotag to remind the dog to keep up with the owner on a walk, for example.

Prompt alerts simplify the process of retracing one's steps to find the lost pet. Radiotags equipped with motion detectors can provide a valuable stream of data that can be compared with output from a like motion detector in the user's smart device. With motion data (FIG. 11), easily recognized discrepancies between moving and stationary radiotags are the changes associated with a getting into or riding in a moving vehicle, which would be readily detected even before radio signal was lost. The cadence of a walking step is distinctive from that taken on a stairway, for example. Characteristics of motion may be recognized by machine learning from accelerometry data collected by a radiotag.

RSSI or other measure of path loss provides a criterion to test whether the motion of the smartphone and a radiotag are copacetic. Even within the mobile safe zone 1404, if one radiotag, for example wayward radiotag 10*b* (attached to dog in phantom lines) is moving away from the user 11 (RSSI decreasing), but another radiotag TD1 1410 is moving with the owner (RSSI unchanged), the relative motion suggests a discrepancy that can trigger an early alert, as would be sent to smartphone 30 and pushed onto the display, or made evident by vibration of the smartphone, for example, to alert the user 11. Thus the system can signal to the owner that the dog has left the trail even before the owner looks back.

In another illustration, radiotags TD3 1414 and TDN 1416 are stationary and are left within a stationary safe zone 1403 such as a home with fenced yard. Interestingly, XCB radiotag 10*b* (attached to dog in phantom lines) may be in BT radio contact with one or all of the stationary radiotags 1412, 1414, 1416 when leaving home. If wayward radiotag 10 is fails to go with the owner and instead goes down the alley behind the house, for example, the radiotag can cause a system-implemented alert to the owner if it senses the continued radio contact with radiotag 1414 as an exception when compared with a fading strength of the radio contact with owner's smartphone 30 headed in direction 1408. By assessing radio proximity from the standpoint of wayward radiotag 10*b* (as compared to radiotag 10), the level of confidence is achieved that a CALL HOME is needed can be achieved sooner, and for that reason, the BT radio environment around the radiotag offers useful clues to early detection of wayward behaviors. Prompt attention to location management is critical in developing obedience patterns associated with "heel" and "come" commands.

In another embodiment, radiotag 10 may remember a radio safe zone. On return to a stationary safe zone such as a fenced yard 1403, radiotag 10 will expect to encounter the familiar radio signals of the stationary radiotags 1412, 1414 and 1416. These can be whitelisted so that the signals are recognized. Typically these whitelisted BT radiotags would be restored to a dedicated piconet with XCB radiotag 10, but for example if device 1416 is missing on return home, that exception can give rise to a CALL HOME notification to the user 11 via smartphone 30. In this way, the system can identify missing items before the owner suspects they are missing.

Figure 15:
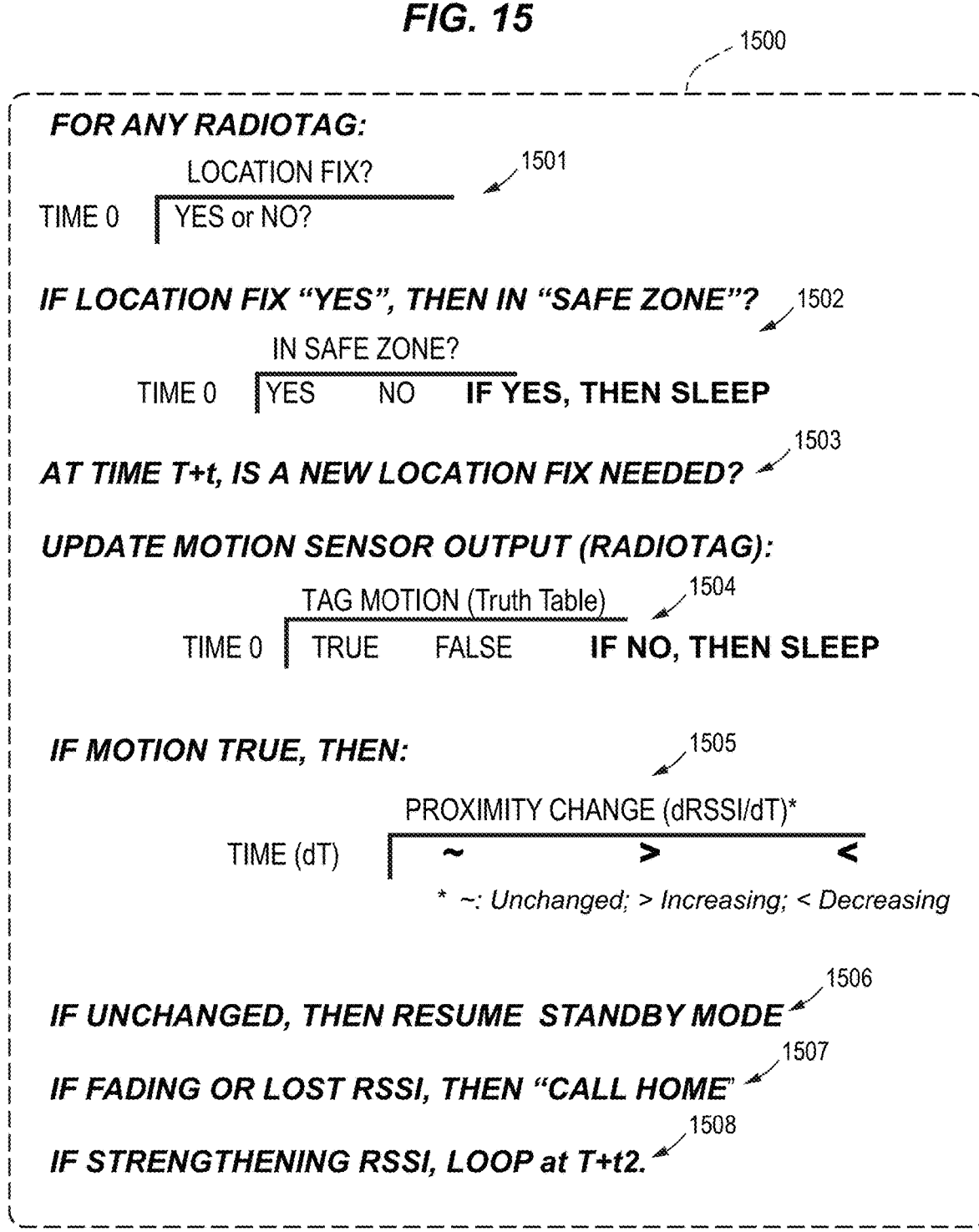
FIG. 15 is a flow chart for driving location management logic and power consumption using motion sensor and radio proximity data collected by a reference hub.

FIG. 15 illustrates logic for safe zones established around a stationary reference device. By installing a reference "hub" at selected locations, a user may define a virtual radio "geofence" around an anchor transceiver to which radiotags are tethered in a piconet. By coupling the reference hub to cloud host 1111 for real-time uplink of data, data from the radiotags can be aggregated to administer a safe zone. The safe zone is useful to prevent radiotagged assets from straying outside the geofence or in reminding the user what to take with them when they go out, for example.

A beacon signal from a reference hub 20 can "tether" radiotagged devices to a home or office location, and a radiotagged pet, for example, can trigger an alert if the pet leaves a fenced backyard. Children's activity can be monitored, and so forth. Reference hub 20 is illustrated schematically in FIG. 1 and in more detail in FIG. 17.

Once a radiotag is a member of a piconet, it can remember its reference hub "master", and can resume the piconet even after the initial radio link is broken. Masters can also be switched, so that for example a stationary reference hub can serve as a master of a piconet in a home, while a smartphone can serve as a master of the same piconet when at work. This is achieved by making the reference hub and the smartphone both members of a piconet and then reassigning the role of master according to the location of the smartphone. The BT piconet can also be defined with a radiotag 10 as master and reference hub 20 and smartphone 30 as slaves, if desired, and can allow the master a prolonged standby duty cycle in listening only mode while the slaves, which have more power, do more frequent directed advertising.

To administer a safe zone, assuming radiotags in the role as slaves, may transmit their radio identifiers (RUI) and motion data with regular periodicity to a master reference hub 20. The stationary reference hub is assumed to have a wired power supply and hard data link to the cloud host. The portable radiotags do not need to perform extensive calculations or be provided with complex software. RSSI determinations are inherent functions of the BT radio core, and motion sensor output can be reduced to a single bit for transmission. Algorithms for monitoring radio proximity can be made available as part of software installable on reference hub 20, smartphone 30 or can be implemented by cloud resources. The energy budget for radiotags TD1-TDN is primarily related to periodic beacon message transmission in which the message includes a RUI and any UUID, plus optional fields for sensor data or a user name, for example, all within 31 to 37 bytes. A BT transceiver is generally provided so that the radiotag can respond to a command to enter an alarm state, but a programmable MCU is not required for complex computations. BT radios are provided with firmware that administers the BT radio stack and link manager so that BT radios are capable of advertising and discovery of other BT radios that are close by. Connected and advertising modes were described earlier with reference to FIG. 8A.

A local piconet having member smart devices, reference hubs, and radiotags, for example, can be administered to establish stationary safe zones in which slaves in a piconet are set up and remember their master or "reference" device and their CONNECTED state in each safe zone. The master defines the safe zone by a radio tether. The access codes used by the members of the piconet define the relationships among the members and are stored in memory. The master can be a smartphone, for example, but for stationary installations, a reference hub that has a BT radio and a wired power supply is more practical.

Hub devices may include WiFi instead of cellular, and with either WiFi or a wired connection, the reference hub has the capacity to contact the cloud host independent of the owner's smartphone. Smart plug-in devices that have a voice interface may be adapted as hubs, for example.

The system may include a predictive algorithm, and by machine learning can refine its predictions based on experience. Motion of the radiotags cannot be compared with motion of a stationary reference hub. However, RSSI and relative radio proximity is a good indication of the length of the radio tether between the reference hub and the radiotag and can be relied in a decision tree.

Flow chart FIG. 15 illustrates a general method 1500 for operating safe zone services as part of asset location management. Radiotags are attached to or embedded in assets in need of location monitoring. In the analysis, radiotags 10,12 are operated as members of a piconet around reference hub 20. A radio tether can be unidirectional or bidirectional. An application for executing the algorithm is assumed to be installed in the reference hub 20 or operated remotely on a cloud host 1111. A user interface may be operated on a smartphone 30 or some other smart device. Remote notifications to an owner/user will be sent to the smartphone or to other user equipment. The initial analysis is directed at correctly identifying scenarios in which the system should issue a notification in response to an exception to one or more rules. The rules relate to the safe zone defined by a radio tether between the radiotag and the reference hub. Generally a notification is not needed if the radiotag is initially in the safe zone and has not moved and the radio proximity is unchanged or increasing in strength. If a radiotag has moved and the radio proximity is fading, then a LOST notification may be appropriate. The relative motion of a smartphone may be a consideration elsewhere (FIG. 11), but is not considered here so as to focus on what the reference hub can achieve without the smartphone. Radiotag 10 is assumed to include a cellular modem that is in a SLEEP mode by default, but which can receive a location update command during a preset paging window or via a BT radio command to the BT radio. Power to the reference hub is assumed to be unlimited, and an emergency battery can be supplied as part of the hub unit, but power management of the radiotag 10 is necessary in order to achieve a satisfactory balance of battery size and portable service life per charge.

Generally, any monitoring of a safe zone 1501 begins with a memory that associates a "location fix" in memory with a timestamp at time T=0. This memory may not be in the device 10, but may instead be stored at a higher network level, for example in a smartphone 30 or in a cloud server 1111. During setup the radiotag and the radio center are in close range, and the RSSI of a signal from a radiotag, as received by the reference hub, is indicative of radio proximity. At time T=0, if the radiotag is in the safe zone 1502, then no location fix by the radiotag is immediately needed. While it may be desirable to have a current location for the radiotag at all times, from a power management standpoint in a portable device, this is not practical. Getting a location fix consumes power. So the more pertinent question 1503 is the next location fix—when to get it—by activating the cellular remote locator tools of the radiotag 10?

The decision tree for whether or not to get a next cellular location fix for the radiotag at a future time T=T+t, where t is an interval selected based on predictive accuracy, can be made so that unnecessary location fixes are avoided by attention to (a) data related to accelerometry of the radiotag, and (b) any recent change in relative proximity of the radiotag and reference hub.

Assuming radiotag 10 includes an accelerometer 623, then the simplest sensor output can be a MOTION truth value, TRUE or FALSE 1504. The quality of motion (e.g., hard vs soft acceleration), the speed, duration, and the direction are also useful, but the simplest and most economical bit of information from the sensor is whether motion has occurred. If motion has occurred, then the device may have been moved, and the location stored in memory may no longer be valid. If motion of the radiotag has not occurred 1504, then the radiotag can continue to SLEEP. If motion of the radiotag has occurred at time T=T+t (i.e., after an elapsed ΔT, where the time interval is programmable), then it may be useful to look for a change in proximity 1505. Over a range of several hundred feet, RSSI is a first approximation of distance between the radiotag 10 and the reference hub 20. The proximity may be increasing, decreasing or stay the same depending on whether the RSSI is strengthening, fading or about the same. Proximity is measure by Bluetooth radios as part of core competencies of BT radio and the reference hub will continuously monitor the RSSI of the radiotag signal as part of routine operations. The radiotag can also measure RSSI of the reference hub signal and report that as part of a smoothing operation to reduce noise in the determination. Binning and averaging are also useful to smooth RSSI data over small intervals.

If there is no change in proximity 1506, then any motion signal 1503 may be spurious and would not necessitate a need for a new location fix. Proximity will continue to be monitored. Similarly, an increase in proximity (strengthening RSSI, 1508) is intuitively not likely to indicate a risk of loss of signal, and the algorithm can be looped to continue to monitor for motion and proximity.

But a fading RSSI 1507, as indicates decreasing proximity and increasing separation, could be followed by a loss of signal, and for a tracked asset, a lost radio tether signal may necessitate an immediate CALL HOME by radiotag 10 to get a new location fix and to generate a LOST ALERT notification to any interested party.

Exceptions could be made if the motion data is more granular, for example a hard impact could merit a CALL HOME with status report even if proximity data is unchanged. And it may be appropriate to activate the cellular remote locator tools, even if there is no apparent motion, if the proximity signal has been lost.

The elapsed time interval ΔT for iterations of the method 1500 may be adjusted according to conditions. For example, in a safe zone, infrequent execution of the loop may be sufficient. An interrupt flag on the processor can be set against the accelerometer output. But if the radiotag 10 is outside a safe zone, the loop may be executed more frequently, and the timing can be dependent on the nature of the motion input, on temperature, or on changes in acoustic patterns, or on changes in Bluetooth radio traffic patterns, for example. The more motion activity, more frequent proximity monitoring may be useful.

Figure 16A:
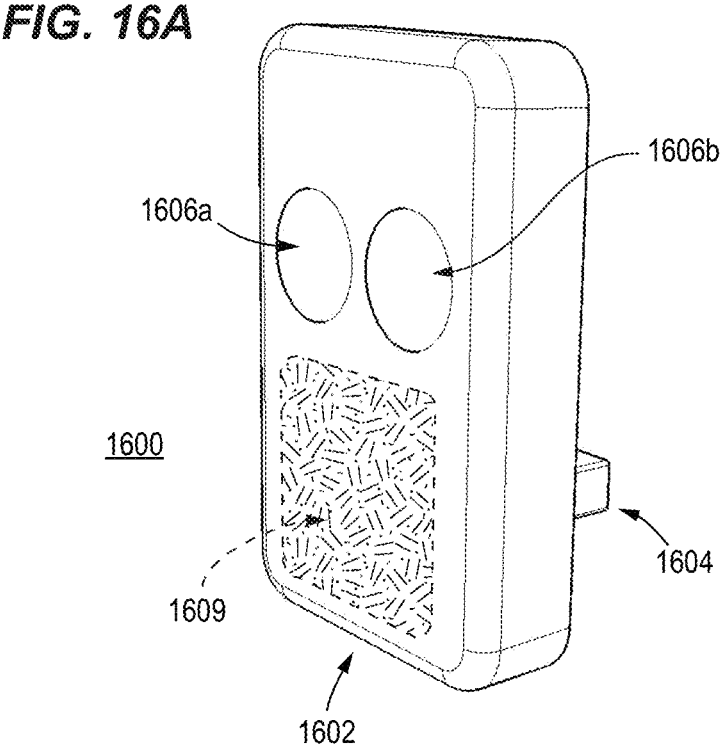
FIGS. 16A, 16B, and 16C are views of a reference hub.
Figure 16B:
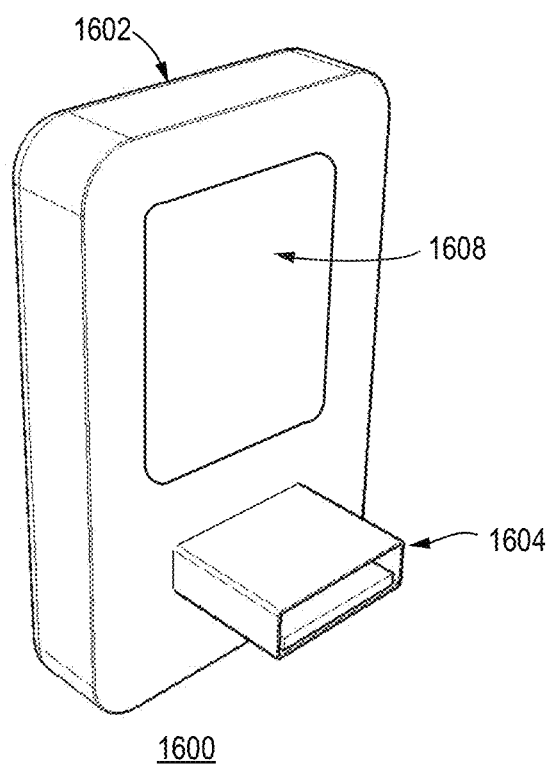
Figure 16C:
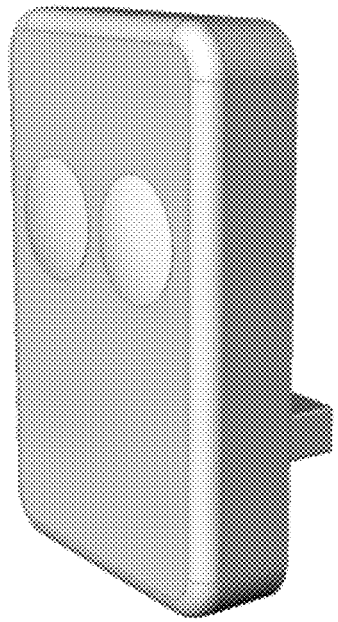

FIGS. 16A, 16B, and 16C are views of a reference hub 20,1600. As shown, reference hub 1600 includes a housing 1602 with face cover and back cover that encloses circuitry. The circuitry includes a green LED visible through a button or window face 1606a on the front cover and a red LED visible through a second button or window face 1606b. The green light is an "ALL GOOD" status light that indicates one or more radiotagged assets are in radio proximity to the reference hub 1600—i.e., where they are is supposed to be. The red light is an alert that means a signal from one of the radiotags has been lost. A blinking LED indicates that one of the signals is fading. The hub 1600 is set up using a GUI provided with installable software on a smartphone or other user equipment that guides the user through set up of a piconet between the reference hub and the one or more radiotags. When the owner/user is home the user's smartphone can be master of the piconet and can monitor the radiotagged items. When the user leaves home, the hub takes over as master of the piconet for any radiotags that remain at home, for example.

Reference hub 1600 may be plugged into an AC adaptor and may be operated indefinitely in a wall plug at a single location. In the event of regional power failure, the hub may have a backup battery power supply, indicated here by a removable battery access panel 1608.

The hub 1600 may be the default master of a piconet that includes several BT 12 or XCB 10 radiotags of a common owner. As a community service, the hub may broadcasts location coordinates that a community of users (or the public in general) can use for telemetry-controlled applications, for rangefinding, for wayfinding, for finding lost radiotags, and for creating radio tethers or conditional rules-based actions linked to radio bubble centered on a fixed location. Reference hubs 1600 may be shared. A "Crowd Hub" is a unique service offered by the system. Multiple user/subscribers may establish safe zones for multiple radiotagged assets using a single hub and associated cloud service. In some instances the hub is a client; in other instances the hub is a server in relation to the radiotags and any cloud host. In client role, the hub may forward data such biometrics or voice to a server device. In server role, the hub may perform location management services for the radiotags and for user equipment. The system will manage notifications and alerts for radiotags that are connected to a hub-based piconet. LEFT BEHIND, LEFT WITH, LOST, FOUND and UNAUTHORIZED MOTION services are all supported by the hubs of the invention.

Reference hub 1600 may include an optional speaker and microphone 1609. The larger housing realizes better acoustics and optionally may be circular or spherical in shape and include a directional speaker and microphone array. U.S. Pat. No. RE47049 to Li teaches a dynamic microphone array for improved voice recognition. U.S. Pat. No. 7,177,798 to Hsu and U.S. Pat. No. 6,766,320 to Wang teach methods for natural language query and response interactions. These patent documents are incorporated in full by reference. Reference hub 1600 may include a natural language interface incorporating cloud-based speech recognition and response.

The radius of the radio bubble around hub 1600 is dependent on power. Generally the transmit power is +0 dBm or +4 dBm for BTLE applications, but can be as high as 20 dBm unless limited by law. A higher power increases the range, but care must be taken so that an impedance matched condition exists between receiver and transmitter antenna and amplifiers for best results. Because signal fade occurs with distance; given signal losses due to refraction of signals around radio opaque structural barriers, and because attenuation due to lossy media such as human bodies can be significant in crowded venues, transmit power may be variable, and a subroutine may be executable by the reference hub so that transmit power can be varied if a radiotag signal is lost. The purpose of increasing radio power is to improve the chances that a lost radiotag can receive a command to turn on its cellular modem.

In other embodiments, the hub may include WiFi so that a LAN can be formed for reporting BT radio contacts to user equipment or to a cloud server 1111. A combination power and data connection through a USB port 1604 is provided as another option for establishing a hardwired connection to an internet portal. The device 1600 may be plugged into a household power outlet or into a dashboard of a vehicle, for example, using an appropriate adaptor. In some instances the hub may be solar powered or powered by kinetic energy for use in outdoor venues, for example.

When used portably, radiotags 10 consume significant amounts of energy when maintaining a cellular network connection. By overriding cellular networking whenever a hub 1600 is within BT radio proximity, the battery drain on radiotag 10 can be minimized.

Hub master device 1600 and radiotags 10,12 have cache memory that can be used to store piconet membership and connection data, so that interrupted connections can be rapidly restored. The hub, as master of the piconet, can also designate PARK, SNIFF, and STANDBY mode for slaved radiotags, and can manage power consumption of the BT radio, the processor, and any cellular modem in the slaves while in BT radio contact.

The hub can also query qualified devices to determine battery power status and can make appropriate notifications to an owner if particular radiotag needs recharging or a new battery. By extension, where radiotags are embedded in assets such as cameras and other electronics, the radiotag can report asset technical data selected from temperature, battery status, fault status, and so forth to the hub, and that data is forwarded to the cloud host for analysis. Notifications directed at care and maintenance of user assets can be pooled and automated in this way.

In a variant, the piconet around a safe zone may be set up with reference hub 1600 and smartphone 30 as slaves and XCB radiotag 10 as master. The master will minimize its power in scanning for the slaves with a reduced duty cycle and the slaves can be set to broadcast directed advertisements at higher frequency. The XCB radiotag makes the determination if the radio tether has been broken or stretched and can call home as needed. The slaves may be programmed to report radio contacts with the master to a cloud host 1111 when the master is in a safe zone, and the network can follow the master through a companion smartphone 30 when away from home. This eliminates the need to switch master roles from reference hub to smartphone or vice versa.

Each reference hub 1600 may have an IP Address that associates it with the physical web of the IoT, and may be connected by wired, Bluetooth, WiFi or cellular means to a packet data environment via a GAN gateway or portal. The hub will have one or more RUIs and UUIDs that identify it and its services. A cloud host 1111 that receives radiotag data from the hub is able to extract additional identifiers from a user profile associated with a UUID or other radio unit identifier associated with the radiotag. Where WiFi is provided, BT and WiFi may function as complementary radios in overlapping LANs and piconets in which an internet gateway or portal is provided. Where cellular radio is provided, the capacity of the hub to interface directly with a cellular network provides a direct relationship with an administrative server.

The GAN connection may be to a cloud host 1111 or to a virtual private gateway 2400. The advantage of the VPG is the relative lack of background chatter that can drain battery power and increase latency. The VPG is also much more security friendly for sensitive information such as child location, which may be tracked using the radiotags 10 of the invention.

As a matter of convenience, a user interface can be displayed on user equipment by installing a software application, for example on a smartphone. In other instances, a user interface is accessible at a website with APIs for managing databases containing administrative and user information.

Figure 17:
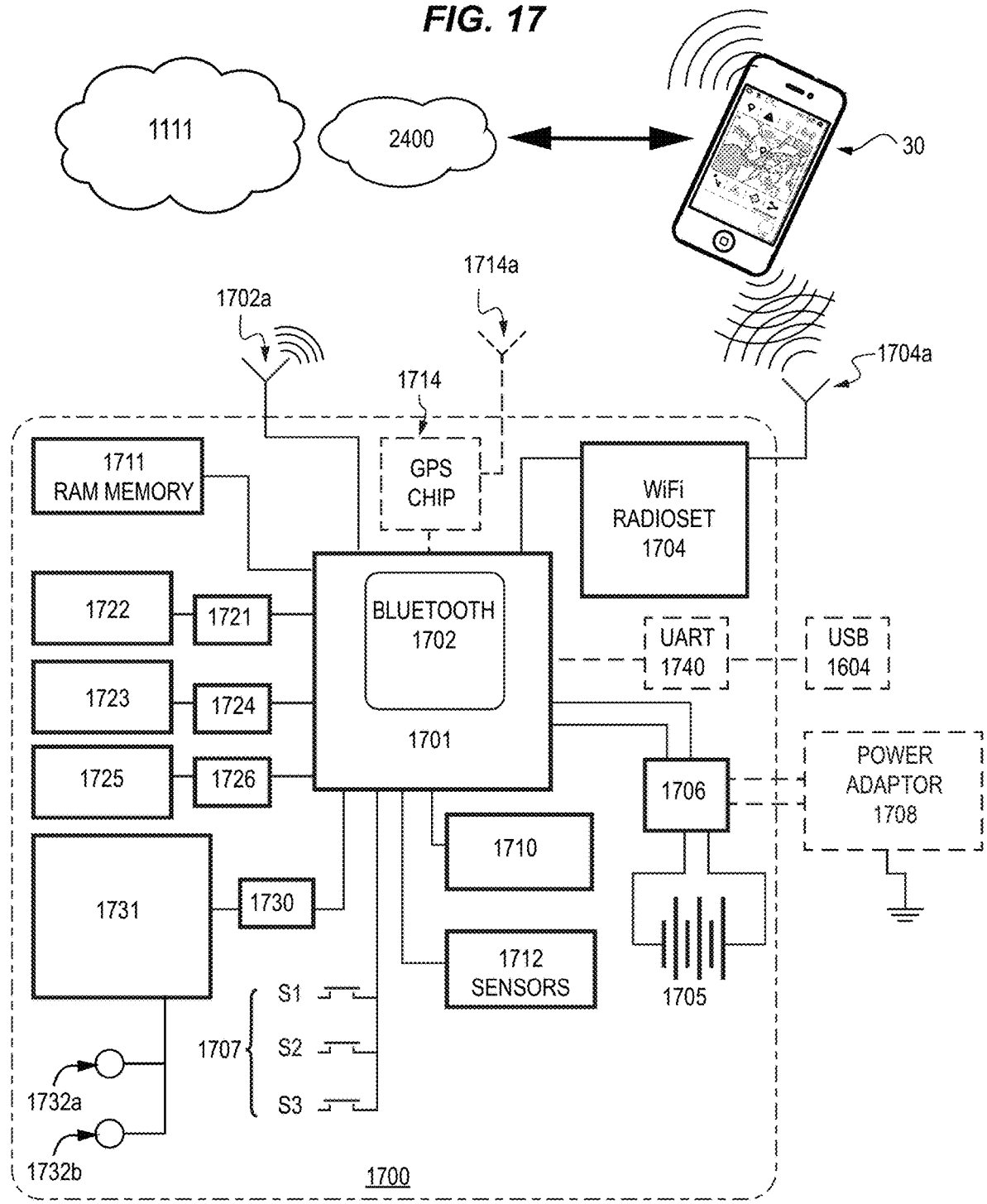
FIG. 17 is a schematic describing circuitry of a reference hub with Bluetooth and WiFi radios in a network context.
Figure 18:
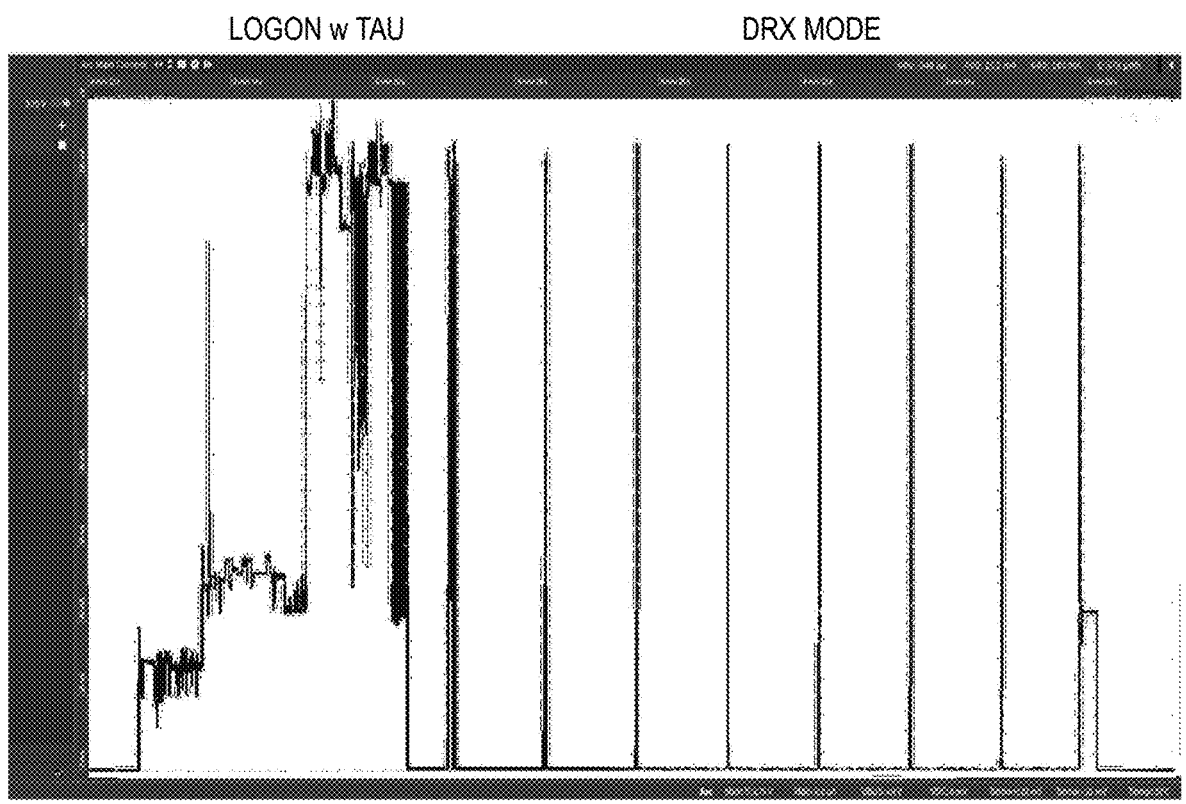
FIG. 18 is an oscilloscope image of instantaneous power consumption during a connection event followed by a series of paging opportunities in one of the DRX modes of the cellular modem.

FIG. 17 is a schematic of a system with stationary reference hub 1700 useful for managing radiotags in a network context. Reference hub 1700 includes Bluetooth and WiFi radio sets.

In embodiments, the circuit includes a BTLE radio 1702 controlled via a controller circuit 1701. Power is supplied from a power adaptor 1708 and battery 1705 with power supply circuit 1706. The device may be insertable into a wall outlet power adaptor 1708 as a USB plug 1604 (as shown in FIG. 16), or the power adaptor 1708 may be a computer with a USB power and serial data plug 1604, for example. The power circuit 1706 may be configured to convert the power input into a regulated power signal having a regulated voltage in an approximate range of 1.8 Volts (V) to 3.6 V. For example, the power-supply circuit 1706 can be any suitable type of voltage regulator, such as a linear regulator, a buck converter, a boost converter, a buck-boost converter, or a flyback converter. Logic and analog device power can be supplied via a $V_{cc}$ rail for example, directly from the battery or as regulated by the controller 1701 or power conditioning and management unit of power supply circuit 1706, for example.

The hub may include a Bluetooth radio 1702, a LAN radio 1704, and an optional GPS chip 1714 with associated antennae 1702a, 1704a, 1714a, respectively. GPS chip 1714 is shown as being optional not just because it may not be supplied in inexpensive units, but also because in some instances the GPS functionality will be built into the controller 1701, into a cellular radio (not shown), or into the LAN radio 1704. Many cellular radio chips are provided with accessory GPS functionality integrated into the die. The GPS antenna 1714a may be separate from a cellular radio antenna, but, in some instances, a combination antenna package is used. Based on an autonomous or network-assisted location fix, the reference hub 1700 may function as a "lighthouse radiobeacon", transmitting Lat/Long or other coordinate information as an open broadcast, and the message may be used to define a radio tether of a geofence or for community uses and applications.

For use in pet location management, reference hub 1700 can define a safe zone in which a pet is free to move around, such as a fenced yard. If the pet jumps the fence and goes for a run, the system will alert the owner. The radiotag 10 may detect a break in the radio tether and wake up its cellular modem and cellular remote locator services toolkit so that a current location update can be sent to the owner at a convenient smartphone 30 and tracking services can be initiated.

The LAN radio 1704 may be a WiFi radio or equivalent. The BT core 1702 of the controller 1701 reports not only BT radio signal data, but also an index of received signal strength such as RSSI, and gives an indication of BT radio proximity within several hundred feet. If a cellular modem is provided, it is generally packaged in a cellular modem SOC and may be controlled by controller 1701 based on input from the Bluetooth or WiFi radios. In other embodiments, data sharing is achieved with a UART 1740 linked via USB port 1604 with the packet data environment of a wired network.

The BT radio 1702 may include correlators used for radio signal recognition and "always listening" radio power control. Digital messages include access codes, MAC addresses, and UUIDs, but wake commands and other network commands may also be received in BT signals. Antenna 1702a is tuned for BT spread spectrum transmission and reception. Notifications may be sent to the device via either the BT radio 1702 or the WiFi radio 1704, and may result in a display such as activation of speaker 1722 via acoustic driver 1721. Optionally, a microphone 1723 is included with audio codec 1724 so that responses to notifications can be sent. The hub housing 1602 may be configured for fidelity in reproducing human voice and for capturing voice commands by users. Broadband connection to a cloud server allows relatively low budget smart plug-ins such as these hubs 1700 to have a highly sophisticated voice-actuation and conversation interface.

The circuit diagram of FIG. 17 shows non-volatile memory 1710 for storing program instructions. The circuit may also include flash memory 1711 for data logging. The flash memory may supplement cache memory associated with the controller 1701.

For example, the non-volatile memory 1710 can store data for configuring one or more sensors 1712 of reference hub 1700, and a set of software instructions that, when executed by the controller 1701, cause the controller, or one or more circuits under the control of the controller circuit, to execute routines for transmitting BT and other wireless signals, for receiving BT or other wireless data, and for performing location management calculations.

The controller may be associated with a packet composer and decomposer that works in concert with buffers and registers of memory. The volatile memory of the memory circuit 1711 can include registers and buffers configured for storing records and data received from sensor package 1712, from a linked smart device 30, from WiFi radio 1704, from BT radio 1702, from the optional GPS chip 1714, and for buffering outgoing transmissions, for example. In some embodiments, controller 1701 is an SOC that includes a BT radio core.

RAM 1711 is provided for storage of volatile data, such as for data logging of sensor data from sensor package 1712, which may contain multiple sensors, for example, such as temperature, humidity, noise, and so forth, and may function as part of a "smart home" or "smart building" platform. Stored data may include data from sensors 1712 and from switches 1707. Data from throw- and button-press switch array (S1, S2, S3) 1707 is considered data. The size of the RAM memory 1711 is dependent on the size of the memory requirement for data. Large caches of radio contact record logs are not generally stored on board but are uploaded to network when possible.

Stored data may also include radio contact records. The radio contact data may include host-tabulated sensor data and source-tabulated sensor data. The RAM memory may be supplement cache memory in the processor if the data logging function requires it. Memory is generally organized as a rolling stack so that outdated data is dumped from the bottom of the stack and new data is added at the top of the stack if not first uplinked to the network.

The controller circuit 1701 is configured to generate and format output for radio transmission and to select a radio band according to context, radio environment, and power status. When on battery power, BT radio is the preferred radio. When on AC power, WiFi 1704 may supplement BT radio. In circumstances where WiFi is not available, other options may include cellular radio authentication and communication, or a USB connection 1604, with UART 1740, for example.

BT radio is used to communicate with BT radiotags and smartphones 30,31 when power savings is important. BT or cellular may be used to communicate with radiotags 10. WiFi is used for LAN networking where supported, such as by a home computer or smartphone. The above-described configurations of the circuit 1700 allow the hub, smart devices, and radiotags to communication with one another bidirectionally as part of a system for managing asset locations.

The controller circuit 1701 also may command a notification circuit 1730 to call attention to the data. Circuit 1730 can include one or more LEDs 1732*a*, 1732*b*. The hub may include a buzzer driver 1726 and one or more buzzers 1725 configured to provide notification functions. To create a user-friendly experience, in some instances, RGB LEDs are used in combination with an LED configured as a nightlight, for example. The buzzer or LED(s) can serve as an alarm if there is an exception to a rules-based contingency, such as loss of a linked signal, or can indicate an "all clear" if the linked connection(s) are intact and within expected proximity. In some embodiments, an LCD or OLED display screen 1731 may be provided, but generally a fully functional GUI is provided as an installable software application in a smartphone 30 that serves as the master of a piconet formed with the hub device 1700 during setup of features and user profile(s). The companion smartphone, with installed application, also provides remote notification and monitoring that supplements and enhances any user interface directly part of the reference hub housing 1602.

Still referring to FIG. 17, alternate embodiments of the hub 1700 are contemplated. For example, the hub 1700 can have an ASIC architecture, with integrated controller circuit 1701 and integrated communications system. The radios 1702,1704 and the controller circuit 1701 can be on separate chips or on a same chip. Radio 1704 may be a WiFi radio in one embodiment, but other suitable LAN radio protocols may include Zigbee and Thread, while not limited thereto.

In one embodiment, using a small solar cell (not shown) associated with a reference hub 1700, the current needed to maintain the Bluetooth radio for intermittent transmission of sensor data can be met from or supplemented by the solar cell output. In other embodiments, triboelectric structures that harness kinetic movement to generate current sufficient to support an always-listening radio are realized experimentally, demonstrating that the devices of the invention are well positioned to find increasing number of applications for future IoT needs.

Example I: Safe Zones and Radiotags for Pet Tracking

In a first example, the use of a pet radiotag 10 and cloud system 1111,2400 is applied to the problem of caring for the family dog. A house with fenced yard is provided, and a BT reference hub 1700 is installed in an electrical outlet of the house. The dog wears a radio tracking collar with radiotag 10. The radiotag is a member of a piconet with reference hub 1700 as a master device of the piconet. The hub 1700 transmits a stationary BT radiobeacon signal and includes a transceiver or UART for communicating with smartphone 30 or with cloud host services 2400 via LAN or WAN connections. The BT signal from radiotag 10 is transmitted with at least one RUI or UUID and motion data. In this instance, it is desirable to establish a "radio safe zone" that is essentially bounded by the fenced yard, but is defined to a cloud host 2400 by a radio tether between hub 1700 and dog collar radiotag 10. Within a safe zone, radiotag 10 is recognized as a familiar member of the BT piconet for purposes of connecting. The radiotag location proximity is monitored by the "always listening" BT radio of hub 1700. The hub reports the signal periodically to a network host 2400 or to a smart device 30, which is programmable and has a user interface for managing the safe zone and radiotags and for receiving notifications. The signal strength data that accompanies the radio contact report is an indication of the proximity of the dog to the hub 1700, and hence is a first approximation that the dog is still in the house or in the yard, as would indicate all is well.

Alternatively, the weakening or absence of the radio tether between hub 1700 and collar radiotag 10 suggests that the dog might have jumped the fence and is an exception to the safe zone rules-based regimen that results in a notification to the owner/subscriber 11. The notification can be as rudimentary as a buzzer or LED on the hub, or more constructively, a remote notification sent to an owner's smartphone 30, for example. As the distance between the moving dog and the stationary hub increases, there is a risk that the signal will be lost entirely, so the hub or the cloud host sends a command to the radiotag to turn on the cellular modem, to make a CALL HOME, and may also adjust the paging window for frequent automatic updates. The dog is then tracked using a cellular network of cell towers as described in FIG. 13A-13B.

In one embodiment, an activity index, as measured by onboard accelerometry, can be used to adjust the frequency of the CALL HOME with location fix. The more active the animal is, the more frequently a location update is needed. This is achieved with a dynamic interval in CALL HOME frequency that is driven by a processed output from the accelerometer 623. Heading sensor data may also be used to refine location management services.

If cellular contact is lost, the next appearance of the canine radiotag ID in a BT radio contact reported by a passerby's community nodal device 31 may result in execution of some system intervention, including generation of a notification to an owner of a radiotag that the radiotag has been detected outside the radio safe zone and display of a map on the owner/user's smartphone that shows the current location of the dog. Once the dog is recovered, the dog tag radiocollar 10 can be recharged and the system restored to default conditions.

In the case of pet recovery services, the radiotag can initiate its own call to the owner, so the owner is not strictly dependent on a Good Samaritan or a veterinarian with an RFID scanner to be sent a current location and timestamp from the lost radiotag. Advantageously, the last location can be displayed on the owner's smartphone and updated locations can be displayed as a series of waypoints that track the location of the lost pet until it is recovered.

Example II: Cellular Radio Power Consumption

FIG. 22 reproduces an oscilloscope image of instantaneous power consumption during a connection event followed by a series of paging opportunities in DRX mode of a cellular modem. This picture represents a full TAU cycle with a series of brief paging opportunities by eDRX events on the right of the WAKE, authentication and synchronization routine that appears as a series of steps in the plot on the left, each with higher power consumption. The device is controlled by a Monarch series processor with integrated LTE RF front end (Sequans, Paris FR).

Example VI: Mobile Voice Hub

In another embodiment, owner/subscriber 11,13 can communicate by voice through devices 10 or 20. Devices 10 or 20 may include a speaker, a microphone and audio codexes for processing speech via radio. The communication can be conducted by an automated cloud host on one end and a human on the other, or can be a human-to-human interaction. The user can conduct a conversation with an intelligent machine analogous to voice-actuated user interfaces such as Google Assistant, Bixby and Alexa that are becoming more widely implemented in consumer electronics. The response back to the device can be as simple as a beep in acknowledgement of a button press, or can be a decorous "thank you," a "bien sur", or a "do itashimashite", depending on the native language of the user.

The speaker and microphone array may optionally be contained in a circular, geodesic, prolate spheroid, or spherical acoustic housing. U.S. Pat. No. RE47,049 to Li teaches a dynamic microphone array for improved voice recognition. U.S. Pat. No. 7,177,798 to Hsu and U.S. Pat. No. 6,766,320 to Wang teach methods for natural language query and response interactions. These patent documents are incorporated in full by reference. Reference hub 20 may include a natural language interface incorporating cloud-based speech recognition and response, for example. A DSP (not shown) may be incorporated in the circuitry for recognizing basic wake words, for example. Mobile devices 10 may also include a natural language interface incorporating cloud-based speech recognition and response, for example.

Any interactive response can lead to further assistance, or to a two-way conversation between an owner/administrator and for example a community member who found the lost object or pet and pressed the button. Typically a message might be, in the case of a child with wrist radiotag, dog or cat wearing a radio collar, or a lost asset that carries an attached radiotag, "Your child/asset/pet has been found . . . and here is the location where the pet is now [ . . . see displayed map], for example." Arrangements can then be made to recover the/pet, or the owner can simply go to the spot and repeat the process of refining the current location until the animal is within reach. Extended voice interactions may be offered as part of the Cellular Remote Locator Services Toolkit.

The Bluetooth Proximity Locator Services Toolkit is valuable for finding concealed objects if needed. The back and forth allows for direct communication and speeds recovery. Items such as keys, jackets, purses, vehicles, valuables of any kind that can have an attached finder device, are readily tracked if lost. In an important application, children who have strayed can be re-united with their parents or teacher using this system. Also, using machine learning, devices that are about to be lost and children or pets who are about to stray can also be detected and preventative interventions taken by the system. The object of a smart system that can detect a lost child/asset/pet scenario before the owner knows the child/asset/pet is lost is realized by this system when combined with BT radio topology awareness, radio contact record data aggregation, and machine learning.

The promise of the IoT is a sea of information that empowers people to manage their lives. A virtual assistant, however, is not much value if it cannot be found when needed. By incorporating XCB dual radio capacity in a portable device, we realize a platform for tracking, finding, and sensing that can provision itself with location data. This device can be used as a data logger for collecting all kinds of information—including the surrounding BT radio topology—that a cloud host can then use to steer events to a successful outcome without user intervention, or to notify the user of the need for intervention, such as by flagging a lost item status before the owner knows it is lost. The computing resources onboard an XCB radiotag may be limited, but radio contact logs containing location and sensor data, when uplinked, can power the computing resources of the cloud for the benefit of communities.

EXAMPLE EMBODIMENTS

Example 1 includes a radio tag, comprising: a cellular modem configurable to operate in a wake mode and in a sleep mode and configured to determine a location of the radio tag; and a low-energy Bluetooth radio circuit configured to operate in an always-listening mode, to receive a Bluetooth signal, and, in response to the received Bluetooth signal, to cause the cellular modem to operate in the wake mode and to send, to a remote device, the determined location of the radio tag.

Example 2 includes the radio tag of Example 1, further comprising: a first antenna coupled to the Bluetooth radio circuit; and a second antenna coupled to the cellular modem.

Example 3 includes the radio tag of Example 1 wherein the cellular modem is associated with an IP address and is configured for connection to a remote device via a virtual private gateway.

Example 4 includes the radio tag of any of Examples 1-3, further comprising: a global-positioning-system circuit; and wherein the cellular modem is configured to determine the location of the radio tag by causing the global-positioning-system circuit to determine the location.

Example 5 includes the radio tag of any of Examples 1-4 wherein the cellular modem is configured to determine the location of the radio tag by requesting the location from a remote device via a cellular network.

Example 6 includes the radio tag of any of Examples 1-5, further comprising: a memory configured to store a number; and wherein the Bluetooth radio circuit is configured to cause the cellular modem to operate in the wake mode and to call the stored number in response to the Bluetooth signal.

Example 7 includes the radio tag of any of Examples 1-6, further comprising: a memory configured to store a number and a voice message; and wherein the Bluetooth radio circuit is configured to cause the cellular modem to operate in the wake mode, to call the stored number in response to the Bluetooth signal, and to send the stored voice message to an answering remote device associated with the stored number.

Example 8 includes a radio tag, comprising: a cellular modem configurable to operate in a wake mode and in a sleep mode and configured to determine a location of the radio tag; and a low-energy Bluetooth radio circuit configured to operate in an always-listening mode, to determine that a quality of a connection with a first remote device is less than a threshold level of quality, and, in response to determining that the quality of the connection is less than the threshold level of quality, to cause the cellular modem to operate in the wake mode and to send, to second remote device, the determined location of the radio tag.

Example 9 includes the radio tag of any of Examples 1-8, further comprising the quality of the connection including a strength of a Bluetooth signal received by the Bluetooth radio circuit and the threshold level of quality being a threshold level of signal strength.

Example 10 includes the radio tag of any of Examples 1-9, further comprising the quality of the connection including an amplitude of a Bluetooth signal received by the Bluetooth radio circuit and the threshold level of quality being a threshold level of signal amplitude.

Example 11 includes the radio tag of any of Examples 1-10, further comprising the quality of the connection including a power of a Bluetooth signal received by the Bluetooth radio circuit and the threshold level of quality being a threshold level of signal power.

Example 12 includes the radio tag of any of Examples 1-11 wherein the first remote device is the same device as the second remote device.

Example 13 includes the radio tag of any of Examples 1-12 wherein the first remote device includes a smart phone.

Example 14 includes the radio tag of any of Examples 1-13 wherein the second remote device includes a smart phone.

Example 15 includes a method, comprising: receiving a Bluetooth signal with a Bluetooth radio circuit; transitioning a cellular modem from a lower-power mode to a higher-power mode in response to the received Bluetooth signal; and sending, to a remote device with the cellular modem, a location of a radio tag that includes the Bluetooth radio circuit and the cellular modem.

Example 16 includes the method of any of Examples 1-15, further comprising operating the Bluetooth radio circuit in an always-listening mode while receiving the Bluetooth signal.

Example 17 includes a method, comprising: determining, with a Bluetooth radio circuit, that a quality of a connection with a first remote device is less than a threshold level of quality; transitioning a cellular modem from a lower-power mode to a higher-power mode in response to determining that the quality of the connection is less than the threshold level of quality; and sending, to a second remote device with the cellular modem, a location of a radio tag that includes the Bluetooth radio circuit and the cellular modem.

Example 18 includes the method of any of Examples 1-17 wherein determining that a quality of a connection with a first remote device is less than a threshold level of quality includes determining that the connection is undetectable.

Example 19 includes a computer-readable medium storing instructions that when executed by a computer circuit cause the computer circuit: to cause a Bluetooth radio circuit to receive a Bluetooth signal; to transition a cellular modem from a lower-power mode to a higher-power mode in response to the received Bluetooth signal; and to send, to a remote device with the cellular modem, a location of a radio tag that includes the Bluetooth radio circuit and the cellular modem.

Example 20 includes a computer-readable medium storing configuration data for configuring a circuit: to cause a Bluetooth radio circuit to receive a Bluetooth signal; to transition a cellular modem from a lower-power mode to a higher-power mode in response to the received Bluetooth signal; and to send, to a remote device with the cellular modem, a location of a radio tag that includes the Bluetooth radio circuit and the cellular modem.

Example 21 includes a computer-readable medium storing instructions that when executed by a computer circuit cause the computer circuit: to cause a Bluetooth radio circuit to determine that a quality of a connection with a first remote device is less than a threshold level of quality; to transition a cellular modem from a lower-power mode to a higher-power mode in response to determining that the quality of the connection is less than the threshold level of quality; and to cause the cellular modem to send, to a second remote device, a location of a radio tag that includes the Bluetooth radio circuit and the cellular modem.

Example 22 includes a computer-readable medium storing configuration data for configuring a circuit: to cause a Bluetooth radio circuit to determine that a quality of a connection with a first remote device is less than a threshold level of quality; to transition a cellular modem from a lower-power mode to a higher-power mode in response to determining that the quality of the connection is less than the threshold level of quality; and to cause the cellular modem to send, to a second remote device, a location of a radio tag that includes the Bluetooth radio circuit and the cellular modem.

Example 23 includes the radiotag of any of Examples 1-22, wherein the cellular modem is connectable over a virtual private gateway to a cloud host server in an eDRX paging window.

Example 24 includes the radiotag of any of Examples 1-23, wherein the Bluetooth radio has a MAC address and is discoverable by a community Bluetooth device.

Example 25 includes the radiotag of any of Examples 1-24, wherein the Bluetooth radio broadcasts a radio unit identifier identifiable by a cloud host server.

Example 26 includes the radiotag of any of Examples 1-25, wherein the qualified Bluetooth radio signal is configured as an AT command to the cellular modem.

Example 27 includes the radiotag of any of Examples 1-26, wherein the qualified Bluetooth radio signal is a command to activate the Bluetooth proximity locator toolbox component of the processing circuitry and trigger an alarm state in the alarm display subcircuit.

Example 28 includes the radiotag of any of Examples 1-27, wherein the Bluetooth proximity locator toolbox includes a dynamic gain adjustment tool usable in response to a directed advertisement from a paired smart device.

Example 29 includes the radiotag of any of Examples 1-28, wherein the Bluetooth proximity locator toolbox includes a radio tether tool enabled to measure signal strength of a radio tether and report RSSI to a smart device.

Example 30 includes the radiotag of Examples 1-29, wherein the Bluetooth proximity locator toolbox includes TX POWER in a Bluetooth advertisement signal.

Example 31 includes the radiotag of any of Examples 1-30, wherein the Bluetooth proximity locator toolbox includes a radio tether tool for receiving reports of the status of a radio tether.

Example 32 includes the radio tag of any of Examples 1-31 wherein the Bluetooth radio circuit is configured to cause the cellular modem to call a predetermined number if a radio tether is broken or fluctuating.

Example 33 includes the radio tag of Examples 1-32, further comprising an accelerometer, and wherein the Cellular Remote Locator toolbox is configured to adjust CALL HOME frequency according to a motion sensor output from the accelerometer.

Example 34 includes the radio tag of Examples 1-33, further comprising an electronic heading sensor, and wherein the Cellular Remote Locator toolbox is configured to make a CALL HOME in response to a change in a heading sensor output from the electronic heading sensor.

Example 35 includes the radio tag of any of Examples 1-34, further comprising a body temperature sensor, and wherein the Cellular Remote Locator toolbox is configured to make a CALL HOME in response to a change in a body temperature sensor output from the body temperature sensor.

Example 36 includes the radio tag of any of Examples 1-35, further comprising memory for logging sequential records of sensor data output and a clock for generating a timestamp for each sequential record.

Example 37 includes the radio tag of any of Examples 1-36, further comprising a temperature sensor, and wherein the Cellular Remote Locator toolbox is configured to make a CALL HOME in response to a change in a temperature sensor output from the temperature sensor.

Example 38 includes the radio tag of any of Examples 1-37, further comprising memory for logging sequential records of sensor data output, each record with a timestamp and a geostamp.

Example 39 includes the radio tag of any of Examples 1-38, wherein the housing comprises a touch actuation switch actuable by a user or a passerby.

Example 40 includes the radio tag of Examples 1-39, wherein the touch actuation switch is a homing button that actuates a CALL HOME.

Example 41 includes the radio tag of Examples 1-40, the processing circuit comprising a microphone and a speaker, wherein the homing button actuates a voice connection over a virtual private gateway between a user and a passerby in response to a button press on the homing button.

Example 42 includes the radio tag of the preceding Examples 1-41, wherein the housing is wearably attachable to a pet in need of location management services.

Example 43 includes the radio tag of the preceding Examples 1-42, wherein the radio tag is registered with a cloud host and location management services provided by the cloud host are linked to the radio tag by its IP address and radio unit identifier.

Example 44 includes a system for location management services, comprising: (a) a radio tag with a processing circuit having: i includes a cellular remote locator toolbox component with a cellular modem; ii includes a Bluetooth proximity locator toolbox component with a Bluetooth radio; (b) a cloud server configured to network with the radiotag via the cellular and the Bluetooth radio; and, (c) an instruction set, installable on a client smartphone, for setting up a user profile associated with the radiotag and for receiving location management notifications from the cloud server.

Example 45 includes the system of Examples 1-44, wherein the radiotag has an IP address and the cloud server is configured to connect with the radiotag over a virtual private gateway.

Example 46 includes the system of any of Examples 1-45, wherein the radiotag has an IP address and the cloud server is configured to connect with the radiotag via a community nodal device.

Example 47 includes the system of any of Examples 1-46, wherein the user profile comprises a geofence definition.

Example 48 includes the system of any of Examples 1-47, wherein the user profile comprises a radio tether.

Example 49 includes the system of any of Examples 1-48, wherein the user profile comprises a proximity avoidance threshold.

Example 50 includes the system of any of Examples 1-49, wherein the user profile comprises CALL HOME instructions.

Example 51 includes the system of any of Examples 1-50, wherein the user profile comprises a whitelist of Bluetooth radio unit identifiers.

Example 52 includes the system of any of Examples 1-51, wherein the user profile comprises user contact data and subscription information.

Example 53 includes the system of any of Examples 1-52, wherein the user profile comprises a rolling sensor data log.

Example 54 includes the system of any of Examples 1-53, wherein the radiotag comprises a sensor package having at least one of an accelerometer, an electronic heading sensor, a temperature sensor, a body temperature sensor, a heart rate monitor, a GPS receiver, and a Bluetooth radio traffic sensor.

Example 55 includes the system of any of Examples 1-54, wherein the radiotag is attachable to an asset, pet or child in need of location management services.

Example 56 includes the system of any of Examples 1-55, wherein the radiotag is embeddable in an asset in need of location management services.

Example 57 includes the system of any of Examples 1-56, wherein the system is configured to minimize network connectivity of the cellular modem by optimizing Bluetooth network connectivity when available.

Example 58 includes the system of any of Examples 1-57, wherein the Bluetooth radio functions as an "always listening" radio and can override an eDRX power saving cycle of the cellular modem in response to a BT radio signal from the cloud server received via a community nodal device.

Example 59 includes the system of Examples 1-58, wherein the BT radio is integrated with the radiotag processor and functions as a "wake up radio" for the cellular modem.

Example 60 includes a device, comprising: (a) a cellular modem associated with a cellular-modem identifier and configured for addressing by a virtual private gateway of a cellular network; (b) a bluetooth radio associated with a bluetooth-radio identifier and configured for addressing by a virtual private gateway of a cellular network; (c) a processing circuit enabled to cycle between a processing-circuit sleep mode and a processing-circuit awake mode in response to a received radio signal digitized by the cellular modem or the bluetooth radio, said digitized received radio signal containing a qualified field that satisfies the characteristics of a qualified radio message; and to perform at least one action while operating in the processing-circuit awake mode in response to said received radio message; and, wherein the at least one action is a CALL HOME to a cloud host server over a cellular network connection via the virtual private gateway that causes a current location update to be entered in the database of the cloud host server in association with a user profile identifiable by the cellular or bluetooth radio unit identifier.

Example 61 includes the device of Examples 1-60, wherein the processor comprises a wake pin, wake port, or wake circuit having a digital data link to the cellular modem and a wake pin, wake port, or wake circuit having a digital data link to the Bluetooth radio.

Example 62 includes the device of Example 1-61, wherein the wake circuit comprises a clock.

Example 63 includes the device of any of Examples 1-62, wherein the processor is configured to accept an instruction in a cellular radio message from a cloud host server, the instruction comprising an eDRX parameter of a sleep mode.

Example 64 includes the device of any of Examples 1-63, wherein the processor is configured to accept an instruction in a cellular radio message from a cloud host server, the instruction comprising a PSM parameter of a sleep mode.

Example 65 includes the device of any of Examples 1-64, further comprising a motion sensor having a digital data link to the processor.

Example 66 includes the device of Example 1-65, wherein the processor is configured to cycle to wake mode when the motion sensor outputs a digital datum having the characteristic of a movement.

Example 67 includes the device of any of Examples 1-66, where any of the cellular modem, Bluetooth radio and processor are combined as an integrated circuit.

Example 68 includes the device of any of Examples 1-67, wherein the cellular modem is operable for reporting of location to a cellular network host.

Example 69 includes the device of Examples 1-68, wherein the processor is operable for network-assisted location determination by AGPS.

Example 70 includes the device of any of Examples 1-69, further comprising a GPS receiver and calculation module.

Example 71 includes the device of any of Examples 1-70, wherein the Bluetooth radio is operable for receiving directed and undirected advertising and is discoverable.

Example 72 includes the device of Examples 1-71, wherein the Bluetooth radio is connectable.

Example 73 includes the device of any of Examples 1-72, wherein the Bluetooth radio is operable for location determination by crowd-source locating.

Example 74 includes the device of any of Examples 1-73, wherein the Bluetooth radio of the XCB device is configured to pair in a piconet with a smart device.

Example 75 includes the device of any of Examples 1-74, further comprising a switch accessible on a housing of the device, the switch for activating a CALL HOME.

Example 76 includes the device of any of Examples 1-75, which comprises a single action multifunction input switch, and wherein a radio signal generated in response to actuation of the switch causes an action by a smart device.

Example 77 includes the device of any of Examples 1-76, wherein the client radiotag is attachable to an asset in need of location management services.

Example 78 includes the device of any of Examples 1-77, wherein the client radiotag is attachable to a pet in need of location management services.

Example 79 includes a system for providing location management services, comprising: a cloud host server with virtual private gateway for receiving and transmitting packeted data; a client radiotag having: a cellular modem with cellular network log-in credentials, cellular radio unit identifier, and IP address addressable by a virtual private gateway of a cellular network; a bluetooth radio with bluetooth radio unit identifier and IP address addressable by a virtual private gateway of a cellular network; a processing circuit enabled to cycle between a processing-circuit sleep mode and a processing-circuit awake mode in response to a received radio signal digitized by the cellular modem or the bluetooth radio, said digitized received radio signal containing a qualified field that satisfies the characteristics of a qualified radio message; and to perform at least one action while operating in the processing-circuit awake mode in response to said received radio message; and, wherein the at least one action is an initiation of a cellular network connection via the virtual private gateway that causes a current location update to be entered in the database of the cloud host server in association with a user profile identifiable by the cellular or bluetooth radio unit identifier.

Example 80 includes the system of any of Examples 1-79, wherein the cellular modem is configured to default to a sleep state and to wake up for any of: (a) a scheduled paging window; (b) an AT command embedded in a received bluetooth radio message; and, (c) a command from the processing circuit.

Example 81 includes the system of any of Examples 1-80, wherein the bluetooth radio is configured to default to an always-listening mode that comprises a duty cycle alternating between states of sleep state, standby state, and passive listening-only state.

Example 82 includes the system of any of Examples 1-81, wherein the Bluetooth radio comprises a correlator and is configured to react to received directed advertising inquiries by entering an inquiry response state or an extended inquiry response state.

Example 83 includes the system of any of Examples 1-82, wherein the current location update comprises a timestamp and a geostamp and wherein the geostamp is a network-assisted location fix.

Example 84 includes the system of any of Examples 1-83, wherein the network-assisted location fix is a POLTE location fix made with a Cellular Location Toolbox.

Example 85 includes the system of any of Examples 1-84, wherein the network assisted location fix is a POLTE location fix that is refined for precision using the Bluetooth radio as a proximity locator.

Example 86 includes the system of any of Examples 1-85, further comprising a client smartphone.

Example 87 includes the system of any of Examples 1-86, wherein the client smartphone comprises a in interface for operating the Bluetooth Proximity Locator Toolbox.

Example 88 includes the system of any of Examples 1-87, wherein the Bluetooth Proximity Locator Toolbox is configured to cause an alarm in the client radiotag if the current location update is consistent with a location outside of a geofenced safe zone defined in the user profile.

Example 89 includes the system of any of Examples 1-88, wherein the cloud host server is configured to cause the client smartphone to display a trail of waypoints, each waypoint corresponding to a position of a client radiotag over time.

Example 90 includes the system of any of Examples 1-89, wherein the client radiotag comprises one or more sensors.

Example 91 includes the system of any of Examples 1-90, wherein the system is enabled to cause the client smartphone to display a notification if the client radiotag meets criteria consistent with a lost characteristic.

Example 92 includes the system of any of Examples 1-91, wherein the lost characteristic is calculated based on any of: (a) sensor data that triggers an exception; (b) location data that triggers an exception; (c) an RSSI value that triggers an exception; and, (d) radio traffic data that triggers and exception.

Example 93 includes the system of any of Examples 1-92, wherein the system is configured to send a command to the client radiotag by any of: (a) a de novo cellular radio network connection; (b) a cellular radio network connection renewal in a paging window; (c) a cellular radio network connection renewal in a DRX or eDRX paging opportunity; (d) a response to a CALL HOME over a cellular network; and, (e) a Bluetooth radio connection made using a Bluetooth radio device as an intermediary.

Example 94 includes the system of any of Examples 1-93, wherein the command is any of: command to enter an alarm state; command to wake up the cellular modem from its default sleep mode; command to CALL HOME; command to generate a location fix; and, command to wake up a companion smartphone.

Example 95 includes the system of any of Examples 1-94, wherein the client radiotag is attachable to a pet in need of location management services.

We claim:

1. A radiotag wearable by a pet in need of location monitoring, comprising a housing with a processor, associated logic circuitry, a cellular modem, a Bluetooth modem, battery, and computer-executable instructions stored in a computer-readable memory that,
   when executed by the processor, cause the radiotag to generate signals for:
   (a) controlling the cellular modem to operate in a sleep mode or a wake mode and to default to the sleep mode;
   (b) determining, that a Bluetooth radio signal quality of connection between the Bluetooth modem and a paired smartphone operated by the owner of the pet is less than a threshold level of quality, has become intermittent, or is undetectable and lost;
   (c) transitioning the cellular modem from the sleep mode to the wake mode in response to a determination that the Bluetooth radio signal quality of connection has become undetectable or lost; and
   (d) in response to a determination that the Bluetooth radio signal quality of connection has become undetectable or lost, causing the cellular modem to connect to a cellular network, to determine from the cellular network a current location of the radiotag, and to report the location to a second remote device; wherein a second remote device is a cloud host configured to administer radiotag locating, tracking and notifying services for a community of owners of radiotags worn by pets.

2. The radiotag of claim 1, wherein the first remote device is a smartphone, and the smartphone is answerable by an owner of the radiotag worn by a pet.

3. The radiotag of claim 1, wherein the second remote device is the cloud host, and in response to the signal from the cellular modem, the cloud host is configured to report the current location to an owner of the radio tag worn by a pet.

4. The radiotag of claim 1, wherein the Bluetooth identifier of a Bluetooth radio signal broadcast by the radio tag is discoverable by a community Bluetooth device and is identifiable by a cloud host.

5. The radio tag of claim 4, wherein the cloud server has an IP address accessible on a cellular network via a virtual private gateway.

6. The radiotag of claim 4, wherein the Bluetooth identifier of a Bluetooth radio signal received by a community Bluetooth device is reportable to the cloud host.

7. The radiotag of claim 1, wherein the cloud host is configured to send a map showing the current location of the radiotag to an owner and to periodically update the map.

8. The radiotag of claim 1, wherein the cloud host is configured to send mapwise directions for recovering a lost pet to the owner.

9. The radio tag of claim 1, wherein the cloud host comprises a database that includes a user profile for the owner of the radiotag, and the user profile includes user-programmable conditional rules that specify conditions under which the location of the radiotag is to be reported to the owner.

10. The radiotag of claim 1, which comprises a Bluetooth radio tether tool enabled to measure a radio signal strength of a Bluetooth radio tether and to determine whether the radio signal strength is less than the threshold level of quality or the Bluetooth radio signal is lost.

11. The radiotag of claim 1, wherein the housing comprises a touch actuation switch actuable by a passerby.

12. The radiotag of claim 11, wherein the touch actuation switch is a homing button that actuates a notification to the owner's smartphone.

13. The radiotag of claim 11, wherein the housing comprises a microphone and a speaker, and wherein the touch actuation switch is configured to actuate a voice connection over a virtual private gateway between an owner of the pet and the passerby.

14. The radiotag of claim 11, wherein the touch actuation switch actuates a chat link between the owner's smartphone and the passerby's smartphone.

15. The radiotag of claim 11, wherein the touch actuation switch actuates a chat link between the owner's smartphone and an agent service operated by the cloud host.

16. The radio tag of claim 1, wherein the processor is programmable to store a telephone number of the smartphone operated by the owner in the memory; and is configured to cause the cellular modem to operate in the wake mode and to call the stored telephone number in response to determining that the Bluetooth radio connection has become undetectable or lost.

17. The radiotag of claim 1, further comprising a global-positioning-system circuit; wherein the cellular modem is configured to determine the location of the radio tag by obtaining the location from the global-positioning-system circuit.

18. A method, comprising:
   by a radiotag having a processor, logic circuitry, a cellular modem with identifier, a Bluetooth radio circuit with identifier, and computer-executable instructions in a memory, determining, that a quality of a Bluetooth radio connection with a first remote device is less than a threshold level of quality;
   by the processor, transitioning the cellular modem from a lower-power mode to a higher-power mode in response to determining that the quality of the Bluetooth radio connection is less than the threshold level of quality;
   by the processor, causing the cellular modem to send, to a second remote device, a signal including a current location of the radio tag, the Bluetooth radio circuit identifier and the cellular modem identifier in response to determining that the Bluetooth radio connection is undetectable; wherein the second remote device is a cloud host configured to administer radiotag locating, tracking and notifying services for a community of owners of radiotags worn by pets.

19. The method of claim 18, comprising, determining that the Bluetooth radio connection is intermittent or undetectable; and, by a cloud host, tracking the radiotag by monitoring the location of the cellular modem.

20. The method of claim 18, further comprising, by the processor, determining that the quality of the Bluetooth radio connection is less than the threshold level of quality or the Bluetooth radio connection is undetectable or lost and causing the Bluetooth radio circuit to temporarily increase its transmit power in response thereto.

* * * * *